(12) United States Patent
Morita et al.

(10) Patent No.: US 7,624,424 B2
(45) Date of Patent: Nov. 24, 2009

(54) ACCESS CONTROL SYSTEM, ACCESS CONTROL METHOD, AND ACCESS CONTROL PROGRAM

(75) Inventors: Yoichiro Morita, Tokyo (JP); Masayuki Nakae, Tokyo (JP)

(73) Assignee: NEC Corporation, Tokyo (JP)

( * ) Notice: Subject to any disclaimer, the term of this patent is extended or adjusted under 35 U.S.C. 154(b) by 952 days.

(21) Appl. No.: 11/133,371

(22) Filed: May 20, 2005

(65) Prior Publication Data

US 2005/0262132 A1 Nov. 24, 2005

(30) Foreign Application Priority Data

May 21, 2004 (JP) ............................. 2004-152067
Jan. 19, 2005 (JP) ............................. 2005-011531

(51) Int. Cl.
  *G06F 21/22* (2006.01)
  *G06F 15/16* (2006.01)
  *H04L 9/32* (2006.01)
(52) U.S. Cl. ................................. 726/1; 726/4; 726/27
(58) Field of Classification Search ...................... None
  See application file for complete search history.

(56) References Cited

U.S. PATENT DOCUMENTS

| | | | |
|---|---|---|---|
| 6,237,036 B1 | 5/2001 | Ueno et al. | |
| 6,871,232 B2 * | 3/2005 | Curie et al. | 709/225 |
| 6,917,975 B2 * | 7/2005 | Griffin et al. | 709/225 |
| 6,985,955 B2 * | 1/2006 | Gullotta et al. | 709/229 |
| 7,092,942 B2 * | 8/2006 | Frieden et al. | 707/9 |
| 7,249,369 B2 * | 7/2007 | Knouse et al. | 726/1 |
| 7,272,625 B1 * | 9/2007 | Hannel et al. | 709/200 |
| 7,366,724 B2 * | 4/2008 | Frieden et al. | 707/10 |
| 7,464,162 B2 * | 12/2008 | Chan | 709/225 |
| 7,484,237 B2 * | 1/2009 | Joly et al. | 726/1 |
| 2002/0169876 A1 * | 11/2002 | Curie et al. | 709/226 |
| 2005/0138411 A1 * | 6/2005 | Griffin et al. | 713/200 |

FOREIGN PATENT DOCUMENTS

| | | |
|---|---|---|
| JP | 03-006640 | 1/1991 |
| JP | 11-313102 | 11/1999 |
| JP | 2003-513513 | 4/2003 |
| JP | 2003-140968 | 5/2003 |
| JP | 2003-241901 | 8/2003 |
| JP | 2003-316742 | 11/2003 |

* cited by examiner

*Primary Examiner*—Christopher A Revak
(74) *Attorney, Agent, or Firm*—Foley & Lardner LLP

(57) ABSTRACT

A policy storage stores an access control policy as a set of setting information items to make resources (access destinations) shared by an adhoc group. When a part of the access control policy is edited, a policy analyzer updates a rule generated from the edited access control policy. At this time, the rule is updated with use of object knowledge having a data configuration capable of expressing a user as belonging to plural user groups. An access control list setting means updates a part of an access control list, based on the updated rule. Accordingly, an access control list can be generated with respect to a user group including a user who belongs to plural organizations, and the access control list can be updated efficiently.

23 Claims, 55 Drawing Sheets

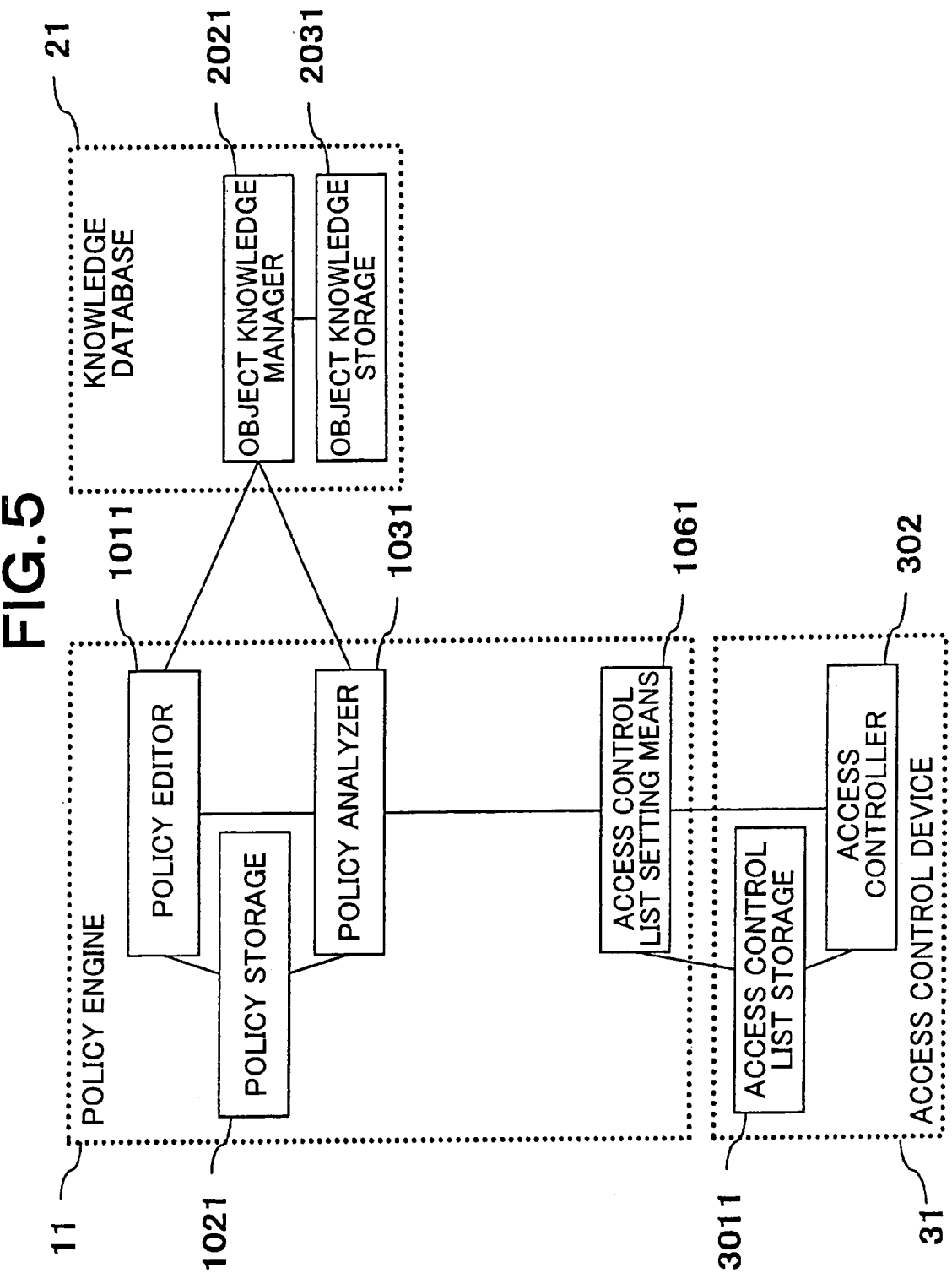

FIG.6

ACCESS CONTROL POLICY

| ID | QWERTYUIOPASDFGHJKLZXCVBNM |
|---|---|
| ACCESSIBILITY | PERMITTED |
| USER GROUP | POLICY MEETING MEMBER |
| POSITION | MAIN OFFICE MEETING ROOM A, KANSAI OFFICE MEETING ROOM B |
| RESOURCE | MAIN OFFICE DATA FILE SERVER, KANSAI OFFICE SHARED FTP SERVER |

FIG.7

INTERMEDIATE LANGUAGE

| ID | QWERTYUIOPASDFGHJKLZXCVBNM |
|---|---|
| ACCESSIBILITY | PERMITTED |
| USER ID | UserA |
| | UserB |
| ACCESS SOURCE | 1.1.1.0/255.255.255.0 |
| | 2.2.2.0/255.255.255.0 |
| ACCESS DESTINATION | 3.3.3.3:138(tcp) |
| | 3.3.3.3:139(tcp) |
| | 4.4.4.4:20(tcp-incoming) |
| | 4.4.4.4:21(tcp-outgoing) |

FIG.8

ACCESS CONTROL LIST

| Permit | tcp | 1.1.1.0/255.255.255.0 | 3.3.3.3 | * | 138 | UserA |
|---|---|---|---|---|---|---|
| Permit | tcp | 1.1.1.0/255.255.255.0 | 3.3.3.3 | * | 138 | UserB |
| Permit | tcp | 1.1.1.0/255.255.255.0 | 3.3.3.3 | * | 139 | UserA |
| Permit | tcp | 1.1.1.0/255.255.255.0 | 3.3.3.3 | * | 139 | UserB |
| Permit | tcp-in | 1.1.1.0/255.255.255.0 | 4.4.4.4 | * | 20 | UserA |
| Permit | tcp-in | 1.1.1.0/255.255.255.0 | 4.4.4.4 | * | 20 | UserB |
| Permit | tcp-out | 1.1.1.0/255.255.255.0 | 4.4.4.4 | * | 21 | UserA |
| Permit | tcp-out | 1.1.1.0/255.255.255.0 | 4.4.4.4 | * | 21 | UserB |
| Permit | tcp | 2.2.2.0/255.255.255.0 | 3.3.3.3 | * | 138 | UserA |
| Permit | tcp | 2.2.2.0/255.255.255.0 | 3.3.3.3 | * | 138 | UserB |
| Permit | tcp | 2.2.2.0/255.255.255.0 | 3.3.3.3 | * | 139 | UserA |
| Permit | tcp | 2.2.2.0/255.255.255.0 | 3.3.3.3 | * | 139 | UserB |
| Permit | tcp-in | 2.2.2.0/255.255.255.0 | 4.4.4.4 | * | 20 | UserA |
| Permit | tcp-in | 2.2.2.0/255.255.255.0 | 4.4.4.4 | * | 20 | UserB |
| Permit | tcp-out | 2.2.2.0/255.255.255.0 | 4.4.4.4 | * | 21 | UserA |
| Permit | tcp-out | 2.2.2.0/255.255.255.0 | 4.4.4.4 | * | 21 | UserB |

FIG.9

ACCESS CONTROL POLICY

| ID | QWERTYUIOPASDFGHJKLZXCVBNM |
|---|---|
| ACCESSIBILITY | PERMITTED |
| USER GROUP | NEW SYSTEM INTRODUCTION PROJECT MEMBER, DEVELOPMENT TEAM |
| POSITION | MAIN OFFICE MEETING ROOM A, KANSAI OFFICE DISCUSSION ROOM B |
| RESOURCE | MAIN OFFICE SHARED DATA SERVER, KANSAI OFFICE SHARED DATA SERVER |

FIG.10

INTERMEDIATE LANGUAGE

| ID | | QWERTYUIOPASDFGHJKLZXCVBNM |
|---|---|---|
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 1.1.1.0/24 |
| | PORT NO. | * |
| ACCESS DESTINATION | IP ADDRESS | 7.7.7.7 |
| | PORT NO. | 137-138(udp) |
| | | 137(tcp) |
| | | 139(tcp) |
| | | 445(udp) |
| | | 445(tcp) |
| ID | | QWERTYUIOPASDFGHJKLZXCVBNM |
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 1.1.1.0/24 |
| | PORT NO. | * |
| ACCESS DESTINATION | IP ADDRESS | 8.8.8.8 |
| | PORT NO. | 80(tcp) |
| ID | | QWERTYUIOPASDFGHJKLZXCVBNM |
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 1.1.1.0/24 |
| | PORT NO. | * |
| ACCESS DESTINATION | IP ADDRESS | 9.9.9.9 |
| | PORT NO. | 80(tcp) |
| | | 443(tcp) |
| ID | | QWERTYUIOPASDFGHJKLZXCVBNM |
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 2.2.2.192/26 |
| | PORT NO. | * |
| ACCESS DESTINATION | IP ADDRESS | 7.7.7.7 |
| | PORT NO. | 137-138(udp) |
| | | 137(tcp) |
| | | 139(tcp) |
| | | 445(udp) |
| | | 445(tcp) |
| ID | | QWERTYUIOPASDFGHJKLZXCVBNM |
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 2.2.2.192/26 |
| | PORT NO. | * |
| ACCESS DESTINATION | IP ADDRESS | 8.8.8.8 |
| | PORT NO. | 80(tcp) |

FIG.11

INTERMEDIATE LANGUAGE

| ID | | QWERTYUIOPASDFGHJKLZXCVBNM |
|---|---|---|
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 2.2.2.192/26 |
| | PORT NO. | * |
| ACCESS DESTINATION | IP ADDRESS | 9.9.9.9 |
| | PORT NO. | 80(tcp) |
| | | 443(tcp) |
| ID | | QWERTYUIOPASDFGHJKLZXCVBNM |
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 3.3.3.192/26 |
| | PORT NO. | * |
| ACCESS DESTINATION | IP ADDRESS | 7.7.7.7 |
| | PORT NO. | 137-138(udp) |
| | | 137(tcp) |
| | | 139(tcp) |
| | | 445(udp) |
| | | 445(tcp) |
| ID | | QWERTYUIOPASDFGHJKLZXCVBNM |
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 3.3.3.192/26 |
| | PORT NO. | * |
| ACCESS DESTINATION | IP ADDRESS | 8.8.8.8 |
| | PORT NO. | 80(tcp) |
| ID | | QWERTYUIOPASDFGHJKLZXCVBNM |
| ACCESSIBILITY | | Permit |
| USER ID | | i-takahashi |
| | | s-watanabe |
| | | m-itou |
| | | k-satou |
| | | h-suzuki |
| ACCESS SOURCE | IP ADDRESS | 3.3.3.192/26 |
| | PORT NO. | * |
| ACCESS DESTINATION | IP ADDRESS | 9.9.9.9 |
| | PORT NO. | 80(tcp) |
| | | 443(tcp) |

FIG.12

ACCESS CONTROL LIST

| | | | | | | |
|---|---|---|---|---|---|---|
| Permit | udp | 1.1.1.0/255.255.255.0 | 7.7.7.7 | * | 137-138 | i-takahashi |
| Permit | udp | 1.1.1.0/255.255.255.0 | 7.7.7.7 | * | 137-138 | s-watanabe |
| Permit | udp | 1.1.1.0/255.255.255.0 | 7.7.7.7 | * | 137-138 | m-itou |
| Permit | udp | 1.1.1.0/255.255.255.0 | 7.7.7.7 | * | 137-138 | k-satou |
| Permit | udp | 1.1.1.0/255.255.255.0 | 7.7.7.7 | * | 137-138 | h-suzuki |
| Permit | tcp | 1.1.1.0/255.255.255.0 | 7.7.7.7 | * | 137 | i-takahashi |
| Permit | tcp | 1.1.1.0/255.255.255.0 | 7.7.7.7 | * | 137 | s-watanabe |
| Permit | tcp | 1.1.1.0/255.255.255.0 | 7.7.7.7 | * | 137 | m-itou |
| Permit | tcp | 1.1.1.0/255.255.255.0 | 7.7.7.7 | * | 137 | k-satou |
| Permit | tcp | 1.1.1.0/255.255.255.0 | 7.7.7.7 | * | 137 | h-suzuki |
| Permit | tcp | 1.1.1.0/255.255.255.0 | 7.7.7.7 | * | 139 | i-takahashi |
| Permit | tcp | 1.1.1.0/255.255.255.0 | 7.7.7.7 | * | 139 | s-watanabe |
| Permit | tcp | 1.1.1.0/255.255.255.0 | 7.7.7.7 | * | 139 | m-itou |
| Permit | tcp | 1.1.1.0/255.255.255.0 | 7.7.7.7 | * | 139 | k-satou |
| Permit | tcp | 1.1.1.0/255.255.255.0 | 7.7.7.7 | * | 139 | h-suzuki |
| Permit | udp | 1.1.1.0/255.255.255.0 | 7.7.7.7 | * | 445 | i-takahashi |
| Permit | udp | 1.1.1.0/255.255.255.0 | 7.7.7.7 | * | 445 | s-watanabe |
| Permit | udp | 1.1.1.0/255.255.255.0 | 7.7.7.7 | * | 445 | m-itou |
| Permit | udp | 1.1.1.0/255.255.255.0 | 7.7.7.7 | * | 445 | k-satou |
| Permit | udp | 1.1.1.0/255.255.255.0 | 7.7.7.7 | * | 445 | h-suzuki |
| Permit | tcp | 1.1.1.0/255.255.255.0 | 7.7.7.7 | * | 445 | i-takahashi |
| Permit | tcp | 1.1.1.0/255.255.255.0 | 7.7.7.7 | * | 445 | s-watanabe |
| Permit | tcp | 1.1.1.0/255.255.255.0 | 7.7.7.7 | * | 445 | m-itou |
| Permit | tcp | 1.1.1.0/255.255.255.0 | 7.7.7.7 | * | 445 | k-satou |
| Permit | tcp | 1.1.1.0/255.255.255.0 | 7.7.7.7 | * | 445 | h-suzuki |
| Permit | tcp | 1.1.1.0/255.255.255.0 | 8.8.8.8 | * | 80 | i-takahashi |
| Permit | tcp | 1.1.1.0/255.255.255.0 | 8.8.8.8 | * | 80 | s-watanabe |
| Permit | tcp | 1.1.1.0/255.255.255.0 | 8.8.8.8 | * | 80 | m-itou |
| Permit | tcp | 1.1.1.0/255.255.255.0 | 8.8.8.8 | * | 80 | k-satou |
| Permit | tcp | 1.1.1.0/255.255.255.0 | 8.8.8.8 | * | 80 | h-suzuki |
| Permit | tcp | 1.1.1.0/255.255.255.0 | 9.9.9.9 | * | 80 | i-takahashi |
| Permit | tcp | 1.1.1.0/255.255.255.0 | 9.9.9.9 | * | 80 | s-watanabe |
| Permit | tcp | 1.1.1.0/255.255.255.0 | 9.9.9.9 | * | 80 | m-itou |
| Permit | tcp | 1.1.1.0/255.255.255.0 | 9.9.9.9 | * | 80 | k-satou |
| Permit | tcp | 1.1.1.0/255.255.255.0 | 9.9.9.9 | * | 80 | h-suzuki |
| Permit | tcp | 1.1.1.0/255.255.255.0 | 9.9.9.9 | * | 443 | i-takahashi |
| Permit | tcp | 1.1.1.0/255.255.255.0 | 9.9.9.9 | * | 443 | s-watanabe |
| Permit | tcp | 1.1.1.0/255.255.255.0 | 9.9.9.9 | * | 443 | m-itou |
| Permit | tcp | 1.1.1.0/255.255.255.0 | 9.9.9.9 | * | 443 | k-satou |
| Permit | tcp | 1.1.1.0/255.255.255.0 | 9.9.9.9 | * | 443 | h-suzuki |
| Permit | udp | 2.2.2.0/255.255.255.192 | 7.7.7.7 | * | 137-138 | i-takahashi |
| Permit | udp | 2.2.2.0/255.255.255.192 | 7.7.7.7 | * | 137-138 | s-watanabe |
| Permit | udp | 2.2.2.0/255.255.255.192 | 7.7.7.7 | * | 137-138 | m-itou |
| Permit | udp | 2.2.2.0/255.255.255.192 | 7.7.7.7 | * | 137-138 | k-satou |
| Permit | udp | 2.2.2.0/255.255.255.192 | 7.7.7.7 | * | 137-138 | h-suzuki |
| Permit | tcp | 2.2.2.0/255.255.255.192 | 7.7.7.7 | * | 137 | i-takahashi |
| Permit | tcp | 2.2.2.0/255.255.255.192 | 7.7.7.7 | * | 137 | s-watanabe |
| Permit | tcp | 2.2.2.0/255.255.255.192 | 7.7.7.7 | * | 137 | m-itou |
| Permit | tcp | 2.2.2.0/255.255.255.192 | 7.7.7.7 | * | 137 | k-satou |
| Permit | tcp | 2.2.2.0/255.255.255.192 | 7.7.7.7 | * | 137 | h-suzuki |
| Permit | tcp | 2.2.2.0/255.255.255.192 | 7.7.7.7 | * | 139 | i-takahashi |
| Permit | tcp | 2.2.2.0/255.255.255.192 | 7.7.7.7 | * | 139 | s-watanabe |
| Permit | tcp | 2.2.2.0/255.255.255.192 | 7.7.7.7 | * | 139 | m-itou |
| Permit | tcp | 2.2.2.0/255.255.255.192 | 7.7.7.7 | * | 139 | k-satou |
| Permit | tcp | 2.2.2.0/255.255.255.192 | 7.7.7.7 | * | 139 | h-suzuki |
| Permit | udp | 2.2.2.0/255.255.255.192 | 7.7.7.7 | * | 445 | i-takahashi |
| Permit | udp | 2.2.2.0/255.255.255.192 | 7.7.7.7 | * | 445 | s-watanabe |
| Permit | udp | 2.2.2.0/255.255.255.192 | 7.7.7.7 | * | 445 | m-itou |
| Permit | udp | 2.2.2.0/255.255.255.192 | 7.7.7.7 | * | 445 | k-satou |

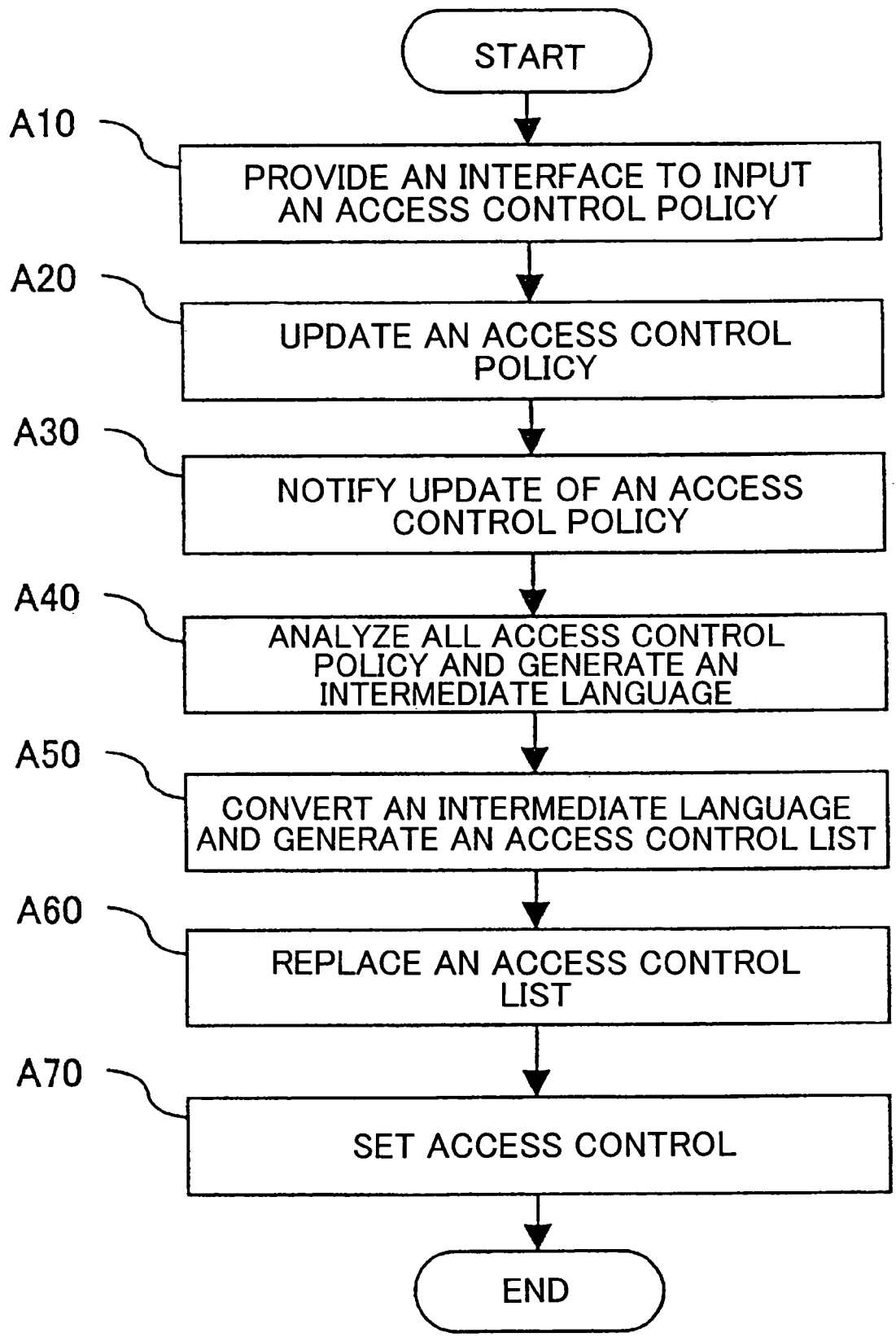

FIG.15

POLICY EDIT SCREEN

[POLICY ENTER] [EDIT STOP]

EXPLANATION OF POLICY

NEW SYSTEM INTRODUCTION MEETING ON FEB. 3

USER GROUP SELECTION (CHECK ALL THAT APPLY)
- ☐ OPERATION MEETING MEMBER
- ☐ DEVELOPMENT MEETING MEMBER
- ■ NEW SYSTEM INTRODUCTION PROJECT MEMBER
- ☐ SYSTEM DESIGN NEGOTIATION MEMBER
- ☐ SYSTEM COST NEGOTIATION MEMBER

POSITION SELECTION (CHECK ALL THAT APPLY)
- ■ MAIN OFFICE MEETING ROOM A
- ☐ MAIN OFFICE MEETING ROOM B
- ☐ MAIN OFFICE MEETING ROOM C
- ☐ KANSAI OFFICE DISCUSSION ROOM A
- ■ KANSAI OFFICE DISCUSSION ROOM B

RESOURCE SELECTION (CHECK ALL THAT APPLY)
- ☐ INTER-OFFICE MAIL SERVER
- ■ MAIN OFFICE SHARED DATA SERVER
- ■ KANSAI OFFICE SHARED DATA SERVER
- ☐ PUBLIC CATALOG
- ☐ DEVELOPMENT TEAM SPECIFICATION

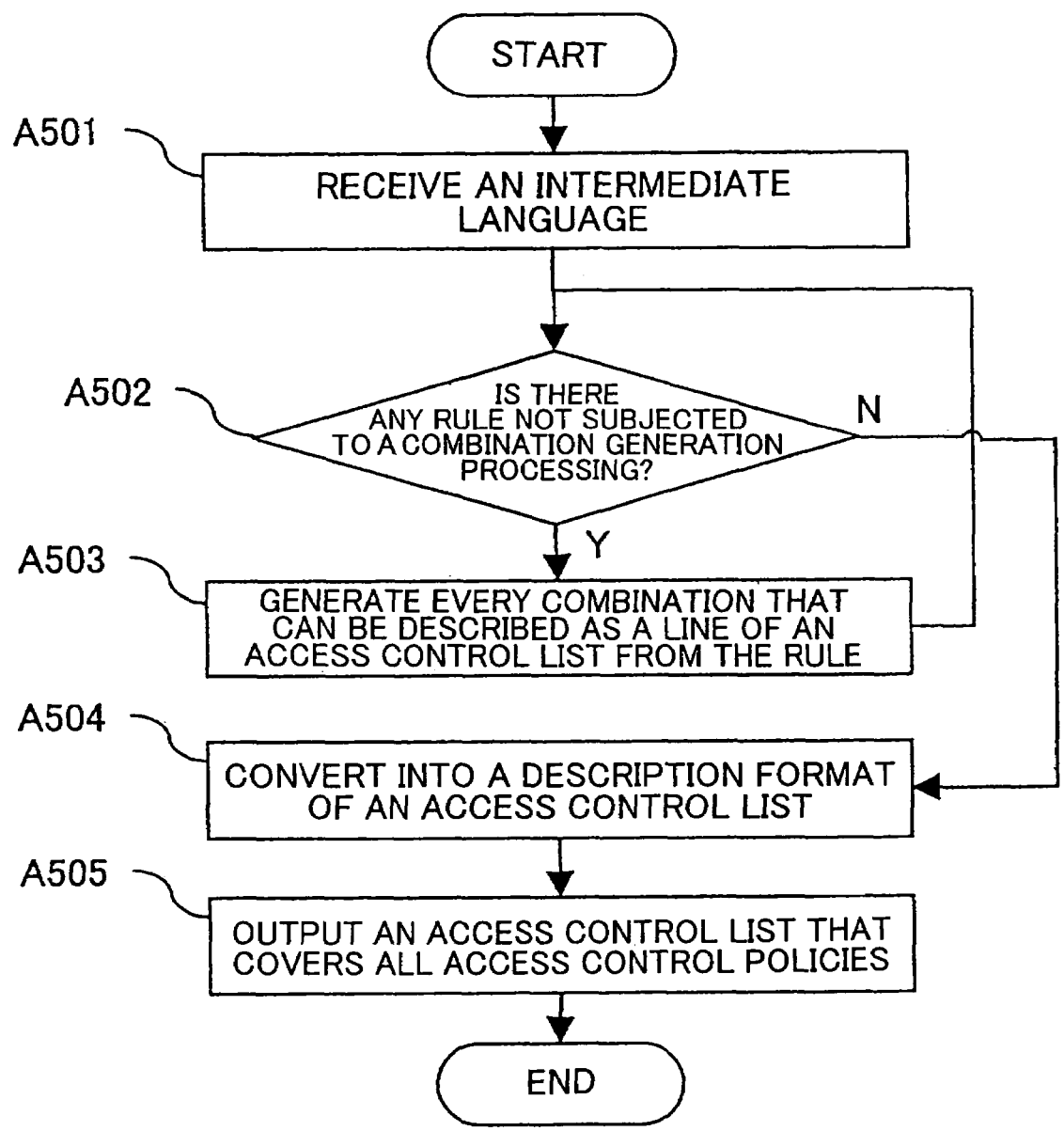

FIG.18

ACCESS CONTROL LIST

| | | | | | | |
|---|---|---|---|---|---|---|
| Permit | udp | 1.1.1.0/255.255.255.0 | 7.7.7.7 | * | 137-138 | i-takahashi,s-watanabe,m-itou,k-satou,h-suzuki |
| Permit | tcp | 1.1.1.0/255.255.255.0 | 7.7.7.7 | * | 137 | i-takahashi,s-watanabe,m-itou,k-satou,h-suzuki |
| Permit | tcp | 1.1.1.0/255.255.255.0 | 7.7.7.7 | * | 139 | i-takahashi,s-watanabe,m-itou,k-satou,h-suzuki |
| Permit | udp | 1.1.1.0/255.255.255.0 | 7.7.7.7 | * | 445 | i-takahashi,s-watanabe,m-itou,k-satou,h-suzuki |
| Permit | tcp | 1.1.1.0/255.255.255.0 | 7.7.7.7 | * | 445 | i-takahashi,s-watanabe,m-itou,k-satou,h-suzuki |
| Permit | tcp | 1.1.1.0/255.255.255.0 | 8.8.8.8 | * | 80 | i-takahashi,s-watanabe,m-itou,k-satou,h-suzuki |
| Permit | tcp | 1.1.1.0/255.255.255.0 | 9.9.9.9 | * | 80 | i-takahashi,s-watanabe,m-itou,k-satou,h-suzuki |
| Permit | tcp | 1.1.1.0/255.255.255.0 | 9.9.9.9 | * | 443 | i-takahashi,s-watanabe,m-itou,k-satou,h-suzuki |
| Permit | udp | 2.2.2.0/255.255.255.192 | 7.7.7.7 | * | 137-138 | i-takahashi,s-watanabe,m-itou,k-satou,h-suzuki |
| Permit | tcp | 2.2.2.0/255.255.255.192 | 7.7.7.7 | * | 137 | i-takahashi,s-watanabe,m-itou,k-satou,h-suzuki |
| Permit | tcp | 2.2.2.0/255.255.255.192 | 7.7.7.7 | * | 139 | i-takahashi,s-watanabe,m-itou,k-satou,h-suzuki |
| Permit | udp | 2.2.2.0/255.255.255.192 | 7.7.7.7 | * | 445 | i-takahashi,s-watanabe,m-itou,k-satou,h-suzuki |
| Permit | tcp | 2.2.2.0/255.255.255.192 | 7.7.7.7 | * | 445 | i-takahashi,s-watanabe,m-itou,k-satou,h-suzuki |
| Permit | tcp | 2.2.2.0/255.255.255.192 | 8.8.8.8 | * | 80 | i-takahashi,s-watanabe,m-itou,k-satou,h-suzuki |
| Permit | tcp | 2.2.2.0/255.255.255.192 | 9.9.9.9 | * | 80 | i-takahashi,s-watanabe,m-itou,k-satou,h-suzuki |
| Permit | tcp | 2.2.2.0/255.255.255.192 | 9.9.9.9 | * | 443 | i-takahashi,s-watanabe,m-itou,k-satou,h-suzuki |
| Permit | udp | 3.3.3.0/255.255.255.192 | 7.7.7.7 | * | 137-138 | i-takahashi,s-watanabe,m-itou,k-satou,h-suzuki |
| Permit | tcp | 3.3.3.0/255.255.255.192 | 7.7.7.7 | * | 137 | i-takahashi,s-watanabe,m-itou,k-satou,h-suzuki |
| Permit | tcp | 3.3.3.0/255.255.255.192 | 7.7.7.7 | * | 139 | i-takahashi,s-watanabe,m-itou,k-satou,h-suzuki |
| Permit | udp | 3.3.3.0/255.255.255.192 | 7.7.7.7 | * | 445 | i-takahashi,s-watanabe,m-itou,k-satou,h-suzuki |
| Permit | tcp | 3.3.3.0/255.255.255.192 | 7.7.7.7 | * | 445 | i-takahashi,s-watanabe,m-itou,k-satou,h-suzuki |
| Permit | tcp | 3.3.3.0/255.255.255.192 | 8.8.8.8 | * | 80 | i-takahashi,s-watanabe,m-itou,k-satou,h-suzuki |
| Permit | tcp | 3.3.3.0/255.255.255.192 | 9.9.9.9 | * | 80 | i-takahashi,s-watanabe,m-itou,k-satou,h-suzuki |
| Permit | tcp | 3.3.3.0/255.255.255.192 | 9.9.9.9 | * | 443 | i-takahashi,s-watanabe,m-itou,k-satou,h-suzuki |

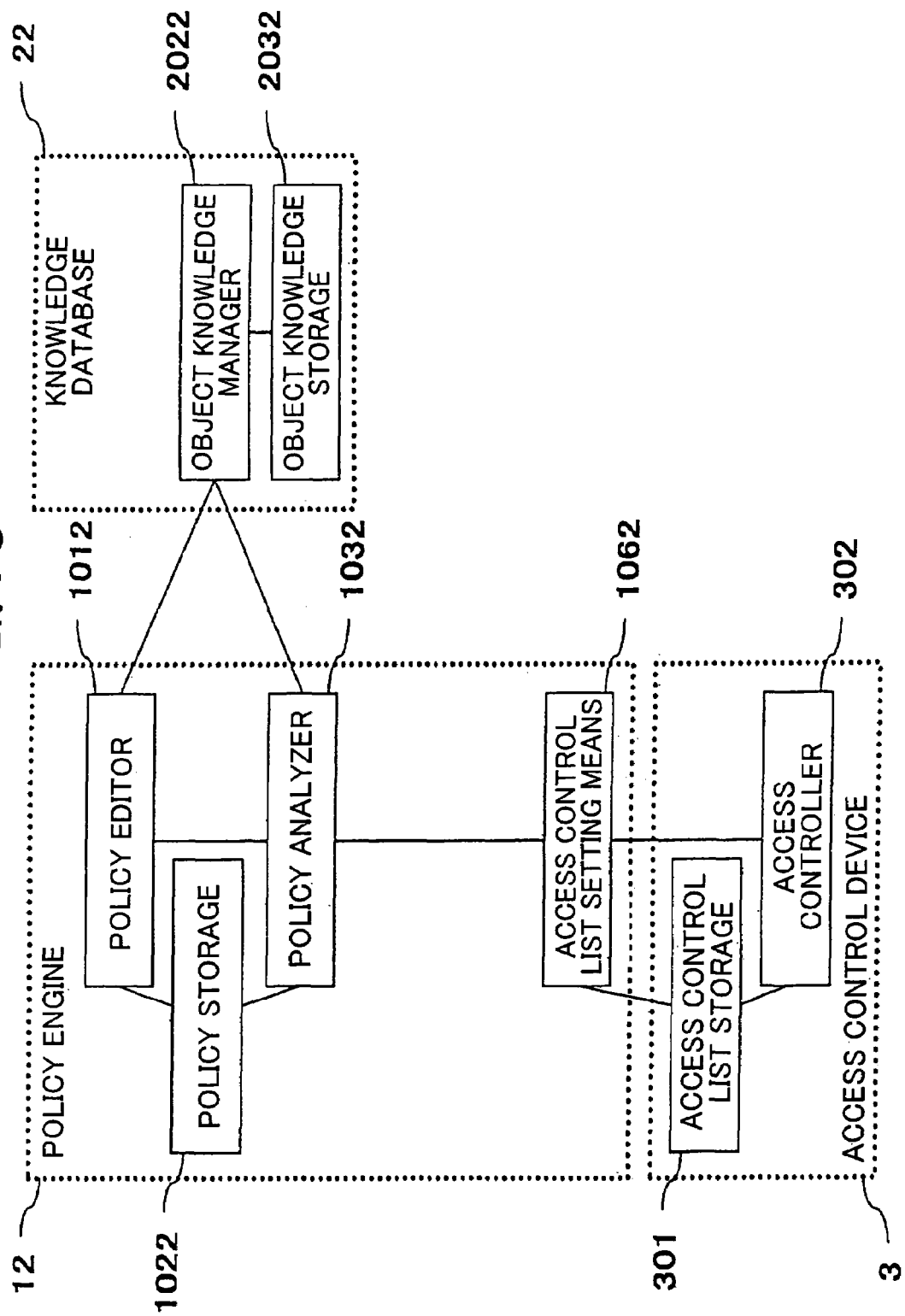

FIG.25

SCREEN FOR SELECTING A USER GROUP TO EDIT

EDIT

LIST OF EDITABLE USER GROUPS

○ MAIN OFFICE MANAGEMENT EXECUTIVE

● WHOLE COMPANY SYSTEM MANAGER

○ KANSAI OFFICE MANAGEMENT EXECUTIVE

○ POLICY MEETING MEMBER

○ BUSINESS TRANSACTION MEETING MEMBER ON FEB., 3

FIG.26

USER GROUP EDIT SCREEN

[ ENTER ]

USER GROUP NAME
MANAGEMENT EXECUTIVE MEETING ON MAR., 4

INPUT A USER ID TO ADD
UserC

[ ADD ]

LIST OF ADDED USER IDS
- ☐ UserA
- ☐ UserB

[ DELETE ]

SELECT USER GROUPS TO ADD
- ■ MAIN OFFICE MANAGEMENT EXECUTIVE
- ☐ WHOLE COMPANY SYSTEM MANAGER
- ■ KANSAI OFFICE MANAGEMENT EXECUTIVE
- ☐ POLICY MEETING MEMBER
- ☐ BUSINESS TRANSACTION MEETING MEMBER ON FEB., 3

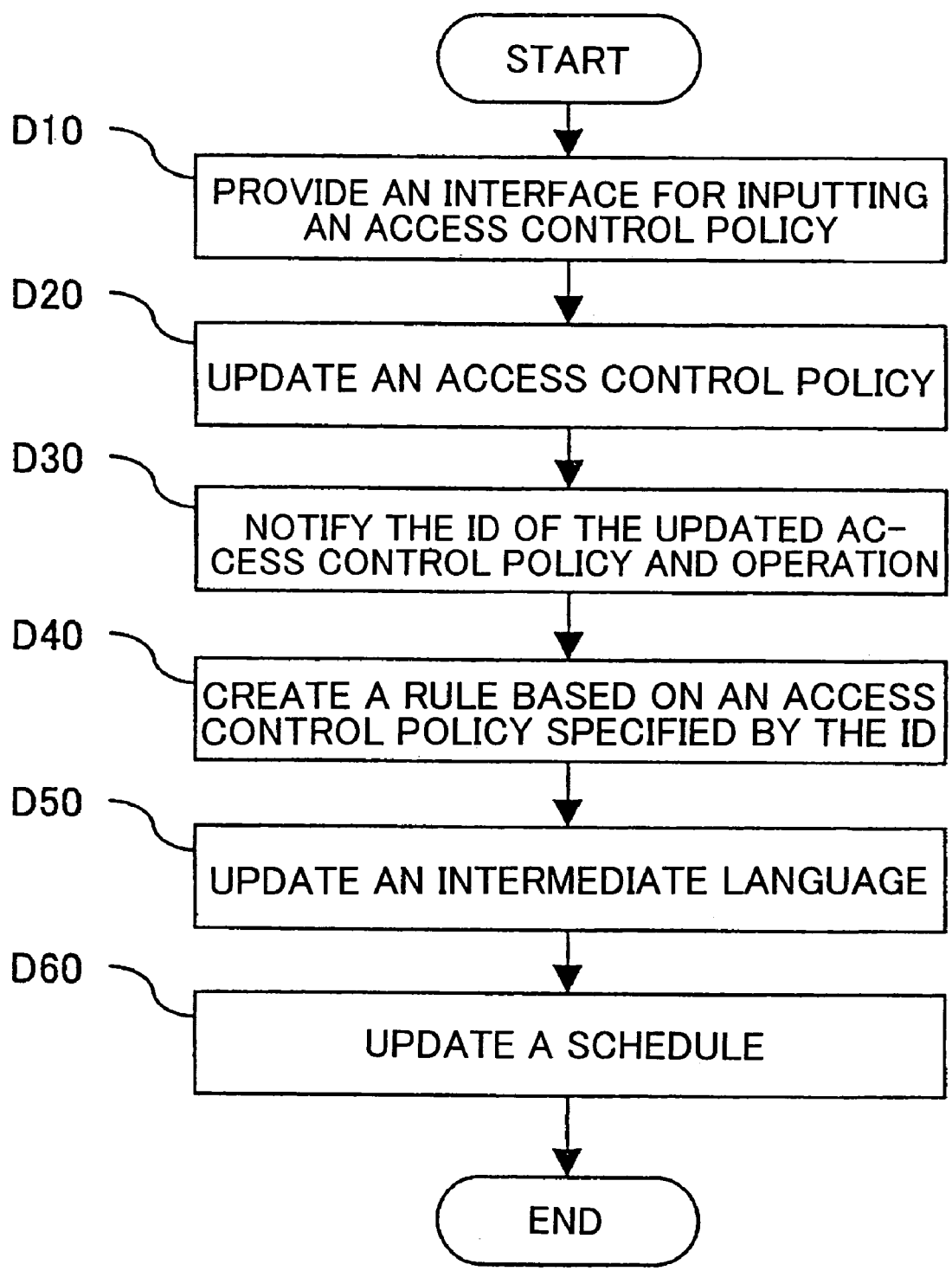

FIG.29

POLICY EDIT SCREEN

[POLICY ENTER] [EDIT STOP]

EXPLANATION OF POLICY

NEW SYSTEM INTRODUCTION MEETING ON FEB. 3

USER GROUP SELECTION (CHECK ALL THAT APPLY)

- ☐ OPERATION MEETING MEMBER
- ☐ DEVELOPMENT MEETING MEMBER
- ■ NEW SYSTEM INTRODUCTION PROJECT MEMBER
- ☐ SYSTEM DESIGN NEGOTIATION MEMBER
- ☐ SYSTEM COST NEGOTIATION MEMBER

POSITION SELECTION (CHECK ALL THAT APPLY)

- ■ MAIN OFFICE MEETING ROOM A
- ☐ MAIN OFFICE MEETING ROOM B
- ☐ MAIN OFFICE MEETING ROOM C
- ☐ KANSAI OFFICE DISCUSSION ROOM A
- ■ KANSAI OFFICE DISCUSSION ROOM B

RESOURCE SELECTION (CHECK ALL THAT APPLY)

- ☐ INTER-OFFICE MAIL SERVER
- ■ MAIN OFFICE SHARED DATA SERVER
- ■ KANSAI OFFICE SHARED DATA SERVER
- ☐ PUBLIC CATALOG
- ☐ DEVELOPMENT TEAM SPECIFICATION

TIME CONDITION

| | YEAR | MONTH | DAY | TIME | |
|---|---|---|---|---|---|
| START TIME | 2004 | 02 | 03 | 13 | 00 MINUTE |
| END TIME | 2004 | 02 | 03 | 15 | 00 MINUTE |

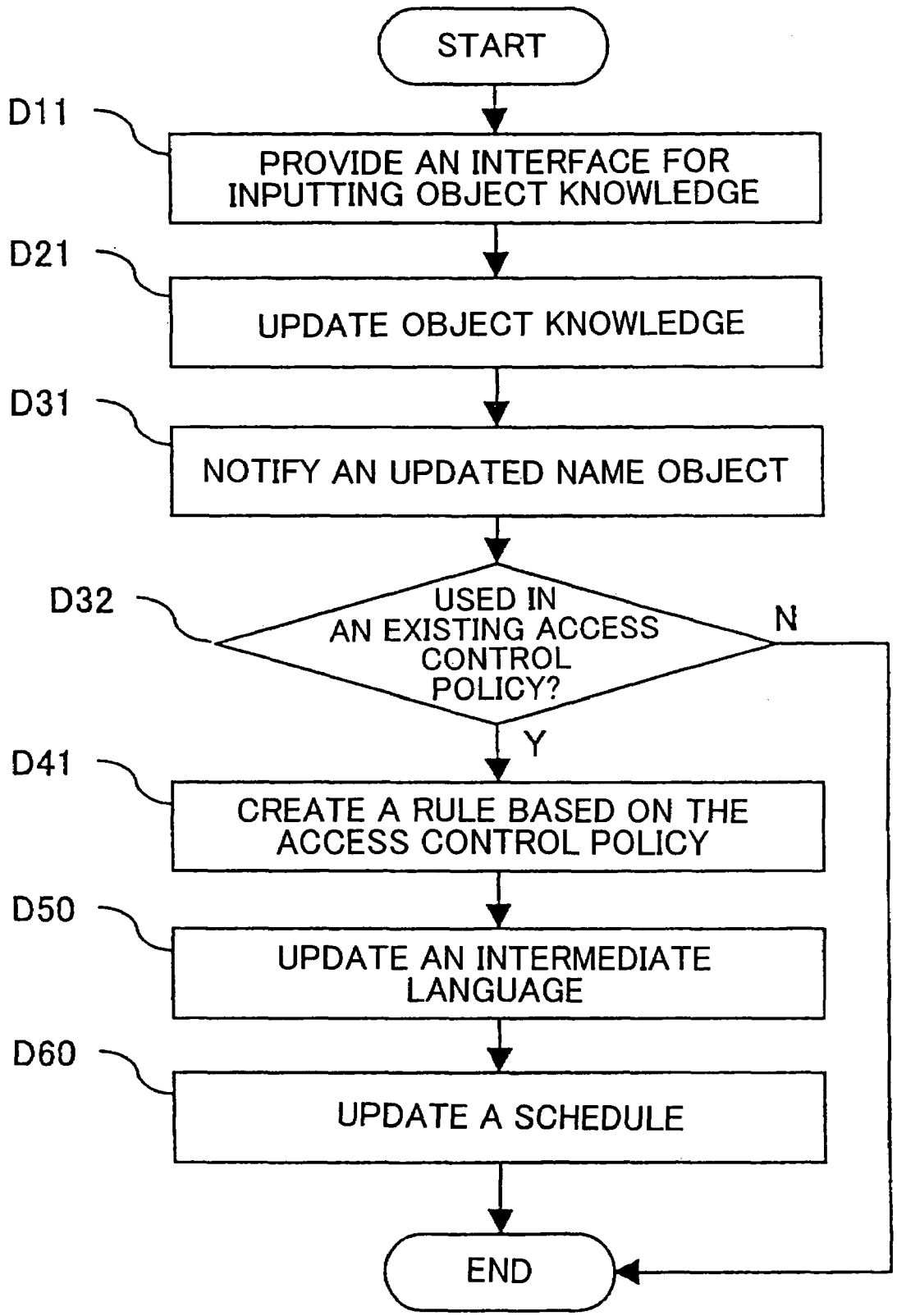

FIG.36

| IDENTIFIER | OPERATING STATE |
|---|---|
| FW001 | OPERATING |
| FW002 | OPERATING |
| FW003 | SUSPENDED |
| ... | ... |

FIG.37

| IDENTIFIER | OPERATING STATE |
|---|---|
| FW001 | OPERATING |
| FW012 | SUSPENDED |
| FW310 | OPERATING |
| ... | ... |

OBJECT KNOWLEDGE UNIT → (FW001 row)

SET OF OBJECT KNOWLEDGE

FIG.44

APRIL, 2004

| Sun | Mon | Tue | Wed | Thu | Fri | Sat |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 |  |

FIG.45

SCHEDULE IN APRIL, 2004

| 8:00 | |
|---|---|
| 9:00 | |
| 10:00 | |
| 11:00 | |
| 12:00 | |
| 17:00 | |

REGISTER SCHEDULES

SCHEDULES FROM 10:00 TO 12:00 ON APRIL 22, 2004

ACTION: MEETING ▶

LOCATION: MAIN OFFICE MEETING ROOM 2601
KANSAI BRANCH MEETING ROOM 1610

PARTICIPANT MEMBERS: A, B, C

REGISTER    CANCEL

FIG.48

| USER IDENTIFIER | CURRENT POSITION IDENTIFIER |
|---|---|
| Morita | KANSAI OFFICE |
| Nakae | HOME |
| Ogawa | MAIN OFFICE |
| ... | ... |

FIG.53

| ID | |
|---|---|
| ACCESSIBILITY | EFFECTIVE |
| USER GROUP | SUBORDINATE |
| POSITION | KANSAI OFFICE |
| COMPANION | SUPERIOR |
| RESOURCE | |

FIG.55

POLICY EDIT SCREEN

[POLICY ENTER] [EDIT STOP]

EXPLANATION OF POLICY

NEW SYSTEM OPERATION TEST ON MAY, 6

USER GROUP SELECTION (CHECK ALL THAT APPLY)

- ☐ OPERATION MEETING MEMBER
- ☐ DEVELOPMENT MEETING MEMBER
- ■ NEW SYSTEM INTRODUCTION PROJECT MEMBER
- ☐ SYSTEM DESIGN NEGOTIATION MEMBER
- ☐ SYSTEM COST NEGOTIATION MEMBER

POSITION SELECTION (CHECK ALL THAT APPLY)

- ■ MAIN OFFICE MEETING ROOM A
- ☐ MAIN OFFICE MEETING ROOM B
- ☐ MAIN OFFICE MEETING ROOM C
- ☐ KANSAI OFFICE DISCUSSION ROOM A
- ■ KANSAI OFFICE DISCUSSION ROOM B

SELECTION OF USER GROUPS TO ACCOMPANY (CHECK ALL THAT APPLY)

- ☐ CONTENT MANAGEMENT MEMBER
- ☐ SERVER OPERATION MANAGEMENT MEMBER
- ☐ NETWORK DEVICE SETTING MEMBER
- ■ MAIN OFFICE SYSTEM MANAGEMENT MEMBER
- ■ KANSAI OFFICE SYSTEM MANAGEMENT MEMBER

RESOURCE SELECTION (CHECK ALL THAT APPLY)

- ☐ MAIN OFFICE SYSTEM MANAGEMENT DATA SERVER
- ☐ KANSAI OFFICE SYSTEM MANAGEMENT DATA SERVER
- ■ NEW NETWORK MANAGEMENT SERVER
- ☐ NEW DOMAIN SERVER
- ■ NEW GROUP SERVER

FIG.58

ACCESS CONTROL POLICY

| ID | QAZWSXEDCRFVTGBYHNUJMIKOLP |
|---|---|
| ACCESSIBILITY | PERMITTED |
| USER GROUP | SUBORDINATE |
| POSITION | KANSAI OFFICE |
| COMPANION | SUPERIOR |
| RESOURCE | KANSAI PERSONNEL MANAGEMENT SERVER |

FIG.59

INTERMEDIATE LANGUAGE

| ID | | QAZWSXEDCRFVTGBYHNUJMIKOLP |
|---|---|---|
| ACCESSIBILITY | | PERMITTED |
| USER ID | | Morita |
| ACCESS SOURCE | IP ADDRESS | 3.2.1.0/24 |
| | PORT NO. | * |
| ACCESS DESTINATION | IP ADDRESS | 1.2.3.4 |
| | PORT NO. | 12345 |

FIG.60

ACCESS CONTROL LIST

| Permit tcp 3.2.1.0/255.255.255.0 1.2.3.4 * 12345 Morita #QAZWSXEDCRFVTGBYHNUJMIKOLP |

ACCESS CONTROL SYSTEM, ACCESS CONTROL METHOD, AND ACCESS CONTROL PROGRAM

BACKGROUND OF THE INVENTION

1. Field of the Invention

The present invention relates to an access control system, access control method, and access control program, and particularly to an access control system, access control method, and access control program which are capable of performing access control when a user who belongs to plural organizations or the user's device accesses a shared resource.

2. Description of the Related Art

There have been proposals concerning access control systems and functions usable in those systems (for example, refer to JP-A-1999-313102 (page 6, FIG. 1), JP-A-2003-140968 (pages 3 to 6, FIG. 5), JP-A-2003-241901 (pages 3 to 6, FIG. 2), and JP-A-2003-316742 (pages 3 to 6, FIG. 1)).

According to an access control list generation method disclosed in JP-A-1999-313102, an access control list describing accessing subjects and accessed objects are generated from access control rule describing constraint conditions based on types of accessing subjects, types of accessed objects, and organization structures. Further, the access control list generation method includes and uses subject type group information, object type group information, and organization structure information, to generate only those access control lists that satisfy the constraint conditions. The subject type group information relates subjects (which are accessing) directly to subject types, as well as the object type group information relates objects (which are being accessed) directly to object types. The organization structure information expresses relations between the subjects, objects, and organizations, in form of one single tree structure.

A storage disclosed in JP-A-2003-140968 is set on a network and permits only accesses at registered time points from registered locations, and inhibits the other accesses, according to a schedule management table showing when and where specific users exist.

A disk sharing control method disclosed in JP-A-2003-241901 uses a table on which a logical address is assigned to each accessing device and the logical address is converted into a physical address expressing a position on a specific physical disk device. Access control is thereby made possible on the basis of shared status of the physical disk device shared between the accessing devices.

According to an anonymous communication method disclosed in JP-A-2003-316742, user identification information attached to packets is replaced with a user authentication result and a transmission destination. At this time, the method uses an authentication means based on an ID and a password for every user, a means for distinguishing settable contents depending on the authentication result, a means which manages correspondence between a pair of a transmission source and a transmission destination and user authentication information, as a user identification information transmission policy, and a means which provides an interface for setting the user identification information transmission policy.

Conventional access control systems have a problem that access control is impossible from a user group which includes, as a member, a user who belongs to plural organizations. For example, in the access control list generation method disclosed in JP-A-1999-313102, user groups, users who are members of the user groups, and an organization structure between user groups are expressed in the form of a tree structure. Any arbitrary member is compelled to belong to only one user group. Therefore, access control is impossible with respect to any access from a user group which includes, as a member, a user who belongs to plural groups.

When updating an access control list, efficiency in updating of the access control list should preferably be promoted by deleting or generating only such a part of the access control list that needs to be changed. However, according to conventional access control methods and access control devices, it is impossible to specify a range in an access control list that needs to be changed. Therefore, conventional methods and devices have not achieved promoted efficiency in updating of an access control list.

SUMMARY OF THE INVENTION

An object of the present invention is to provide an access control system, access control method, and access control program which can generate an access control list concerning a user group which includes, as a member, a user who belongs to plural organizations. Another object of the present invention is to provide an access control system, access control method, and access control program which can efficiently update the access control list.

According to the present invention, there is provided an access control system comprising: a knowledge database configured to store (i) information indicative of a relationship between a group of users or devices that use at least a resource as an access destination, and user identification information or device identification information capable of identifying the user or device, (ii) information indicative of a relationship between a position as an access source of access to the resource, and access source identification information capable of identifying the position, or (iii) information indicative of a relationship between the resource and access destination identification information capable of identifying the resource; and a policy engine configured to (i) store an access control policy describing at least the group, position, and resource of the information stored in the knowledge database, (ii) generate an access control list indicating accessibility/inaccessibility to an access destination from an access source by use of the access control policy and the information stored in the knowledge database, and (iii) set the access control list in an existing access control device.

The policy engine may include policy analyzer configured to generate an intermediate language as a set of rules including no description depending on a specific access control device, by replacing at least the position and resource among contents written in the access control policy, with access source identification information and access destination identification information, respectively, by use of the information stored in the knowledge database.

The policy analyzer may be configured to generate the rules constituting the intermediate language, based on an updated access control policy. According to this configuration, the access control list can be efficiently updated.

The knowledge database may include a knowledge storage configured to store (i) information indicative of a relationship between a group and user identification information or device identification information, as a directional graph having a path from one group to another group, user identification information, or device identification information, (ii) information indicative of a relationship between a position and access source identification information, as a directional graph having a path from one position to another position or access source identification information, and (iii) information indicative of a relationship between a resource and access destination identification information, as a directional graph having a path from one resource to another resource or access destination identification information.

The knowledge database may include: a knowledge storage configured to store (i) information indicative of a relationship between a group and user identification information or device identification information, as a directional graph having a path from one group to another group, user identification information, or device identification information, (ii) information indicative of a relationship between a position and access source identification information, as a directional graph having a path from one position to another position or access source identification information, and (iii) information indicative of a relationship between a resource and access destination identification information, as a directional graph having a path from one resource to another resource or access destination identification information; and update group notification means configured to notify the policy engine of information of a group, position, or resource concerning an updated part of the directional graph, when a directional graph stored in the knowledge storage is updated. The policy engine may include policy specification means configured to specify an access control policy including the information of a group, position, or resource notified by the update group notification means. The policy analyzer may be configured to generate a rule constituting an intermediate language, based on the access control policy specified by the policy specification means. According to this configuration, when a directional graph is updated, the access control list can be efficiently updated.

The access control system may further comprise a presence manager configured to (i) maintain information on a current position of each user, and (ii) notify the knowledge database of movement information including at least user identification information on the user who has moved and current position identification information capable of identifying a movement destination thereof, when a current position has changed in accordance with a movement of a user. In the system, the knowledge storage may be configured to store information indicative of a relationship between the user identification information of each user and the current position identification information of each user, as a directional graph having a path from the user identification information to the current position identification information. The knowledge database may include user position information update means configured to update the directional graph, based on movement information notified by the presence manager. The update group notification means may be configured to notify the policy engine of user identification information concerning an updated part, when the directional graph is updated by the user position information update means. The policy specification means may be configured to specify an access control policy, based on user identification information notified by the update group notification means. The policy analyzer may be configured to generate a rule constituting an intermediate language, based on the access control policy specified by the policy specification means. According to this configuration, when a user moves, the access control list can be efficiently updated.

The access control system may further comprise: a presence manager is configured to (i) maintain information of a current position of each user or each device, and (ii) notify the knowledge database of movement information including at least user identification information on the user who has moved or device identification information on the device which has moved and current position identification information capable of identifying a movement destination thereof, when a current position has changed in accordance with a movement on a user or device; and a knowledge analyzer is configured to (i) determine information which should be transferred to the policy specification means, of the information stored in the knowledge database, and (ii) transfer the information determined to the policy specification means from the knowledge database. In the system, the policy specification means may include a policy storage configured to store an access control policy in which a condition to make the access control policy itself effective is described, said access control policy describing, as a companion, a user or device overlapping or different from a user or device corresponding to a group. The knowledge storage may be configured to store information indicative of a relationship between user identification information on each user or device identification information on each user and current position identification information on each user or each device, as a directional graph having a path from the user identification information or device identification information to the current position identification information. The knowledge database may include position information update means configured to update the directional graph, based on movement information notified by the presence manager. The update group notification means is configured to notify the policy engine of user identification information or device identification information concerning an updated part, when the directional graph is updated by the position information update means. The policy specification means may be configured to (i) output information on a group of users or devices and a companion, which is described in each access control policy, to the knowledge analyzer, (ii) input thereby each user identification information or each device identification information corresponding to the group of users or devices and the companion from the knowledge analyzer, (iii) specify an access control policy, based on the inputted user identification information or device identification information and based on the user identification information or device identification information notified by the update group notification means, (iv) output each user identification information or each device identification information corresponding to a group and companion written in the specified access control policy to the knowledge analyzer, (v) input thereby current position identification information on each user or each device corresponding to said each user identification information or each device identification information, from the knowledge analyzer, and (vi) determine an access control policy which is made effective based on the inputted information and based on a condition described in the access control policy. The policy analyzer is configured to generate a rule constituting an intermediate language, based on the access control policy specified by the policy specification means. According to this configuration, when a user and companion move, an effective access control policy is selected on condition that the user and companion has a particular relationship with each other, and then, the access control can be performed based on the effective access control policy satisfying the condition.

The access control system may further comprise a system configuration manager configured to (i) maintain information concerning operating states of plural access control devices connected to a policy engine, and (ii) notify the knowledge database of configuration information including identification information on the access control device and information on the operating state thereof after having changed, when an operating state of an access control device has changed. In the system, the knowledge storage may be configured to store information indicative of a relationship between identification information on each access control device and an operating state thereof, as a directional graph having a path from the identification information on each access control device to the operating state thereof. The knowledge database may include operating state update means configured to update the directional graph, based on the configuration information notified by the system configuration manager. The update group notification means may be configured to notify identification information on an access control device concerning an updated part, when the directional graph is updated by the operation state update means, to the policy engine. The policy specification means is configured to specify an access control policy, based on the identification information on the access control device notified by the update group notification means. The policy analyzer is configured to generate a rule constituting an intermediate language, based on the access control policy specified by the policy specification means. According to this configuration, when an operating state of an access control device changes, the access control list can be efficiently updated.

The knowledge database may include a knowledge manager configured to make said knowledge storage search for a directional graph from a group, a position or a resource, to extract a set of user identification information items or device identification information items, a set of access source identification information items, or a set of access destination identification items.

The knowledge database may include a directional graph editor configured to provide an user interface for editing a directional graph stored in the knowledge storage.

The directional graph editor may be configured to provide a user interface including a selection column to select another group to which a path extends from one group, an input column to input a user identification information item or device identification information item to which a path extends from the one group, and an instruction column to instruct a user identification information item or device identification information item to delete, among user identification information items or device identification information items to which paths extend from the one group.

The directional graph editor may be configured to provide a user interface including a selection column to select another position to which a path extends from one position, an input column to input an access source identification information item to which a path extends from the one position, and an instruction column to instruct an access source identification information item to delete, among access source identification information items which paths extend from the one group.

The directional graph editor is configured to provide a user interface including a selection column to select another resource to which a path extends from one resource, an input column to input an access destination identification information item to which a path extends from the one resource, and an instruction column to instruct an access destination identification information item to delete, among access destination identification information items to which paths extend from the one group.

The policy engine may include: a policy analyzer configured to generate an intermediate language as a set of rules including no description depending on a specific access control device, by replacing at least the position and resource among contents written in the access control policy, with access source identification information and access destination identification information, respectively, by use of the information stored in the knowledge database; and access control list setting means configured to (i) convert the generated intermediate language into an access control list corresponding to a type of a access control device as a setting target in which the access control list is to be set, and (ii) set the access control list in the access control device.

The policy analyzer may be configured to generate a rule constituting an intermediate language, based on the updated access control policy, and gives the rule an ID of the access control policy as a generation source. The access control list setting means may be configured to (i) generate a line as a constitutional element of the access control list, based on the rule, (ii) give the line as a generation source an ID given to the rule, and if a part of a rule is newly generated by the policy analyzer, and (iii) update the line given the same ID as that given to the generated rule. According to this configuration, the access control list can be efficiently updated.

The policy engine may include a policy editor is configured to provide a user interface for editing at least a group, position, and resource of information included in an access control policy.

The policy editor may be configured to (i) display a list of groups, a list of positions, and a list of sources, and (ii) provide a user interface to accept selection of a group, position, and resource from the lists, respectively.

The policy engine may include a policy editor configured to provide a user interface for editing at least a group, position, resource, and companion of information included in an access control policy.

The policy editor may be configured to provide a user interface configured to (i) display a list of groups of users or devices that use a resource, a list of positions, a list of resources, and a list of groups of companions, and (ii) accept selection of a group of users or devices, a position, a resource, and a group of companions from the lists, respectively.

According to the present invention, there is provided an access control system comprising: a knowledge database configured to store information indicative of (i) a relationship between a group of users or devices that use at least a resource as an access destination, and user identification information or device identification information capable of identifying the user or device, (ii) a relationship between a position as an access source of access to the resource, and access source identification information capable of identifying the position, (iii) a relationship between the resource and access destination identification information capable of identifying the resource, and (iv) a relationship between user identification information on each user or device identification information on each device and current position identification information on each user or each device; a policy engine configured to (i) store an access control policy describing at least the group, position, and resource of the information stored in the knowledge database, and describing, as a companion, a user or device overlapping or different from a user or device corresponding to a group, (ii) generate an access control list indicating accessibility/inaccessibility to an access destination from an access source by use of an effective access control policy and the information stored in the knowledge database, and (iii) set the access control list in an existing access control device; and a presence manager configured to (i) maintain information on a current position of each user or each device, and (ii) notify the knowledge database of movement information including at least user identification information on the user who has moved or device identification on the device which has moved and current position identification information capable of identifying a movement destination thereof, when a current position has changed in accordance with a movement of a user or a device. In the system the knowledge database is further configured to (v) update information indicative of a relationship between user identification information on each user or device identification information on each device and the current position identification information on each user or each device, based on the movement information notified by the presence manager, and (vi) notify the policy engine of user identification information or device identification information concerning an updated part. The policy engine includes policy specification means configured to (i) output information on a group of users or devices and a companion, which is described in each access control policy, (ii) input thereby each user identification information or each device identification information corresponding to the group of users or devices and the companion, (iii) specify an access control policy, based on the user identification information or device identification information and based on the user identification information or device identification information notified by the knowledge database, (iv) output each user identification information or each device identification information corresponding to a group and companion written in the specified access control policy, (v) input thereby current position identification information on each user or each device corresponding to said each user identification information or each device identification information, and (vi) determine an access control policy which is made effective based on the inputted information and based on a condition described in the access control policy. According to this configuration, when a user and companion move, an effective access control policy is selected on condition that the user and companion has a particular relationship with each other, and then, the access control can be performed based on the effective access control policy satisfying the condition.

The policy engine may include a policy editor configured to provide a user interface for editing at least a group, position, resource, and companion of information included in an access control policy.

According to the present invention, there is provided an access control method comprising: a step in which a knowledge database stores information indicative of (i) a relationship between a group of users or devices that use at least a resource as an access destination, and user identification information or device identification information capable of identifying the user or device, (iii) a relationship between a position as an access source of access to the resource, and access source identification information capable of identifying the position, or (iii) a relationship between the resource and access destination identification information capable of identifying the resource; and a step in which a policy engine (i) stores an access control policy describing at least the group, position, and resource of the information stored in the knowledge database, (ii) generates an access control list indicating accessibility/inaccessibility to an access destination from an access source by use of the access control policy and the information stored in the knowledge database, and (iii) sets the access control list in an existing access control device.

According to the present invention, there is provided an access control method comprising: a step in which a knowledge database stores information indicative of (i) a relationship between a group of users or devices that use at least a resource as an access destination, and user identification information or device identification information capable of identifying the user or device, (ii) a relationship between a position as an access source for accessing the resource, and access source identification information capable of identifying the position, (iii) a relationship between the resource and access destination identification information capable of identifying the resource, and (iv) a relationship between user identification information on each user or device identification information on each device and current position identification information on each user or each device; a step in which a policy engine stores an access control policy describing at least the group, position, and resource of the information stored in the knowledge database, and describing, as a companion, a user or device overlapping or different from a user or device corresponding to a group; a step in which a presence manager (i) maintains information on a current position of each user or each device, and (ii) when a current position has changed in accordance with a movement of a user or a device, notifies the knowledge database of movement information including at least user identification information on the user who has moved or device identification information on the device which has moved and current position identification information capable of identifying a movement destination thereof; a step in which said knowledge database (i) updates information indicative of a relationship between user identification information on each user or device identification information on each device and the current position identification information on each user or each device, based on the movement information notified by the presence manager, and (ii) notifies the policy engine of user identification information or device identification information concerning an updated part; a step in which said policy engine (i) outputs information on a group of users or devices and a companion, which is described in each access control policy, (ii) inputs thereby each user identification information or each device identification information corresponding to the group of users or devices and the companion, (iii) specifies an access control policy, based on the inputted user identification information or device identification information and based on the user identification information or device identification information notified by the knowledge database, (iv) outputs each user identification information or each device identification information corresponding to a group and companion written in the specified access control policy, (v) inputs the current position identification information on each user or each device corresponding to said each user identification information or each device identification information, and (vi) determines an access control policy which is made effective based on the inputted information and based on a condition described in the access control policy; and a step in which said policy engine (i) generates an access control list indicative of accessibility/inaccessibility from an access source to an access destination, by use of the access control policy determined as being effective and the information stored in the knowledge database, and (ii) sets the access control list in an existing access control device. According to this method, when a user and companion move, an effective access control policy is selected on condition that the user and companion has a particular relationship with each other, and then, the access control can be performed based on the effective access control policy satisfying the condition.

According to the present invention, there is provided an access control program for making a computer execute a processing, the computer comprising a policy storage connected to a knowledge database which stores information indicative of: a relationship between a group of users or devices that use at least a resource as an access destination, and user identification information or device identification information capable of identifying the user or device; a relationship between a position as an access source of access to the resource, and access source identification information capable of identifying the position; or a relationship between the resource and access destination identification information capable of identifying the resource, and the policy storage storing an access control policy describing at least the group, position, and resource of the information stored in the knowledge database. In the program, the processing includes: a step of generating an access control list indicating accessibility/ inaccessibility to an access destination from an access source by use of the access control policy and the information stored in the knowledge database; and a step of setting the access control list in an existing access control device.

According to the present invention, there is provided an access control program for making a computer execute a processing, the computer comprising a policy storage connected to a knowledge database which stores information indicative of: a relationship between a group of users or devices that use at least a resource as an access destination, and user identification information or device identification information capable of identifying the user or device; a relationship between a position as an access source for accessing the resource, and access source identification information capable of identifying the position; a relationship between the resource and access destination identification information capable of identifying the resource; or a relationship between user identification information on each user or device identification information on each device and current position identification information on each user or each device, and the policy storage storing an access control policy describing at least the group, position, and resource of the information stored in the knowledge database, and describing, as a companion, a user or device overlapping or different from a user or device corresponding to a group. In the program, the processing includes: (i) an update information input step of inputting user identification information or device identification information concerning an update part in the information indicative of the relationship between user identification information on each user or device identification information on each device and current position identification information on each user or each device; (ii) an identification information input step of outputting information on a group of users or devices and a companion, which is described in each access control policy, thereby to input each user identification information or each device identification information corresponding to the group of users or devices and the companion; (iii) a specify step of specifying an access control policy, based on the user identification information or device identification information inputted in the identification information input step, and based on the user identification information or device identification information inputted by the update information input step; (iv) a current position identification information input step of outputting each user identification information or each device identification information corresponding to a group and companion written in the specified access control policy, thereby to input current position identification information on each user or each device corresponding to said each user identification information or each device identification information; (v) an effective policy determination step of determining an access control policy which is made effective based on the inputted information and based on a condition described in every access control policy; (vi) a list generation step of generating an access control list indicative of accessibility/inaccessibility from an access source to an access destination, by use of the access control policy determined as being effective and the information stored in the knowledge database; and (vii) a step of setting the access control list in an existing access control device.

According to the present invention, an access control system comprises a knowledge database which stores information indicative of a relationship between a group of users or devices that use at least a resource as an access destination, and user identification information or device identification information capable of identifying the user or device, a relationship between a position as an access source of access to the resource, and access source identification information capable of identifying the position, or a relationship between the resource and access destination information capable of identifying the resource. Since there is no restriction saying that a user or device has to belong to only one group, an access control list can be generated with respect a user group including, as member, a user who belongs to plural organizations.

BRIEF DESCRIPTION OF THE DRAWINGS

In the accompanying drawings:

FIG. 5 is a block diagram showing a first embodiment of an access control system according to the present invention;

FIG. 6 is an explanatory table showing a specific example of an access control policy;

FIG. 7 is an explanatory table showing a specific example of an intermediate language;

FIG. 8 is an explanatory table showing a specific example of an access control policy;

FIG. 9 is an explanatory table showing another specific example of an access control policy;

FIG. 10 is an explanatory table showing an example of plural rules;

FIG. 11 is an explanatory table showing an example of plural rules;

FIG. 12 is an explanatory table showing a specific example of another access control list;

FIG. 13 is a flowchart showing an example of operation of the access control system according to the first embodiment;

FIG. 15 is an explanatory view showing a user interface for editing an access control policy;

FIG. 17 is a flowchart showing an example of progress of an access control list generation processing;

FIG. 18 is an explanatory table showing an example of lines in case where user IDs included in one rule are written together in one line;

FIG. 19 is a block diagram showing a second embodiment of the access control system according to the present invention;

FIG. 25 is an explanatory view showing an example of a user interface used for selecting a name object;

FIG. 26 is an explanatory view showing a specific example of a user interface for editing the object knowledge;

FIG. 28 is a flowchart showing an example of progress of a processing in case where an access control policy is edited and an event is registered;

FIG. 29 is an explanatory view showing an example of a user interface for editing, which has a column to input time;

FIG. 30 is a flowchart showing an example of progress of a processing in case where object knowledge is edited and an event is registered;

FIG. 36 is an explanatory table showing an example of a data configuration of configuration information;

FIG. 37 is an explanatory table of an example of an object knowledge unit;

FIG. 44 is an explanatory view showing an example of a user interface for inputting a schedule;

FIG. 45 is an explanatory view showing an example of a user interface for inputting a schedule;

FIG. 48 is an explanatory table showing an example of information stored in a database included in a presence manager;

FIG. 53 is an explanatory table showing an example of a data configuration of an access control policy in a ninth embodiment;

FIG. 55 is an explanatory view showing an interface for editing an access control policy in the ninth embodiment;

FIG. 58 is an explanatory table showing an example of an access control policy in the ninth embodiment;

FIG. 59 is an explanatory table showing an example of a rule in the ninth embodiment; and FIG. 60 is an explanatory table showing an example of a line in the ninth embodiment.

DETAILED DESCRIPTION OF THE PREFERRED EMBODIMENTS

Figure 1:
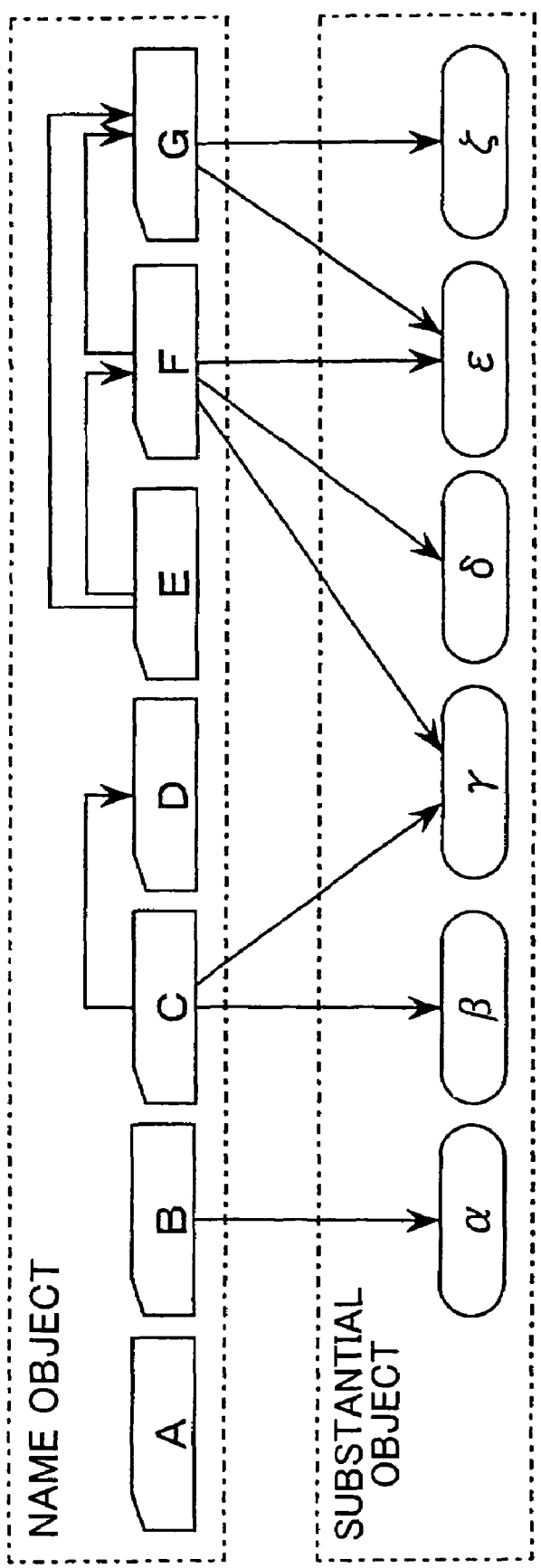
FIG. 1 is an explanatory view showing an example of a data configuration of object knowledge.

Embodiments of the present invention will be described below with reference to the drawings. Terms used in the description of the present invention will be explained first.

An "access control list" is a list of information indicating whether an access from an access source to an access destination is permitted or not. Listed information is generally described in units of lines. Hence, each of listed individual information items (each indicating permission or inhibition of an access from an access source to an access destination) is called a "line" hereinafter. However, a listed information item need not always be described for every line. Although an "intermediate language" described later is expressed in a description format independent of a particular access control device, access control lists are expressed in description formats dependent on various access control devices.

An "access control policy" is a set of setting information items for sharing resources (access destinations) in an adhoc group. The "adhoc group" is defined by grouping users having a predetermined attribute. Users who belong to an adhoc group are not fixed but dynamically change. That is, if a user has a predetermined attribute, the user belongs to an adhoc group thereof. If the user loses the predetermined attribute, the user is excluded from the adhoc group. An attribute of a user may be, for example, a user group to which the user belongs, a location of the user, time (or a time band) at which the user is accessible to a resource, or the like. A description of an access control policy includes, for example, a user group, a location of a user, a name of a resource, time (or a time band) at which the user is accessible to the resource. An example of the user group may be an affiliation such as a division or department, a project team, an official position, or the like. An example of the location of a user may be a main office, a room, or the like. An example of the resource may be a device as an access destination, a file, an application software, or the like. These attributes except for the time may be defined as conditions to belong to the adhoc group. For example, "what the user is doing now or user's situation" may be an attribute of a user. More specifically, "on the phone", "serving a customer/in a meeting", "mealtime", "commuting", "sleeping/napping", "busy", or the like may be an attribute of a user. Alternatively, for example, "workflow (progress of work)" or the like may be an attribute of a user. More specifically, "xxx work finished", "check passed", "at stage xxx", "having/carrying xxx", or the like may be an attribute of a user. Alternatively, for example, "system environment used by a user", or the like may be an attribute of a user. More specifically, "OS type/version", "status of patch/virus check", configuration/introduction/environment of hardware or software", or the like may be an attribute of a user.

An "object" may be data expressing a content (user group, location, resource, or the like) described in an access control policy or data related to the data. Of "objects", those that express contents such as a user group, location, resource, and the like described in an access control policy will be called "name objects". Of "objects", those that are related to the "name objects" will be called "substantial objects". For example, "development team", "team leader", and the like are name objects. If a personal ID such as "i-takahashi" or "s-watanabe" is related to a name object "team leader", this ID is a substantial object. A name of a location such as "meeting room A in a main office" or the like is a name object. If an IP address "1.1.1.0/24" of an access source is related to the name object "main-office meeting room A", the IP address of the access source is a substantial object. A name of a resource "KANSAI-office shared-data server" or the like is a name object. IF an IP address "9.9.9.9" and port numbers "80" and "443" of an access destination are related to the name object "KANSAI-office shared-data server", the combination of the IP address and port numbers is a substantial object. However, name objects are not limited to user groups, locations, names of resources, and the like. Likewise, substantial objects are not limited to combinations of personal IDs, IP addresses of access sources, combinations of IP addresses and port numbers of access destinations. IP addresses, network domains, port numbers, protocols, and the like of access sources may be substantial objects related to name objects expressing locations. Likewise, IP addresses, network domains, port numbers, protocols, URLs, file paths, operations, authorities, and the like of access destinations may be substantial objects related to name objects expressing resources.

Access source identification information is related, as a substantial object, to a name object which is an access source, and the location of the access source can be identified by the access source identification information. Access destination identification information is related, as a substantial object, to a name object of a resource which is an access destination, and the resource can be identified by the access destination information.

"Object knowledge" is data indicative of relationships between objects. FIG. 1 is an explanatory view showing an example of a data configuration of the object knowledge. As shown in FIG. 1, the object knowledge includes information concerning name objects, substantial objects, and relationships between objects (e.g., paths from objects to other objects). These paths are directional, so that the object knowledge is expressed in the form of a directional graph. As shown in FIG. 1, each name object has no or one or more paths to other name objects or substantial subjects. Different name objects each may have a path to one identical name object or substantial object. Substantial objects do not have a path to any other object regardless of name objects or substantial objects.

However, an object having the same content as a substantial object may be included in a name object, and a path may be created from the name object to the substantial object. In this way, it is possible to prepare object knowledge in which a substantial object has substantially a path to a substantial object. For example, a personal ID such as "s-watanabe" may be regarded as a name of a user group, which may be provided with a path from "s-watanabe" to "k-satou".

Figure 2:
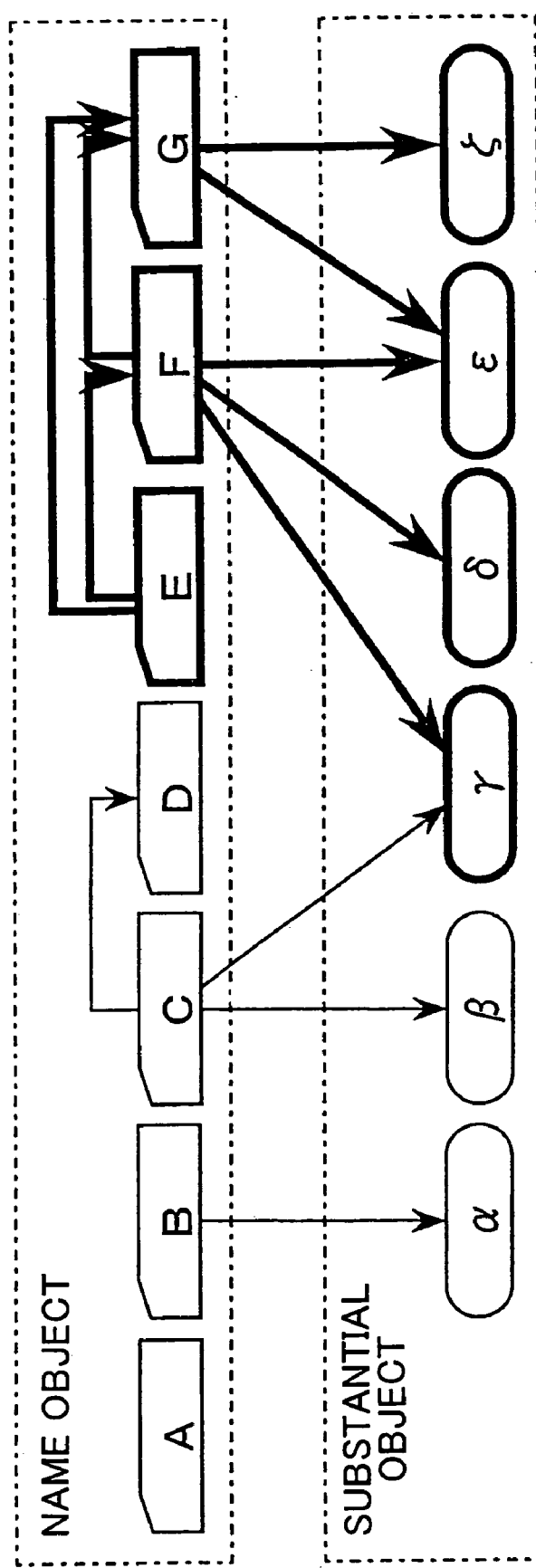
FIG. 2 is an explanatory view showing an example of expansion.

To "expand" (or expansion) is to search for a path oriented to a substantial object from a name object as a starting point and to obtain a set of substantial objects. In the course of obtaining a substantial object from a name object as a starting point, a name object may be passed. As a search technique may be, for example, a depth-weighted search or width-weighted search may be employed. However, search techniques are not limited to these ones. FIG. 2 is an explanatory view showing an example of "expansion". The example shown in FIG. 2 deals with a case of expansion from a name object "E" as a starting point. The name object "E" has paths to "F" and "G". Further, the name object "F" has paths to ",", ",", and ",", while the name object "G" has paths to "," and ",". Therefore, in the example shown in FIG. 2, ",", ",", ",", and "," are obtained by expanding the name object "E" as a starting point. If a substantial object which has already been searched for is reached, the substantial object is not obtained repeatedly. For example, suppose that the substantial object "," has already been obtained by searching the name object "F", in FIG. 2. In this case, even if the substantial object "," is reached again by searching the name object "G", "," obtained by the searching from "G" is discarded so that "," might not be obtained repeatedly. Alternatively, if a name object which has already been passed is reached again, no search is carried out from the name object. For example, in FIG. 2, the name object "F" has a path to the name object "G". Suppose that the substantial objects "," and "," have already been obtained from the name object "E" after passing through "G". In this case, if "G" is reached from the name object "F", no search is carried out from the name object "G".

When object knowledge is changed, substantial objects obtained by expansion changes. Suppose that the name object "G" is changed to have a path to the substantial object ",", in the example shown in FIG. 1. Then, "," is added to the set of substantial objects of "," and "," which are obtained by expanding the name object "G". Also, "," is added to another set of substantial objects which are obtained by expanding other name objects ("E" and "F" in the example of FIG. 1) through the name object "G". At this time, the name object ("G" in this example) whose path has been changed is called a "directly updated name object". Said other name objects ("E" and "F" in this example), a path from which passes the "directly updated name object" are called "indirectly updated name objects".

As shown in FIGS. 1 and 2, object knowledge does not have a tree structure. Although a tree structure has only one root as a starting point, every name object can become a starting point in case of object knowledge.

Figure 3:
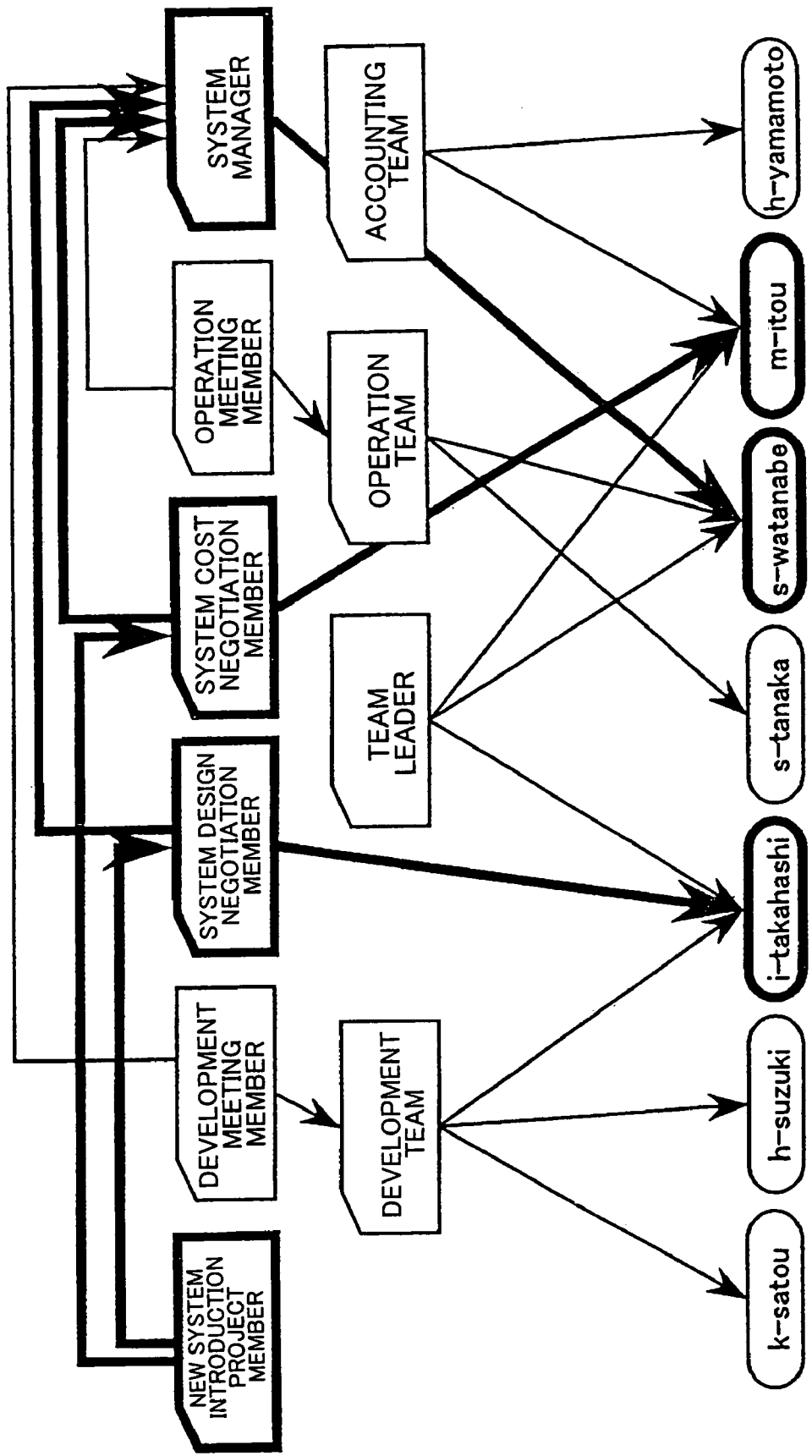
FIG. 3 is an explanatory view showing a specific example of object knowledge.

FIG. 3 shows a specific example of object knowledge. FIG. 3 exemplifies object knowledge which includes a name of user groups as name objects as well as personal IDs as substantial objects. Suppose expansion from a name object "new system introduction project member" as a starting point, in the object knowledge shown in FIG. 3. The "new system introduction project member" has paths to two name objects "system design negotiation member" and "system cost negotiation member". Further, these two name objects each have a path to a name object "system manager". Further, the "system design negotiation member", "system cost negotiation member", and "system manager" respectively have paths to substantial objects "i-takahashi", "s-watanabe", and "m-itou". Therefore, where the "new system introduction project member" is expanded, the substantial objects "i-takahashi", "s-watanabe", and "m-itou" are obtained.

Another explanation will be made of an example of object knowledge (not shown) in which names of user locations are included as name objects and IP addresses of access sources are included as substantial objects. In this case, for example, where a name object "main office meeting room A" is expanded, an IP address such as "1.1.1.0/24" is obtained. Where a name object "KANSAI office discussion room B" is expanded, IP addresses such as "2.2.2.192/26" and "3.3.3.192/26" are obtained. Likewise, a further explanation will be made of an example of object knowledge (now shown) in which names of resources are included as name objects and combinations of IP addresses and port numbers are included as substantial objects. In this case, for example, a name object "main-office shared-data server" is expanded to obtain a combination of an IP address "7.7.7.7" and port numbers "138" and "139" and another combination of an IP address "8.8.8.8" and a port number "80". Note that the names of locations and resources, IP addresses, and port numbers are mere examples.

Figure 4:
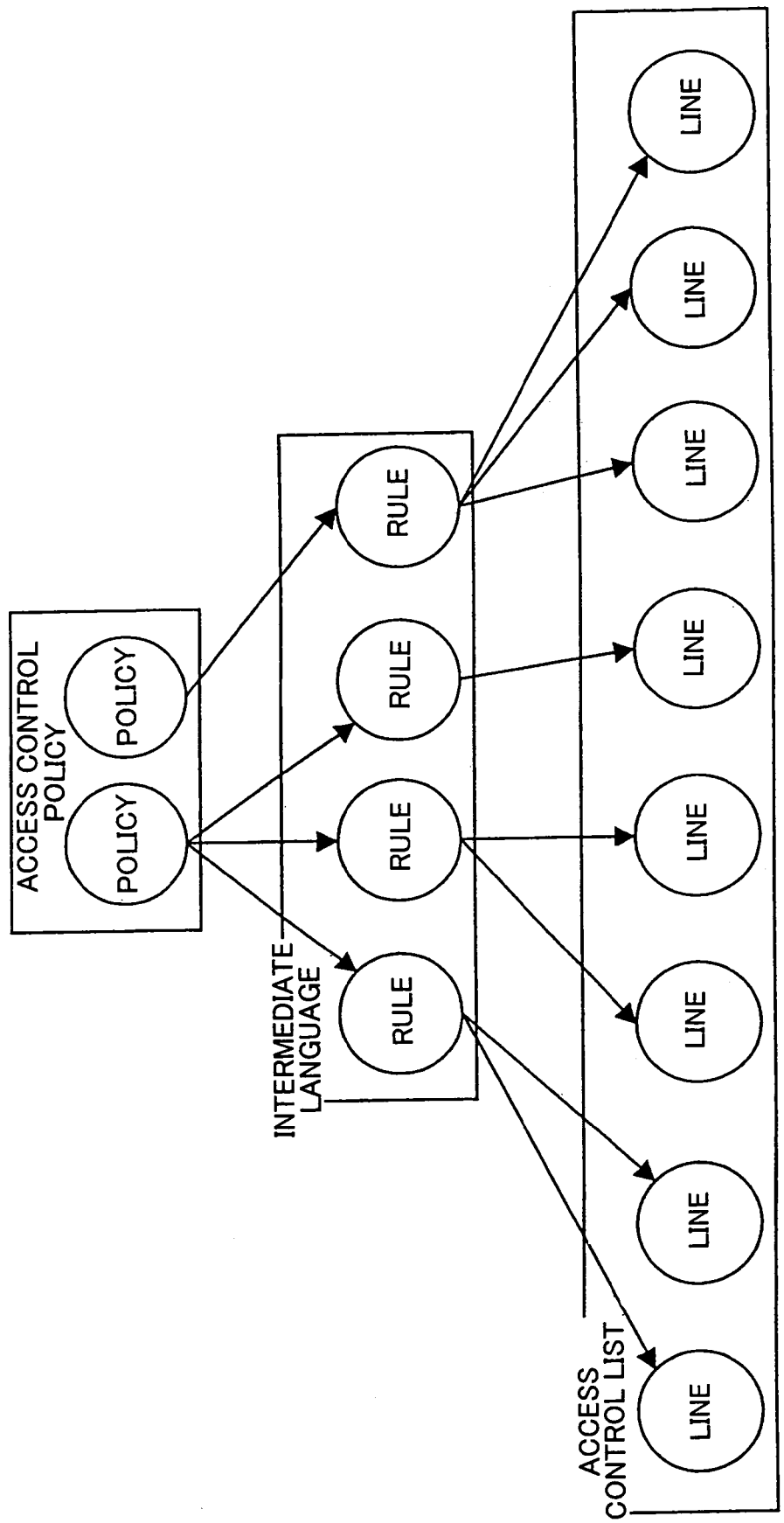
FIG. 4 is a conceptual view showing a concept on which an access control list is generated from an access control policy.

An "intermediate language" is setting information about access control described in a format independent from a specific access control device. The intermediate language includes one or plural rules each of which includes combinations of access sources and access destinations. The intermediate language is generated from access control policy. Further, an access control list is generated from the intermediate language. FIG. 4 is a conceptual view showing a concept which bases generation of an access control list from access control policy. As shown in FIG. 4, one or plural rules are generated from one access control policy. A set of those rules is an intermediate language. From every one of the rules, one or plural lines are generated. A set of those lines is an access control list.

Embodiments of the present invention will now be described.

First Embodiment

FIG. 5 is a block diagram showing a first embodiment of an access control system according to the present invention. The access control system shown in FIG. 5 has a policy engine 11 as a computer which operates under programmed control, a knowledge database 21 as one or plural data storages, and an access control device 31. The explanation below will be made of a case of an example where the policy engine 11, knowledge database 21, and access control device 31 are separate computers, respectively.

The access control device 31 may be any device as far as the device performs access control in accordance with an access control list. For example, the access control device 31 may be an access control device having a firewall or a authenticate function concerning VPN gateways, or a server which performs access control concerning accesses to stored files from outside. In this respect, the other following embodiments are identical to the present embodiment.

The policy engine 11 includes a policy editor 1011, policy storage 1021, policy analyzer 1031, and access control list setting means 1061. The knowledge database 21 includes an object knowledge manager 2021, and object knowledge storage 2031. The access control device 31 includes an access control list storage 3011, and an access controller 302.

The policy editor 1011 uses object knowledge obtained from the object knowledge manager 2021, to provide users with an user interface for editing an access control policy capable of expressing access control with respect to an adhoc group which dynamically changes. Further, the policy editor 1011 instructs the policy storage 1021 to search for, refer to, add, correct, and delete an access control policy in accordance with user's operations. When an access control policy is added, corrected, or deleted, the policy editor 1011 outputs to the policy analyzer 1031 an update notification concerning the access control policy.

The policy storage 1021 internally has a secondary storage such as a non-volatile memory or hard disk. The policy storage 1021 receives an access control policy from the policy editor 1011, and stores the access control policy into the storage. Also, the policy storage 1021 searches for, refers to, adds, corrects, and deletes an access control policy in accordance with instructions from the policy editor 1011. Also, the policy storage 1021 outputs a stored access control policy to the policy analyzer 1031 in accordance with an instruction from the policy analyzer 1031.

Upon reception of the update notification from the policy editor 1011, the policy analyzer 1031 reads in the access control policy stored in the policy storage 1021. Further, the policy analyzer 1031 generates an intermediate language, replacing name objects described in the read access control policy with sets of substantial objects obtained through the object knowledge manager 2021. The policy analyzer 1031 outputs the generated intermediate language to the access control list setting means 1061.

The setting means 1061 receives the intermediate language from the policy analyzer 1031, and generates an access control list to be used in the access control device 31, from the intermediate language. The setting means 1061 outputs the access control list to an access control list storage 3011, and updates an existing access control list stored in the access control list storage 3011, by replacing the existing access control list with the list generated from the intermediate language. After updating the access control list, the access control list setting means 1061 instructs an access controller 302 to change the setting of access control.

The policy editor 1011 is constituted by, for example, a CPU which operates in accordance with programs, an input device (a keyboard, mouse, or the like), and an output device (a display device or the like). The policy storage 1021 is constituted by, for example, a CPU which operates in accordance with programs and a storage. The policy analyzer 1031 is constituted by, for example, a CPU which operates in accordance with programs. The access control list setting means 1061 is constituted by, for example, a CPU which operates in accordance with programs, and a communication interface to the access control device 31. A common CPU may be used in place of the CPUs constituting the means as described above. In this respect, the other following embodiments are identical to the present embodiment.

The access control list storage 3011 has a storage which stores the access control list used by the access control device 31. The access control list storage 3011 receives instructions and access control list from the access control list setting means 1061, and updates the stored access control list. The access control list storage 3011 outputs the stored access control list to the access controller 302 in accordance with an instruction of the access controller 302.

Upon reception of an instruction of changing the setting of access control from the access control list setting means 61, the access controller 302 reads in the access control list stored in the access control list storage 3011, and changes the setting of access control in accordance with the contents of the instruction. Then, in accordance with the changed setting, access control is actually performed on network connections.

The access control list storage 3011 is constituted by, for example, a CPU which operates in accordance with programs, a storage, and a communication interface to the policy engine 11. The access controller 302 is constituted by a CPU which operates in accordance with programs, and a communication interface to the policy engine 11. A common CPU may be used in place of these CPUs that constitute the means as described above. In this respect, the other following embodiments are identical to the present embodiment.

The object knowledge manager 2021 instructs the object knowledge storage 2031 to search for and refer to object knowledge, in response to a request for a list of name objects and a request for a set of zero or more substantial objects expanded from a name object, from the policy editor 1011 and the policy analyzer 1031. Then, the object knowledge manager 2021 outputs a result obtained from the object knowledge storage 2031 to the policy editor 1011 and the policy analyzer 1031.

The object knowledge storage 2031 has a storage which stores object knowledge. The object knowledge storage 2031 searches for and refers to object knowledge, in response to an instruction from the object knowledge manager 2021. Then, the object knowledge storage 2031 outputs a result of search or the like to the object knowledge manager 2021. The object knowledge storage 2031 stores object knowledge which includes names of groups as name objects, object knowledge which includes names of locations as name objects, or object knowledge which includes names of resources as name objects. Alternatively, every one of these types of object knowledge may be stored. In addition, another type of object knowledge than those described above may be stored.

The object knowledge manager 2021 is constituted by, for example, a CPU which operates in accordance with programs, and a communication interface to the policy engine 11. The object knowledge storage 2031 is constituted by, for example, a CPU which operates in accordance with programs, and a storage. A common CPU may be used in place of the CPUs constituting the means as described above. In this respect, the other following embodiments are identical to the present embodiment.

The access control system according to the first embodiment has the structure as described above. Therefore, when an access control policy is edited through the user interface provided by the policy editor 1011, an intermediate language is generated from the access control policy, using object knowledge. Then, an access control list is generated from the intermediate language.

Next, explanation will be made of specific examples of access control policies, an intermediate language, and an access control list. FIG. 6 is a table explaining a specific example of an access control policy. The access control policies have IDs to specify individual access control policies. The "ID" of each access control policy is assigned by the policy editor 1011 (or by the policy storage 1021) when an access control policy is newly created. The "accessibility" indicates whether an access is permitted or not when conditions concerning the "user group", "location", and "resource" are satisfied. Zero or more name objects are written in each of the columns of the "user group", "location" (e.g., the location of the user as an access source), and "resource" (e.g., the resource as an access destination). If no name object is written, it clarifies that no substantial object corresponds to the location or the like. Name objects written in access control policies are included in the object knowledge stored in the knowledge database 21.

FIG. 7 is a table explaining a specific example of an intermediate language. The intermediate language has an "ID" which specifies an access control policy as a generation source. Also, the intermediate language includes "accessibility" which indicates whether access is permitted or not. Further, the intermediate language includes users' personal IDs (hereinafter called "user IDs") expanded from a user group written in an access control policy. The intermediate language also includes information concerning access sources (e.g., IP addresses, port numbers, protocols, or the like of access sources) expanded from locations written in an access control policy. In addition, the intermediate language includes information concerning access destinations (e.g., IP addresses, port numbers, protocols, or the like of access destinations) expanded from resources written in the access control policy.

The user IDs "UserA" and "UserB" shown in FIG. 7 are substantial objects expanded from the "policy meeting member" shown in FIG. 6. Similarly, access source information "1.1.1.0/255.255.255.0" or the like in FIG. 7 is a substantial object expanded from the "main-office meeting room A" shown in FIG. 6 or the like. "3.3.3.3:138(tcp)" shown in FIG. 7 is a substantial object expanded from the "main-office data file server" or the like.

FIG. 8 is a table explaining a specific example of an access control list. In the example of access control list shown in FIG. 8, each line consists of a set of accessibility, a protocol, an access source IP address, an access destination IP address, an access source port number, an access destination port number, and a user ID. A set of lines constitutes an access control list. Each lines is generated by extracting and combining one element from each of the categories "accessibility", "user ID", "access source", and "access destination" in the intermediate language.

The intermediate language also includes rules including sets of substantial objects as access sources and sets of substantial objects as access destinations. Each rule describes the ID of an access control policy as a generation source. The example in FIG. 7 shows a case of including only one rule generated from an access control policy. FIG. 9 shows another example of an access control policy. FIGS. 10 and 11 show nine rules generated from the access control policy shown in FIG. 9. Thus, one or plural rules are generated from one access control policy. FIG. 12 shows an example of an access control list generated from the nine rules shown in FIGS. 10 and 11. However, FIG. 12 shows a partial excerption from the access control list generated from the nine rules.

Operations will now be described below.

Figure 14:
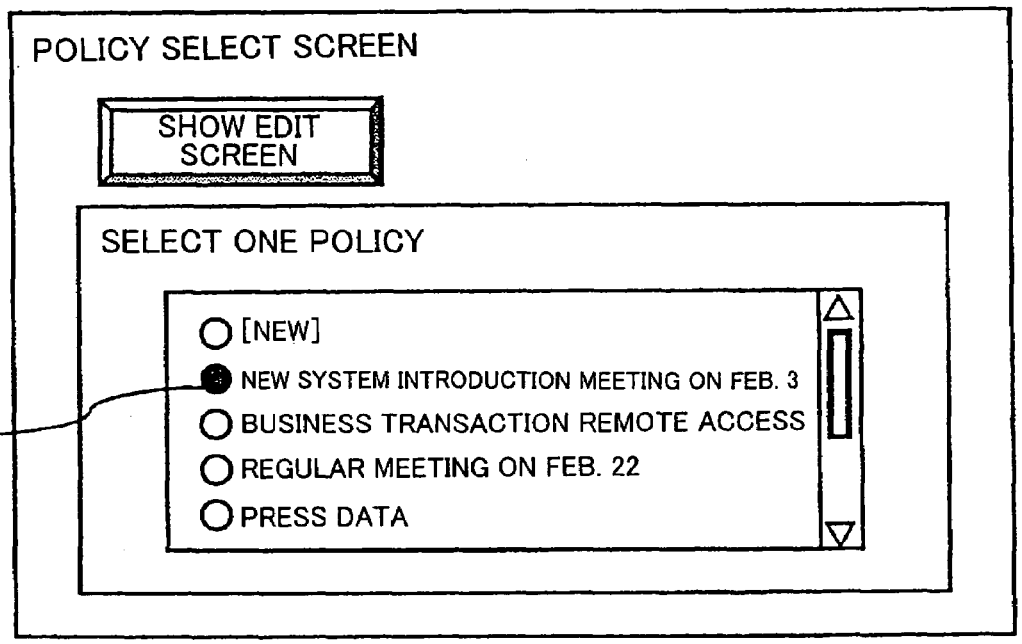
FIG. 14 is an explanatory view showing a user interface used for selecting an access control policy.

FIG. 13 is a flowchart showing an example of operation of the access control system according to the present embodiment. At first, the policy editor 1011 presents a user a user interface to edit access control policies (step A10). FIGS. 14 and 15 show examples of the user interface presented in the step A10. FIG. 14 shows a user interface used to select an access control policy. FIG. 15 shows a user interface for editing an access control policy. The policy editor 1011 requests a list of access control policies from the policy storage 1021 so that the user can select a policy to refer to or edit from the list of existing access control policies which the user can refer to or edit, in the step A10. The policy editor 1011 shows the list on the user interface (see FIG. 14). The policy editor 1011 displays selection buttons 51 together with the list to prompt the user to select an access control policy, as shown in FIG. 14.

The policy editor 1011 requests a selected access control policy from the policy storage 1021, and shows an edit interface for editing an access control policy, as shown in FIG. 15. At this time, the policy editor 1011 requests a list of name objects corresponding to the categories of "user group", "location", and "resource" from the object knowledge manager 2021. The policy editor 1011 then displays the list of name objects obtained from the object knowledge manager 2021. Note that the object knowledge manager 2021 extracts a list of name objects from the object knowledge storage 2031 in response to the request from the policy editor 1011, and outputs the list to the policy editor 1011.

In the example shown in FIG. 15, the policy editor 1011 displays a list of name objects of user groups together with select buttons in the column of "user group selection". Similarly, a list of name objects of locations together with select buttons, and another list of name objects of resources together with select buttons are displayed respectively in the columns of "position selection" and "resource selection". At this time, in accordance with the contents described in a policy control list obtained from the policy storage 1021, the policy editor 1011 displays select buttons corresponding to contents which have already been set, in a predetermined display form. In the example shown in FIG. 15, select buttons corresponding to contents which have already been set are displayed in black. The policy editor 1011 prompts the user to update the contents of the policy control list by clicking the select buttons shown in FIG. 15 with a mouse.

If "new" is selected on the user interface shown in FIG. 14, the policy editor 1011 need not request an access control policy from the policy storage 1021. In addition, the select buttons displayed together with the lists of name objects obtained from the object knowledge manager 2021 may be set in an initial state (e.g., displayed in white).

For example, a name of an access control policy from which the user can recognize the policy is inputted to the column of "explanation of policy" shown in FIG. 15. The policy editor 1011 makes the policy storage 1021 store the content inputted to the "explanation of policy" shown in FIG. 15 linked to the access control policy. If a list of access control policies is requested, the policy storage 1021 may output a list of names of access control policies inputted to the "explanation of policy". That is, the list of contents described in and inputted to the "explanation of policy" shown in FIG. 15, is displayed on the user interface shown in FIG. 14.

If an "edit stop" button shown in FIG. 15 is clicked with a mouse, the policy editor 1011 discards the contents edited on the user interface for editing.

If the "policy determination" button shown in FIG. 15 is clicked with a mouse, the policy editor 1011 transfers an access control policy edited on the user interface for editing and an instruction concerning addition, correction, and deletion to the policy storage 1021. The policy storage 1021 updates the access control policy in accordance with the instruction received from the policy editor 1011 (step A20).

To a newly created access control policy, the policy editor 1011 (or the policy storage 1021) adds information concerning accessibility (see FIG. 6). As the information concerning accessibility, "permitted" may be given uniformly or "not (permitted)" may be given uniformly. Alternatively, the user may be let input whether the information concerning accessibility should be "permitted" or "not permitted".

After the access control policy is updated, the policy editor 1011 transfers an update notification concerning the access control policy to the policy analyzer 1031 (step A30). Upon reception of the update notification, the policy analyzer 1031 reads all access control policies from the policy storage 1021 and analyzes the contents thereof. Then, the policy storage 1021 generates all the rules that are obtained from all the access control policies, and transfers an intermediate language as a set of those rules to access control list setting means 1061 (step A40).

Figure 16:
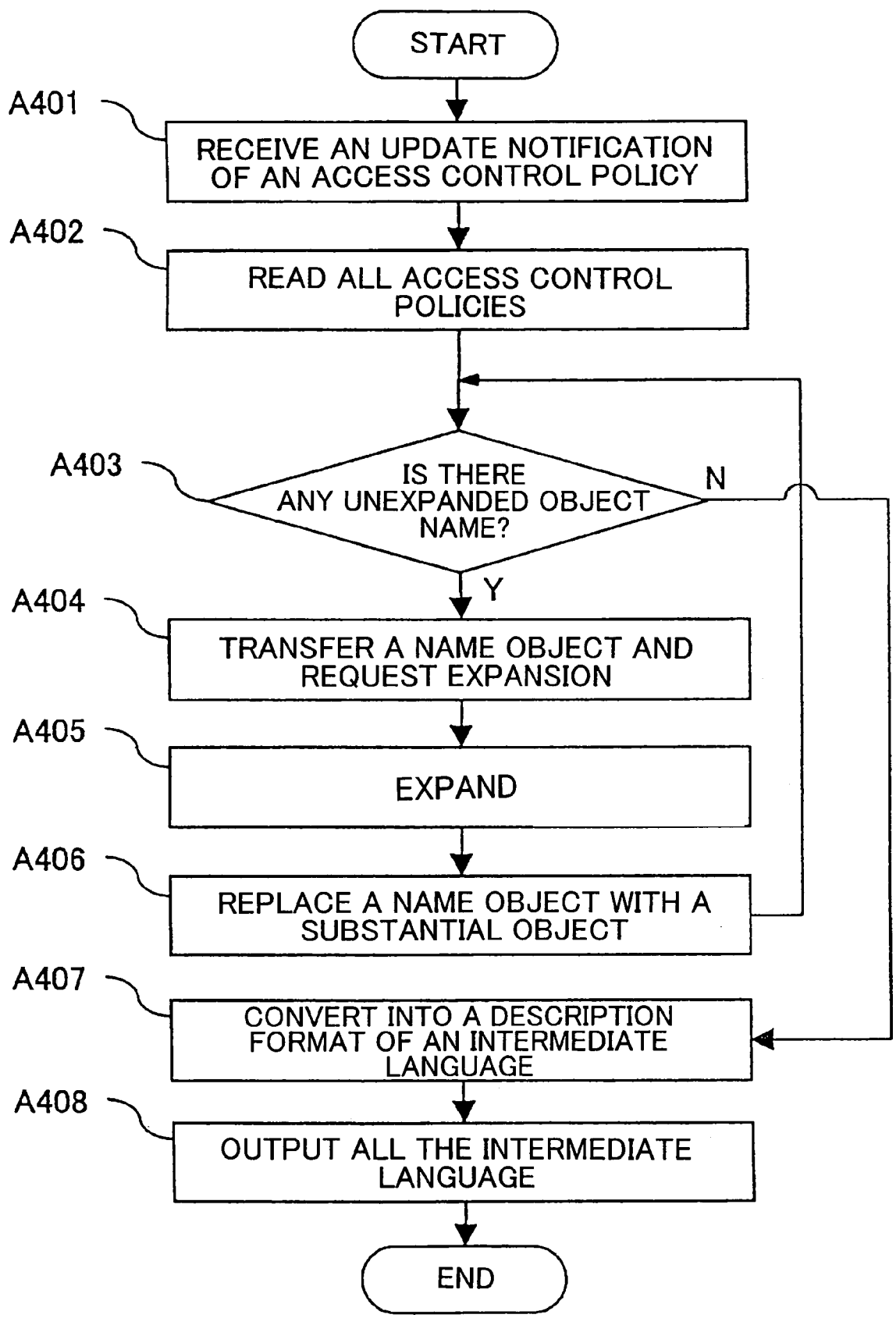
FIG. 16 is a flowchart showing an example of progress of an intermediate language generation processing.

FIG. 16 is a flowchart showing an example of progress of an intermediate language generation processing according to the step A40. The policy analyzer 1031 receives an update notification from the policy editor 1011 (step A401). The policy analyzer 1031 reads all access control policies from the policy storage 1021 (A0402). The policy analyzer 1031 determines whether any unexpanded name object exists in the access control policies (step A403). If there is an unexpanded name object, the policy analyzer 1031 transfers the name object to the object knowledge manager 2021, and requests expansion from the name object as a starting point (step A404).

The object knowledge manager 2021 receives the name object from the policy analyzer 1031 and makes the object knowledge storage expand the name object as a starting point, to obtain a set of substantial objects (step A405). That is, paths to substantial objects are searched for, and a set of substantial objects are obtained. At this time, the search technique may be a depth-weighted search or width-weighted search. For example, if a substantial object which has already been searched for is reached, the object knowledge manager 2021 does not obtain the substantial object repeatedly. In addition, if a name object which has already been passed is reached again, a search will not be started from the name object any more.

If a set of zero or more substantial objects is obtained by expansion, the object knowledge manager 2021 transfers the set of substantial objects to the policy analyzer 1031.

The policy analyzer 1031 receives the set of substantial objects from the object knowledge manager 2021, and replaces the name object written in the access control policy with the set of substantial objects. For example, a name object "policy meeting member" shown in FIG. 6 is replaced with a set of substantial objects "UserA" and "UserB" received from the object knowledge manager 2021 (step A406).

The policy analyzer 1031 and the knowledge database 21 repeat the processings of the steps A404 to A406 until no unexpanded name object remain in the policy control list. In this process, every one of the name objects written as user groups, locations, resources, and the like is replaced with a set of substantial objects. After no name object remains unexpanded in all the policy control list read from the policy storage 1021 (N in the step A403), the policy analyzer 1031 converts the access control policies including substantial objects expanded from name objects, into a description format of an intermediate language. Thus, an intermediate language is generated (step A407). In the present embodiment, all access control policies are read from the policy storage 1021, and an intermediate language is generated based on the access control policies. Therefore, the intermediate language generated in the step A407 includes all the rules obtained from all the access control policies. The policy analyzer 1031 transfers the generated intermediate language to the access control list setting means 1061 (step A408).

Subsequently, the access control list setting means 1061 receives the intermediate language from the policy analyzer 1031, and converts the intermediate language to generate an access control list. The setting means 1061 transfers the access control list to the access control list storage 3011 (step A50 with reference to FIG. 2).

FIG. 17 is a flowchart showing an example of progress of the access control list generation processing in the step A50. The access control list setting means 1061 receives an intermediate language from the policy analyzer 1031 (step A501). The setting means 1061 determines whether or not the intermediate language still includes a rule not subjected to the step A503 (a combination generation processing) described later (step A502). If there still is a rule not subjected to the combination generation processing, the access control list setting means 1061 generates every combination that can be written as a line in the access control list from the rule of the intermediate language (step A503). When a combination is generated, one element is extracted from every one of the categories of "user ID", "access source", and "access destination", from elements included in a set of substantial objects included in a rule. Further, the elements extracted from every one of the categories of "user ID", "access source", and "access destination" are combined into one line. However, the items that respectively constitute elements are not always fixed but change in accordance with the access control list as a target. For example, under the rule of the intermediate language shown in FIG. 7, only one element corresponds to one "access source", i.e., one access source IP address is one element. Also, only one element corresponds to one "access source", i.e., a combination of an IP address, a port number and a protocol is one element. On the other side, under the rule included in the intermediate language shown in FIGS. 10 and 11, two elements correspond to one "access source", i.e., an IP address and a port number are separate elements, respectively. Also, two elements correspond to one "access destination", i.e., an IP address is an element while a combination of a port number and a protocol is another element.

A next explanation will be made of a case where the intermediate language consisting of one rule shown in FIG. 7 is converted into the access control list shown in FIG. 8. Under the rule shown in FIG. 7, two kinds of elements correspond to one "user ID". Likewise, two kinds of elements (IP addresses) correspond to one "access source". Four kinds of elements (e.g., combinations each consisting of an IP address, a port number, and a protocol) correspond to an access destination. Therefore, elements each extracted from every one of the categories "user ID", "access source", and "access destination" are combined into lines, and then, 16 lines are obtained as shown in FIG. 8.

Another specific example will be explained below in case where the intermediate language consisting of nine rules shown in FIGS. 10 and 11 is converted into the access control list shown in FIG. 12. This example will be described paying attention to the first rule shown in FIG. 10. Under this rule, five kinds of elements (e.g., "i-takahashi" to "h-suzuki") correspond to one user ID. Of the two kinds of elements corresponding to one access source, one (IP address) consists of one kind of element. Of the two kinds of elements corresponding to one access source, the other one (port number) consists of one kind of element. Of two kinds of elements corresponding to one access destination, one (IP address) consists of one kind of element. Of the two kinds of elements corresponding to one access destination, the other one (a combination of a port number and a protocol) consists of five kinds of element (e.g., "137 to 138 (udp)"). Accordingly, from combinations of contents obtained for every one of these elements, the first to twenty fifth lines shown in FIG. 12 are obtained. Lines are obtained in a similar manner from the other rules as shown in FIGS. 10 and 11.

The contents obtained as elements of the category "user ID" need not always be divided into lines but may be written all together into one line. For example, five kinds of user IDs under the first rule shown in FIG. 10 may be written all together in one line. FIG. 18 shows an example of a case where user IDs included in one rule are written together in one line when generating lines from rules shown in FIGS. 10 and 11. Under the rules shown in FIGS. 10 and 11, a content includes "137-138(udp)" as a "combination of a port number and a protocol" as an element corresponding to the category of "access destination". In case of thus including plural port numbers, the port numbers may be processed as separate port numbers "137(udp)" and "138(udp)".

After no rule remains not subjected to the combination generation processing (step A503) in the intermediate language (N in the step A502), the access control list setting means 1061 converts each of generated combinations into the description format (line) of an access control list, and generate an access control list (step A504). An intermediate language includes all rules obtained from all access control policies. Accordingly, an access control list includes all lines generated on the basis of all rules. The setting means 1061 transfers the access control list to the access control list storage 3011 (step A505).

Subsequently, the access control list storage 3011 receives the access control list from the access control list setting means 1061, and replaces an existing access control list stored in the access control list storage 3011 with the received access control list (step A60 with reference to FIG. 2).

After replacing the access control list, the access control list setting means 1061 instructs the access controller 302 on setting of access control. The access controller 302 which has received the setting instruction reads the access control list from the access control list storage 3011, and executes access control in accordance with the contents thereof (A070).

According to the present embodiment, a detailed and complicated access control list can be generated by editing access control policies in a convenient manner which allows easy understanding of editing and inputting. In addition, object knowledge in which plural name objects have paths to one identical substantial object is used to expand user groups to user IDs. Therefore, an access control list can be generated with respect to a user group which includes a user who belongs to plural organizations.

Second Embodiment

FIG. 19 is a block diagram showing a second embodiment of the access control system according to the present invention. In the access control system shown in FIG. 19 has a policy engine 12 as a computer which operates under programmed control, a knowledge database 22 as one or plural data storages, and an access control device 3. This embodiment will be explained with reference to an example of a case where the policy engine 12, knowledge database 22, and access control device 3 are separate computers, respectively.

The policy engine 12 includes a policy editor 1012, policy storage 1022, policy analyzer 1032, and access control list setting means 1062. The knowledge database 22 includes an object knowledge manager 2022 and object knowledge storage 2032. The access control device 3 includes an access control list storage 301 and access controller 302.

Operations and structures of the policy editor 1012, policy storage 1022, policy analyzer 1032, and access control list setting means 1062 are almost the same as those of the policy editor 1011, policy storage 1021, policy analyzer 1031, and access control list setting means 1061 described in the first embodiment except for the following feature. That is, when an access control policy is newly created or changed, the policy editor 1012 outputs an update notification including the ID of the access control policy to the policy analyzer 1032. The policy analyzer 1032 reads only the access control policy specified by the ID from the policy storage 1022, and generates only those rules that correspond to the access control policy. The policy analyzer 1032 further outputs the rules to the access control list setting means 1062. The access control list setting means 1062 creates lines from only the rules transferred from the policy analyzer 1032, and makes the access control list storage 301 update only those portions that correspond to the created lines.

Operations and structures of the object knowledge manager 2022 and object knowledge storage 2032 are the same as those of the object knowledge manager 2021 and object knowledge storage 2031 described in the first embodiment.

Operations and structures of the access control list storage 301 and access controller 302 are almost the same as those of the access control list storage 3011 and access controller 302 described in the first embodiment except for the following feature. That is, the access control list storage 3011 does not update the entire access control list as shown in the first embodiment but updates only those lines that are specified by the access control list setting means 1062 in the access control list.

Next, operations will now be described below.

Figure 20:
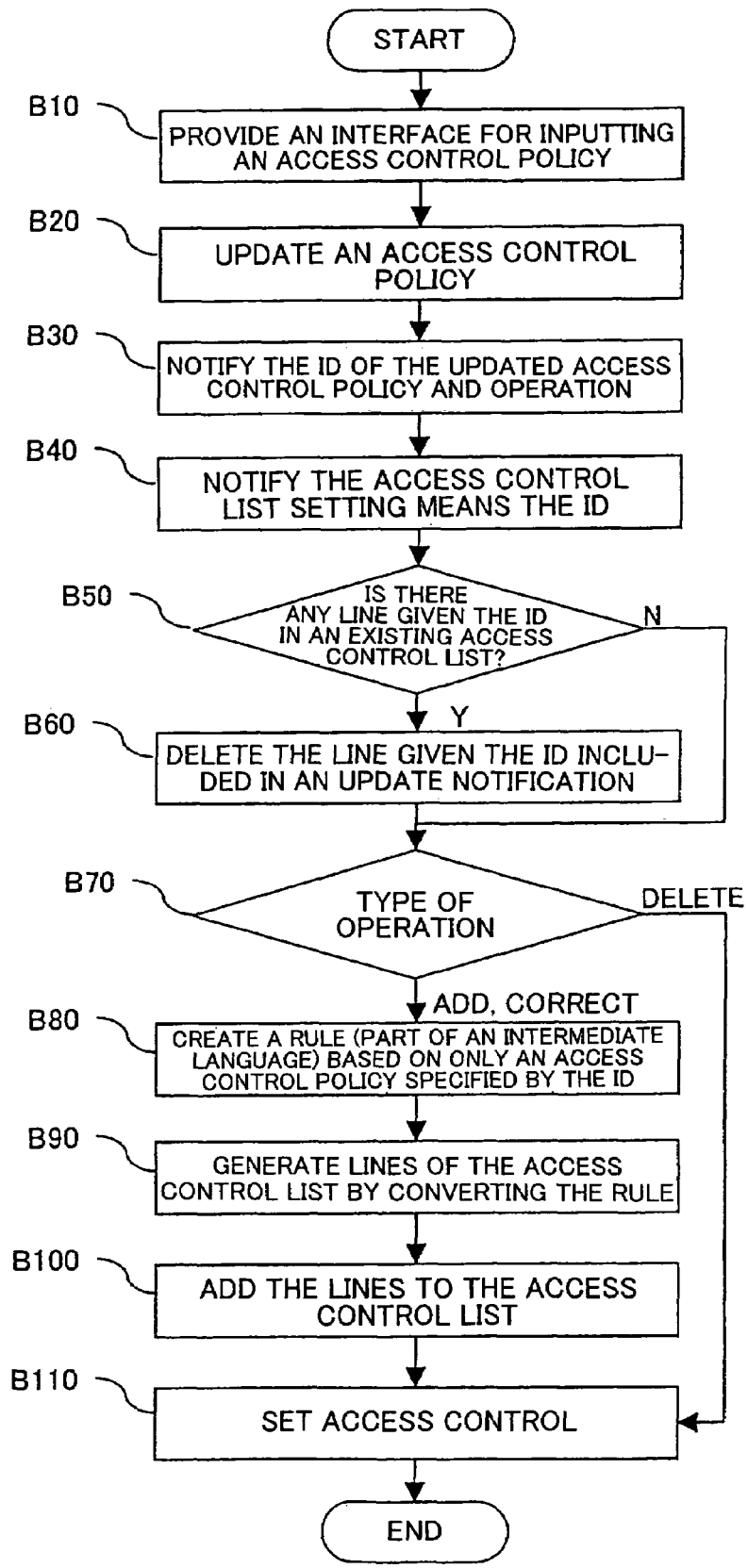
FIG. 20 is a flowchart showing an example of operation of the access control system according to the second embodiment.

FIG. 20 is a flowchart showing an example of the access control system according to the present embodiment. The policy storage 1022 stores plural access control policies. An intermediate language (or rules) and an access control list (or lines) which are generated from each access control policy are given the ID of the access control policy as a generation source.

The policy editor 1012 presents a user a user interface to edit access control policies (step B10). The form of the user interface displayed is the same as that in the first embodiment. If an access control policy is edited, the policy editor 1012 transfers the edited access control policy and an instruction concerning addition, correction, and deletion to the policy storage 1022. The policy storage 1022 updates the access control policy in accordance with the instruction received from the policy editor 1011 (step B20). The operations in the steps B10 and B20 are the same as those in the steps A10 and A20.

After the access control policy is updated, the policy editor 1012 transfers an update notification to the policy analyzer 1032 (step B30). At this time, the policy editor 1012 arranges the update notification to include an ID (i.e., the ID of the updated access control policy) which specifies an updated portion of the access control policy, intermediate language, access control list, or the like, and the type of operation performed on the updated portion. The type of operation may be addition, correction, deletion, or the like. Upon reception of the update notification, the policy analyzer 1032 transfers the update notification including the ID of the updated access control policy to the access control list setting means 1062 (step B40).

Upon reception of the update notification from the policy analyzer 1032, the access control list setting means 1062 determines whether or not a line in which the ID included in the update notification is given exists in the access control list stored in the access control list storage 301 (step B50). If a line in which the ID included in the update notification is given, the access control list setting means 1062 deletes the line from the access control list stored in the access control list storage 301 (step B60).

The policy analyzer 1032 determines the type of operation included in the update notification (step B70). If the type is addition or correction, the policy analyzer 1032 reads from the policy storage 1022 and analyzes only the access control policy that is specified by the ID included in the update notification, and generates a rule based on the access control policy. Further, the policy analyzer 1032 transfers the rule to the access control list setting means 1062 (step B80). In the step B80, a rule is generated based on only the access control policy specified by the ID included in the update notification. Therefore, the rule generated in the step B80 is a part of rules included in the intermediate language shown in FIG. 4.

Figure 21:
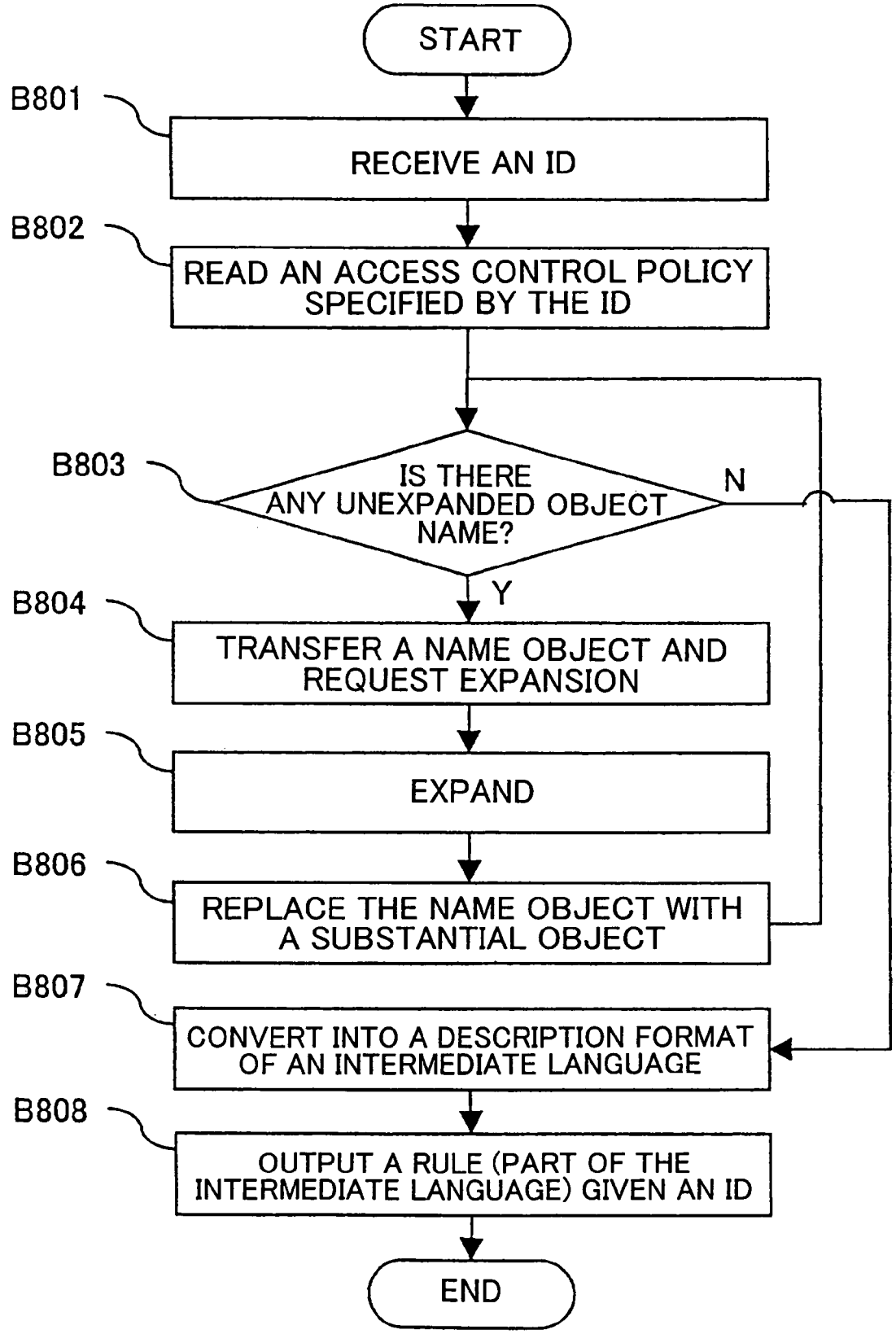
FIG. 21 is a flowchart showing an example of progress of a processing of generating a part of an intermediate language.

FIG. 21 is a flowchart showing an example of progress of the processing of generating a part of an intermediate language in the step B80. The policy analyzer 1032 receives an update notification including an ID from the policy editor 1012 (step B801). The operation in the step B801 corresponds to the operation of the policy editor 1012 in the step B30.

The policy analyzer 1032 reads only the access control policy that is specified by the ID included in the update notification, from the policy storage 1022 (step B802). The policy analyzer 1032 determines whether or not any unexpanded name object exists in the read access control policy (step B803). If an unexpanded name object exists, the policy analyzer 1032 transfers the name object to the object knowledge manager 2022, and requests expansion from the name object as a starting point (step B804).

The object knowledge manager 2022 receives the name object from the policy analyzer 1032, and makes the object knowledge storage expand the name object as a starting point, to obtain a set of substantial objects (step B805). If a set of zero or more substantial objects is obtained by the expansion, the object knowledge manager 2022 transfers the set to the policy analyzer 1032. The policy analyzer 1032 receives the set of substantial objects from the object knowledge manager 2022, and replaces the name object described in the access control policy (step B806). Operations in the steps B805 and B806 are the same as those in the steps A405 and A406.

The policy analyzer 1031 and knowledge database 21 repeat the processings of the steps B804 to B806 until no unexpanded name object remains in the read policy control list. In this process, in the access control policy (i.e., a new or edited access control policy) specified by the ID included in the update notification, every name object described as a user group, location, resource, or the like is replaced with a set of substantial objects. When no unexpanded name object remains in all the policy control list read from the policy storage 1022 (N in the step A803), the policy analyzer 1032 converts the access control policy including substantial objects expanded from name objects into the description format of an intermediate language, to generate rules (or a part of an intermediate language) (step A807). Note that the policy analyzer 1032 gives the generated rules the ID of the access control policy as a generation source. The policy analyzer 1032 transfers the rules given the ID of the access control policy as a generation source to the access control list setting means 1062 (step B808).

Subsequently, the access control list setting means 1062 receives the rules from the policy analyzer 1032, and converts the rules to generate lines for an access control list. The access control list setting means 1062 transfers the lines to the access control list storage 301 (step B90 with reference to FIG. 20).

Figure 22:
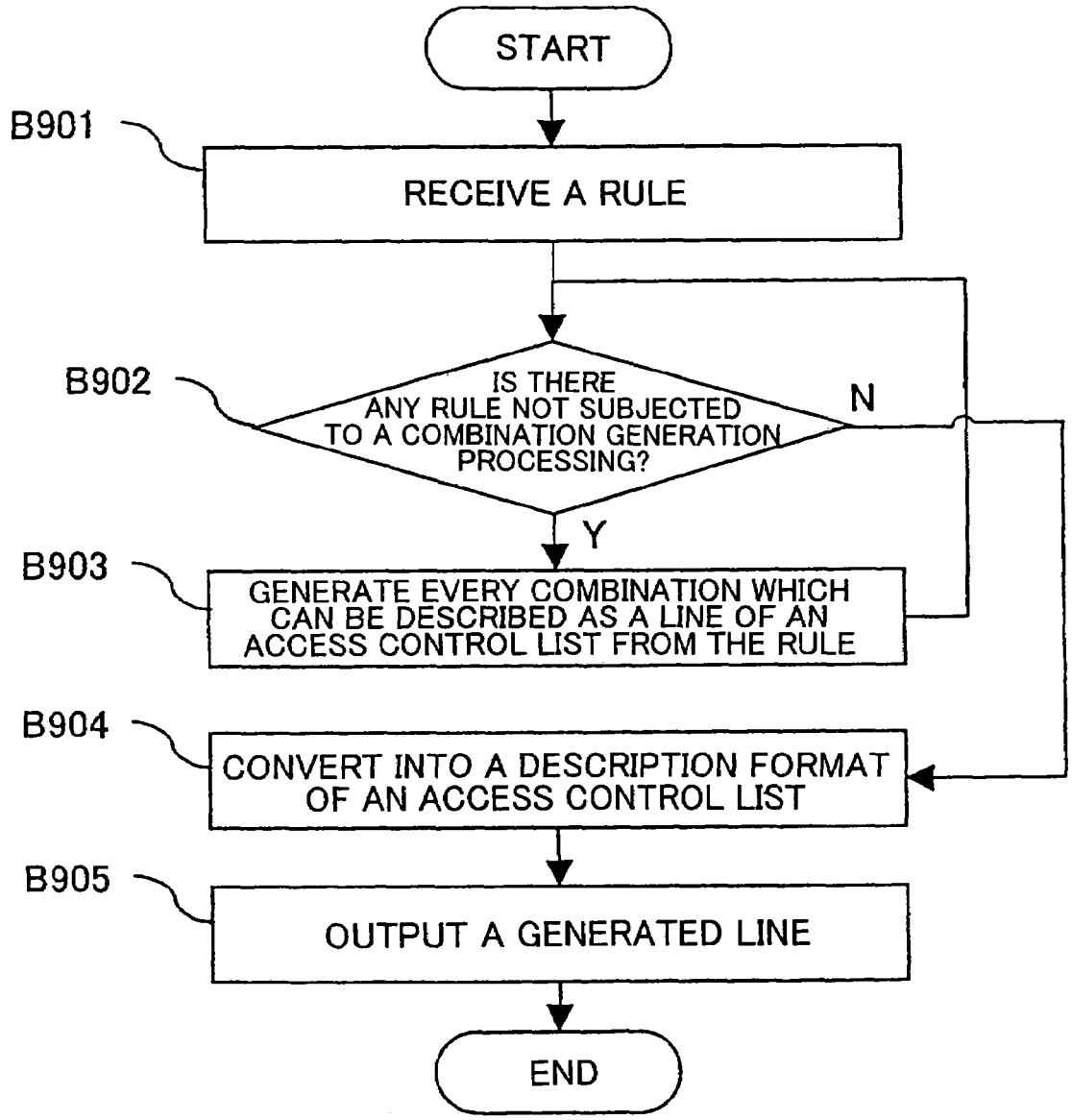
FIG. 22 is a flowchart showing an example of progress of a line generation processing.

FIG. 22 is a flowchart showing an example of progress of line generation processing in the step B90. The access control list setting means 1062 receives rules from the policy analyzer 1032 (step B901). The access control list setting means 1062 determines whether or not the received rules still include any rule not subjected to the step B903 (a combination generation processing) described later (step B902). If there still is a rule not subjected to the combination generation processing, the access control list setting means 1062 generates every combination that can be written as a line in the access control list from the rule (step B903). In the step B903, the same processing as that in the step A503 is carried out.

When no rule not subjected to the combination generation processing (step B903) remains in the rules received from the policy analyzer 1032 (N in the step B902), the access control list setting means 1062 converts every generated combination into the description format (or a line) of the access control list, to generate lines (step B904). The access control list setting means 1062 gives the generated lines the ID of the access control policy as a generation source. Since this ID is taken over from rules, the ID given a rule which is a generation source may be given to lines. Note that the lines generated in the step B904 form a part of the access control list. The access control list setting means 1062 transfers every generated line to the access control list storage 301 (step B905).

Subsequently, the access control list storage 301 receives the lines from the access control list setting means 1062, and adds the received lines to the existing access control list stored in the access control list storage 301, to update the access control list (step B100 with reference to FIG. 20). In response to the update of the access control list, the access control list setting means 1062 instructs the access controller to set the access control. Upon reception of the instruction to set the access control, the access controller 302 reads the access control list from the access control list storage 301, and execute access control in accordance with the contents thereof (step B110).

If the result of determining the type of operation included in the update notification (in the step B70) is "deletion", for example, the policy analyzer 1032 makes the access controller 302 execute a setting processing of setting the access control (step B110) via the access control list setting means 1062. In this case, the processings in the steps B80 to B100 are not performed.

In the present embodiment, only the rules and lines that correspond to a new or edited access control policy are changed. It is therefore possible to greatly reduce loads on the update processing of updating the access control list stored in the access control list storage 301. In other words, the processing throughput can be reduced greatly because updating is not effected on the entire access control list but differential updating is effected only on those lines that correspond to a new or edited access control policy. In some cases, for example, a manager may manually rewrite a part of the access control list by directly operating the access control device 31. In the present embodiment, if an access control policy which corresponds to another line than the lines rewritten in the manner of these cases is updated, only those lines that correspond to the access control policy are updated. Therefore, those parts that have been rewritten in the manner of those cases in which a manager manually rewrites lines remain unchanged. Thus, the independence can be improved between rewriting of lines in the manner of using the policy engine 12 and rewriting of lines in another manner.

Third Embodiment

Figure 23:
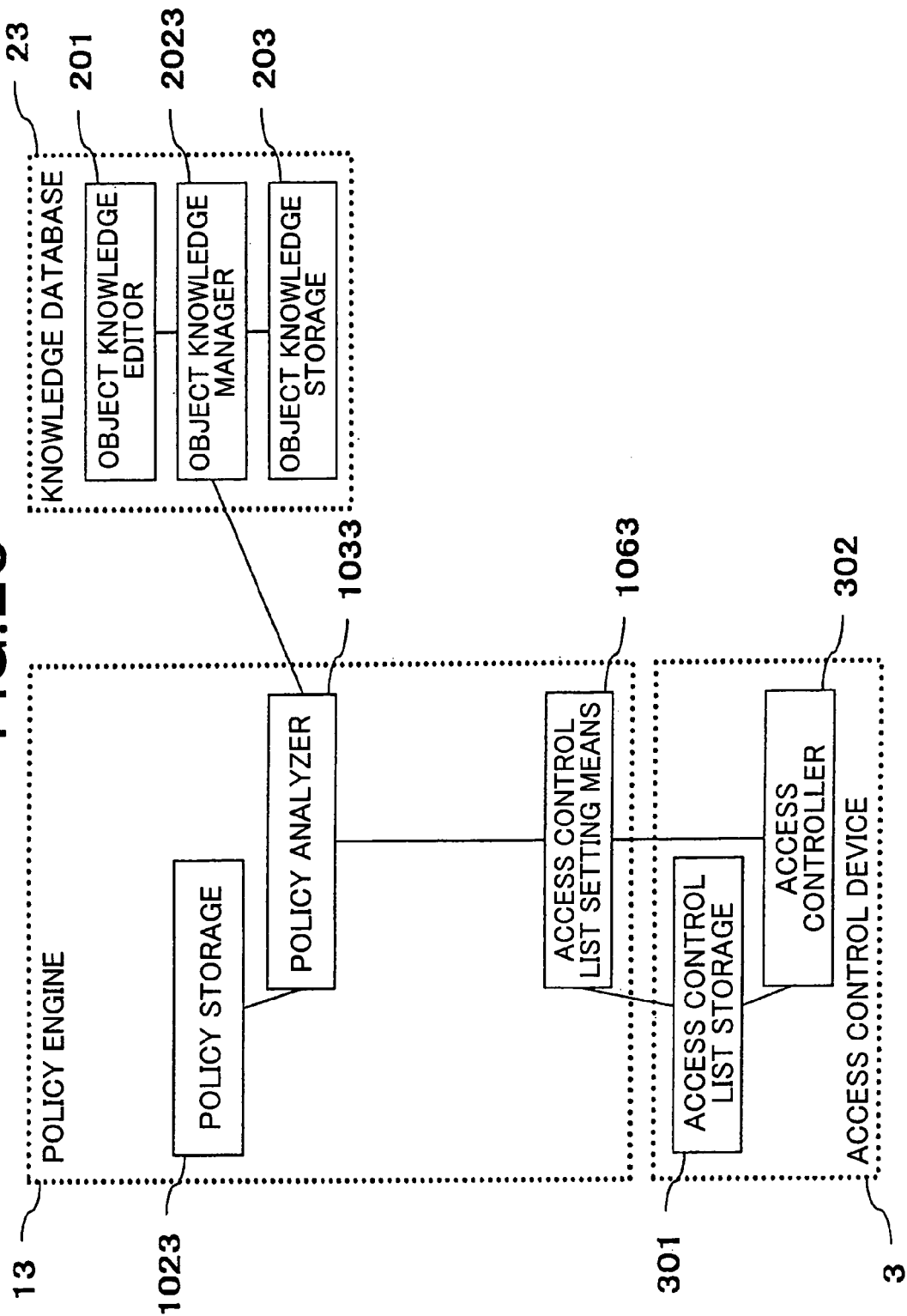
FIG. 23 is a block diagram showing a third embodiment of the access control system according to the present invention.

FIG. 23 is a block diagram showing a third embodiment of the access control system according to the present invention. In the access control system shown in FIG. 23 has a policy engine 13 as a computer which operates under programmed control, a knowledge database 23 as one or plural data storages, and an access control device 3. This embodiment will be explained with reference to an example of a case where the policy engine 13, knowledge database 23, and access control device 3 are separate computers, respectively.

The policy engine 13 includes a policy storage 1023, policy analyzer 1033, and access control list setting means 1063. The knowledge database 23 includes an object knowledge editor 201, object knowledge manager 2023, and object knowledge storage 203. The structure and operation of the access control device 3 are the same as those of the access control device 3 in the second embodiment.

The object knowledge editor 201 provides users with a user interface to edit object knowledge. The object knowledge editor 201 obtains a list of name objects, sets of substantial objects expanded from the name objects, and the like from the object knowledge storage 203 via the object knowledge manager 2023. Based on these information items, the object knowledge editor 201 constructs the user interface to edit object knowledge. The object knowledge editor 201 transfers an object created by a user together with an instruction for addition, correction, deletion, or the like to the object knowledge manager 2023.

The object knowledge editor 201 is constituted by, for example, a CPU that operates in accordance with programs, an input device (a keyboard, mouse, or the like) and an output device (a display or the like). A common CPU may be used in place of the CPUs that constitute respective means which the knowledge database 23 has.

Upon reception of a request or instruction for search, reference, addition, correction, deletion, or the like or an object created by a user from the object knowledge editor 201, the object knowledge manager 2023 transfers the request or instruction for search for, reference to, addition of, correction to, or deletion of an object, or the object to the object knowledge storage 203. If an object is updated by any of these operations, the object knowledge manager 2023 makes the object knowledge storage 203 collect, in addition to the name object which is a target of the operation and is directly updated, those name objects that are updated indirectly under influences from the operation, e.g., name objects that succeed to the directly updated name object. A set of those name objects is transferred as an object update notification to the policy analyzer 1033. The object knowledge manager 2023 requests the object knowledge storage 203 to perform expansion, in response to a request for referring to substantial object corresponding to name objects received from the policy analyzer 1033, or the like. The object manager 2023 then returns a set of substantial objects obtained as a result of the expansion to the policy analyzer 1033.

The object knowledge storage 203 receives instructions concerning operations or objects from the object knowledge manager 2023, and executes search for, addition to, reference to, correction to, and deletion from object knowledge, in accordance with the instructions of requested operations or in correspondence with the received objects. The object knowledge storage 203 then returns a result thereof to the object knowledge manager 2023.

The policy storage 1023 stores zero or more access control policies, and transfers access control policies to the policy analyzer 1033 upon requests from the policy analyzer 1033. At this time, if an ID of an access control policy is instructed, the access control policy specified by the ID is transferred to the policy analyzer 1033. If a name object is specified, the ID of a access control policy including the name object is transferred to the policy analyzer 1033.

Upon reception of an object update notification from the object knowledge manager 2023, the policy analyzer 1033 instructs the policy storage 1023 to search for access control policies which use the name object, and then receives a set of corresponding access control policies. Thereafter, the policy analyzer 1033 requests the knowledge database 23 to expand the name object as a starting point, which is used in the received access control policies, and prepares a rule (or a part of an intermediate language) using substantial objects obtained as a result of the expansion. Then, this rule is transferred to the access control list setting means 1063.

The access control list setting means 1063 receives the rule from the policy analyzer 1033, and generates lines of the access control list in the access control device 3 from the rule. Further, based on the lines, the access control list setting means 1063 updates a part of the existing access control list stored in the access control list storage 301. After updating the access control list, the access control list setting means 1063 instructs the access controller 302 to change the setting of access control.

Upon reception of the instruction for changing the setting from the access control list setting means 1063, the access controller 302 reads the access control list stored in the access control list storage 301. Further, the access control list setting means 1063 changes the setting of access control in accordance with the contents thereof, and performs access control in accordance with the setting.

Operations will now be described below.

Figure 24:
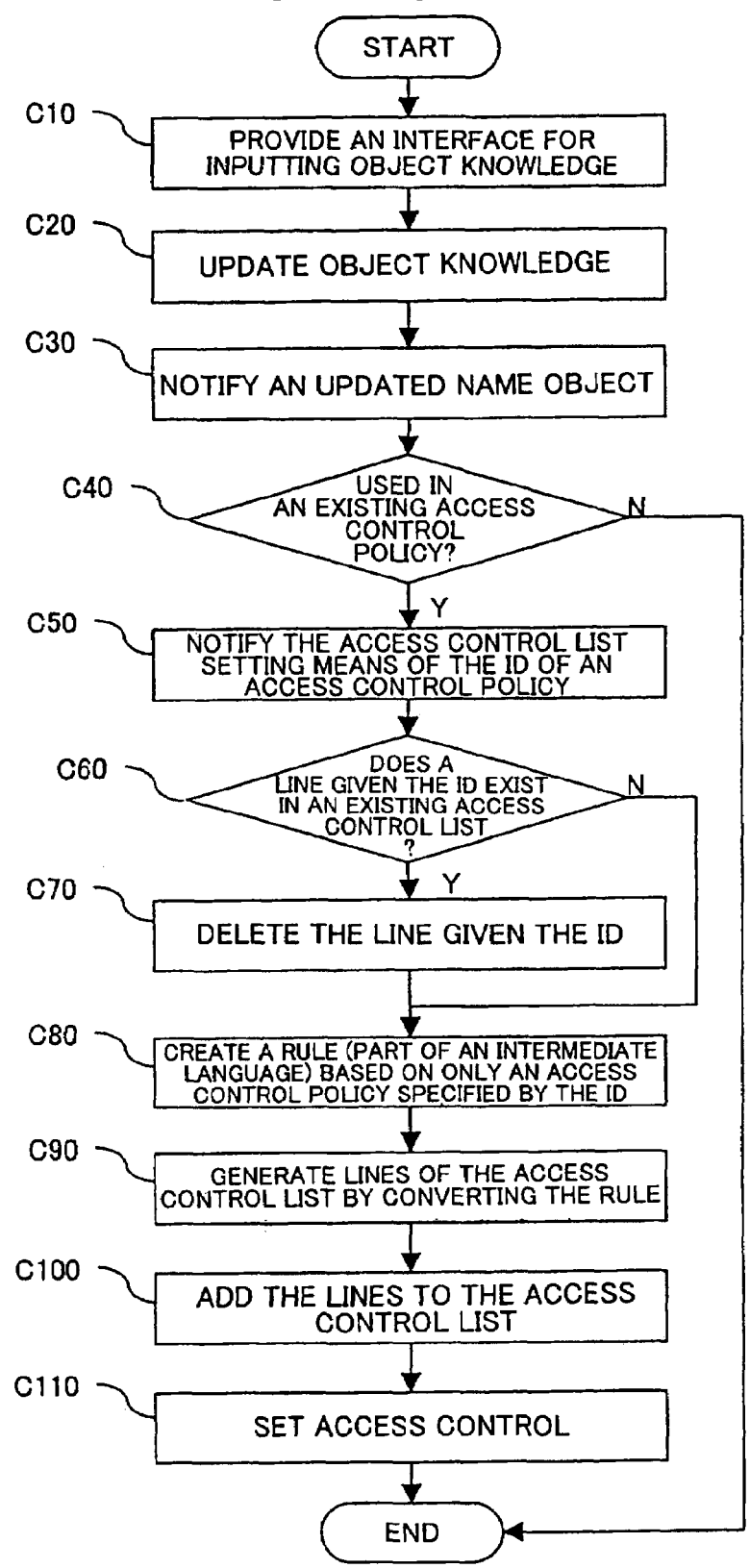
FIG. 24 is a flowchart showing an example of operation of the access control system according to the third embodiment.

FIG. 24 is a flowchart showing an example of the access control system according to the present embodiment. At first, the object knowledge editor 201 presents a user a user interface to edit object knowledge (step C10). FIGS. 25 and 26 show examples of the user interface presented in the step C10. FIG. 25 shows an example of the user interface used to select a name object in case where a selection is made from name objects expressing user groups. FIG. 26 shows an example of the user interface for editing object knowledge in case where a user is invited to edit the object knowledge concerning a user group. In the step C10, the object knowledge editor 201 requests a list of name objects from the object knowledge manager 2023 so that the user is allowed to select a name object to refer to or edit from an existing list of name objects which the user can refer to and edit. In response to this request, the object knowledge manager 2023 obtains a list of name objects from the object knowledge storage 203, and outputs the list to the object knowledge editor 201. The object knowledge editor 201 displays the list of name objects on the user interface (see FIG. 25). The object knowledge editor 201 displays select buttons together with the list, as shown in FIG. 25, and invites the user to select a name object.

The object knowledge editor 201 requests, from the object knowledge manager 2023, a set of substantial objects expanded from a selected name object. The object knowledge manager 2023 makes the object knowledge storage 203 perform expansion in response to this request, and outputs a set of substantial objects obtained as a result of the expansion, to the object knowledge editor 201. The object knowledge editor 201 presents a user interface for editing, including the set of substantial objects.

Referring to FIG. 26 as an example, the user interface for editing will be described. A name object selected by the user is displayed in the column of "user group name" shown in FIG. 26. If a name object is newly specified by the user, the name object is inputted to the column of "user group name" shown in FIG. 26.

Also, in the column of "list of added user IDs" shown in FIG. 26, the list of substantial objects obtained by expanding the selected name object is displayed. If the user specifies a new substantial object having a path from the name object, this substantial object is inputted to the column of "input a user ID to add". When the "add" button shown in FIG. 26 is clicked with a mouse, the object knowledge editor 201 adds the substantial object together with a select button to the column of the "list of added user IDs". When a select button is clicked with a mouse in the column of the "list of added user IDs", and the "delete" button shown in FIG. 26 is clicked with a mouse, the object knowledge editor 201 receives an instruction to delete a selected substantial object among substantial objects having paths from the name object. Further, when a new name object having a path to each substantial object displayed in the column of the "list of added user IDs" is specified, a select button corresponding to the name object newly specified is clicked with a mouse, in the column of "select user groups to include" shown in FIG. 26. Then, the object knowledge editor 201 receives an instruction to add a name object having a path to be extended, from the name object displayed in the column of "user group name". The column of "select a user group to include" displays select buttons together with a list of name objects, like in FIG. 25.

If the "determination" button shown in FIG. 26 is clicked with a mouse, the object knowledge editor 201 transfers objects edited on the user interface for editing, and instructions for addition, correction, deletion, and the like, to the object knowledge manager 2023. Although FIG. 26 shows an example of user interface in case of editing object knowledge concerning user groups, a similar user interface is used in case of editing object knowledge concerning a location or resource.

When an edited object or an instruction for addition, correction, or deletion is inputted, the object knowledge manager 2023 transfers the object or instruction to the object knowledge storage 203, to update object knowledge (step C20).

After the object knowledge storage 203 is let update object knowledge, the object knowledge manager 2023 outputs an instruction for searching for the directly updated name object and indirectly updated name objects, to the object knowledge storage 203. The object knowledge storage 203 receives the directly updated name object (directly updated name object) and the search instruction, and searches for those name objects (indirectly updated name objects) that follow the directly updated name object. When indirectly updated name objects are searched for, a search for an indirectly updated name object is repeated by searching for those name objects that follow the directly updated name object. The object knowledge storage 203 transfers a search result to the object knowledge manager 2023. At this time, for example, the directly updated name object and the indirectly updated name objects obtained as a search result are transferred to the object knowledge manager 2023.

When the directly updated name object and indirectly updated name objects are inputted from the object knowledge storage 203, the object knowledge manager 2023 transfers the name objects, as an object update notification, to the policy analyzer 1033 (step C30).

Upon reception of the update notification of the name objects, the policy analyzer 1033 requests the policy storage 1021 to search for a list of IDs of access control policies that use the received name objects, and obtains the list of IDs. At this time, if there is no access control policy using the name objects, i.e., if no ID is obtained (N in the step C40), the processing is terminated.

Alternatively, if access control policies using the name objects exist, i.e., if IDs of access control policies are obtained (Y in the step C40), the policy analyzer 1033 transfers the list of obtained IDs to the access control list setting means 1063, and requests deletion of the existing access control list corresponding to the IDs (step C50).

Upon reception of the list of IDs of access control policies, the access control list setting means 1063 determines whether or not lines given the IDs exist in the existing access control list stored in the access control list storage 301 (step C60). If lines given the IDs exist in the access control list, the access control list setting means 1063 deletes those lines (step C70).

The policy analyzer 1033 has obtained a list of IDs of those access control policies that use name objects in form of an update notification, in a preceding processing (step C40). The policy analyzer 1033 reads access control policies specified by these IDs from the policy storage 1023, and generates rules based on the access control policies. Further, the policy analyzer 1033 transfers the rules to the access control list setting means 1063 (step C80). In the step C80, rules are generated, based on only the access control policies using the updated name objects. Therefore, the rules generated in the step C80 are a part of the rules included in the intermediate language in the conceptual view shown in FIG. 4.

Upon reception of the rules from the policy analyzer 1033, the access control list setting means 1063 converts the rules to generate lines for the access control list, and transfers the lines to the access control list storage 301 (step C90). The access control list storage 301 receives the lines from the access control list setting means 1063, and adds the received lines to the existing access control list stored in the access control list storage 301 (step C100). In response to the update of the access control list, the access control list setting means 1063 instructs the access controller 302 to set access control. Upon reception of the instruction to set access control, the access controller 302 reads the access control list from the access control list storage 301, and executes access control in accordance with the contents thereof (step C110). The processings in the steps C80 to C110 are the same as those in the steps B80 to B110.

In the present embodiment, the object knowledge editor 201 is capable of editing object knowledge. Therefore, the adhoc group can be edited. For example, with respect to user groups, there may be a case that the configuration changes in an adhocery manner as users freely edit user IDs as substantial objects and user groups as name objects, by use of the object editor 201. Even in this case, changes to the object knowledge are transferred to the policy analyzer 1033 from the object knowledge manager 2023. Further, necessary lines in the access control list can be dynamically regenerated without changing access control policies.

Further, according to the present embodiment, it is possible to respond to changes of the system configuration. For example, if information items such as addresses of a server and a file changes with respect to a resource as an access destination, the information items are dealt with as substantial objects. The substantial objects are hidden by describing name objects in place of them in access control policies. Therefore, even if users do not edit any access control policy, an access control list corresponding to a change to object knowledge can be generated by transferring the change to object knowledge from the object knowledge manager 2023.

Moreover, in the present embodiment, it is possible to respond to moving of a division or a target change of a room or the like. For example, suppose a case that a location of an access source moves to another place or a room which only concerned insiders have been allowed to use changes to a place which visitor can use. In this case, name objects or objects may be edited in correspondence with such a change. Then, the object knowledge manager 2023 transfers changes to object knowledge to the policy engine 13. Accordingly, it is possible to generate an access control list even if users do not edit access control policies.

In the present embodiment, the policy engine 13 may have a policy editor, like in the first and second embodiments.

Fourth Embodiment

Figure 27:
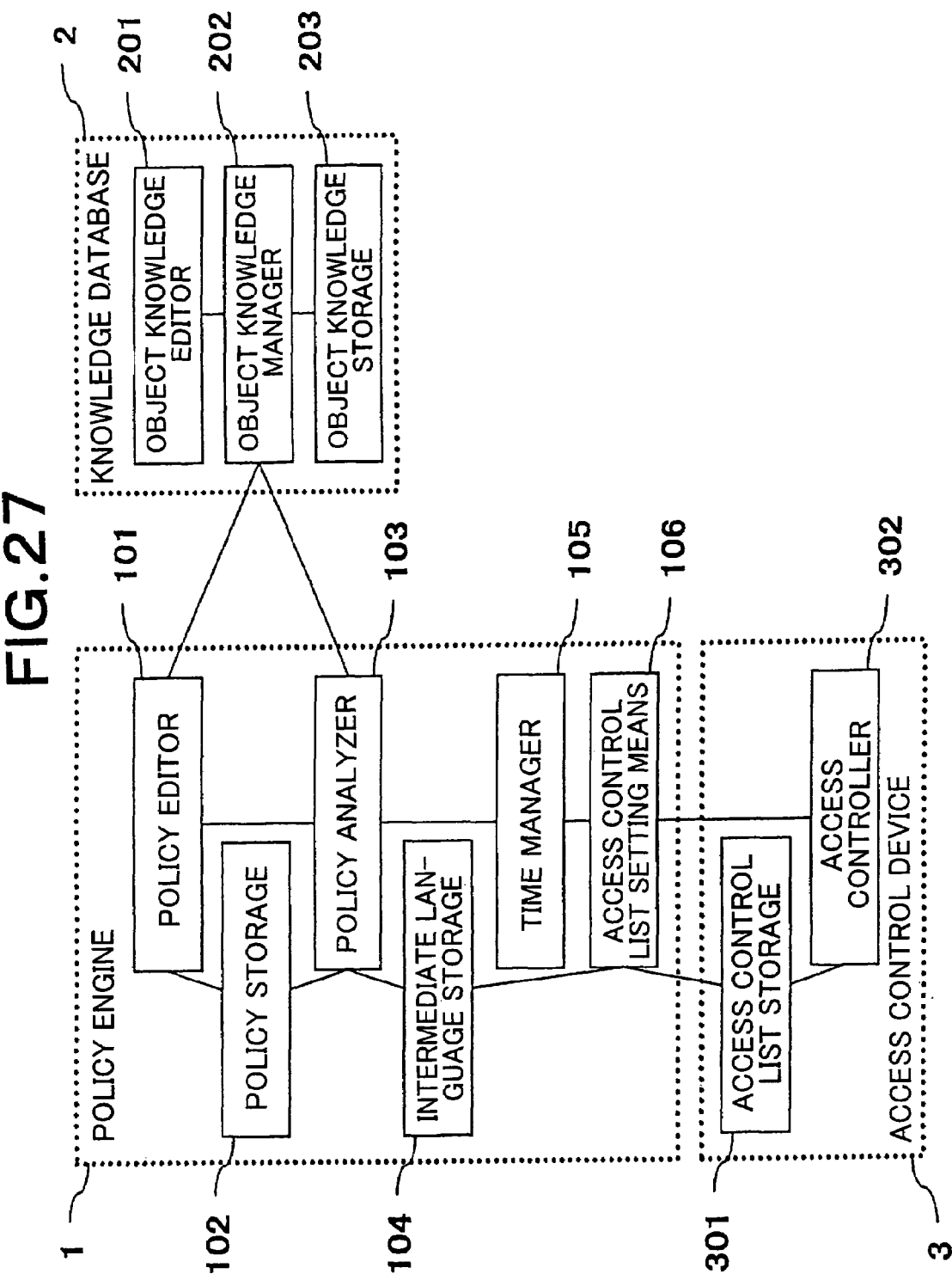
FIG. 27 is a block diagram showing a fourth embodiment of the access control system according to the present invention.

FIG. 27 is a block diagram showing a fourth embodiment of the access control system according to the present invention. The fourth embodiment of the present invention has a policy engine 1 in place of the policy engine 11 or 12 in the first or second embodiment. The access control system shown in FIG. 27 has a policy engine 1 as a computer which operates under programmed control, a knowledge database 2 as one or plural data storages, and an access control device 3. The explanation below will be made of a case of an example where the policy engine 1, knowledge database 2, and access control device 3 are separate computers, respectively.

The policy engine 1 includes a policy editor 101, policy storage 102, policy analyzer 103, intermediate language storage 104, time manager 105, and access control list setting means 106. The knowledge database 2 includes an object knowledge editor 201, object knowledge manager 202, and object knowledge storage 203. The structure and operation of the access control device 3 are the same as those of the access control device 3 in the second and third embodiments.

The policy editor 101 uses object knowledge obtained from the object knowledge manager 202, to provide users with an user interface for editing an access control policy capable of expressing access control with respect to an adhoc group which dynamically changes. This is an user interface capable of receiving an input of time information. The policy editor 101 instructs the policy storage 102 to search for, refer to, add, correct, and delete an access control policy in accordance with user's operations. When the access control policy is changed, the policy editor 101 outputs to the policy analyzer 103 an update notification, e.g., the ID of the updated access control policy, the type of operation, and time information.

The policy storage 102 receives and stores an access control policy edited by the policy editor 101. Also, the policy storage 102 searches for, refers to, adds, corrects, and deletes an access control policy in accordance with instructions from the policy editor 101 and policy analyzer 103 and in correspondence with the received access control policy. The policy storage 102 then transfers information concerning requested access control policies, e.g., an access control policy specified by an instructed ID, an access control policy including a specified name object, and the like. Alternatively, it is possible to transfer the ID of an access control policy including a specified name object.

Upon reception of the update notification from the policy editor 101, the policy analyzer 103 requests the access control policy specified by the ID included in the update notification, from the policy storage 102. Upon reception of an object update notification from the object knowledge manager 202, the policy analyzer 103 requests an access control policy which uses a name object included in the object update notification, from the policy storage 102. Also, the policy analyzer 103 receives an access control policy from the policy storage 102, and requests the knowledge manager 202 to expand a name object used in the received access control policy. Further, the policy analyzer 103 replaces the name object with zero or more substantial objects obtained by the expansion, and generates a rule (or a part of an intermediate language) written in a format independent from devices. The policy analyzer 103 transfers the generated rule to the intermediate language storage 104. Also, the policy analyzer 103 transfers an event based on a time condition of the generated rule, to the time manager 105. The event is, for example, addition or deletion of a rule having an ID given and taken over from the access control policy as a generation source. The time condition (time information) coupled with the event is inputted through the policy editor 101.

The intermediate language storage 104 receives and stores the rule generated by the policy analyzer 103. The intermediate language storage 104 transfers a requested rule in response to a request from access control list setting means 106.

The time manager 105 receives the event based on the rule of the generated rule, from the policy analyzer 103. The time manager 105 rearranges and stores the event together with other events that have already been received, in the chronographic order. The time manager 105 manages a set of events that have been stored, as a schedule. When a time specified by the condition comes, the time manager 105 transfers a time notification (e.g., a combination of a time, an ID given to a rule, and a type of operation such as addition or deletion) to the access control list setting means 106.

Upon reception of the time notification from the time manager 105, the access control list setting means 106 requests a rule corresponding to the ID of the time notification from the intermediate language storage 104. Upon reception of the corresponding rule from the intermediate language storage 104, the access control list setting means 106 generates lines from the rule. The access control list setting means 106 gives an ID to the lines, and transfers the lines and an instruction to the access control list storage 301. Further, the access control list stored in the access control list storage 301 is updated. After updating the access control list, an update notification of the access control list is transferred to the access controller 302.

Upon reception of the update notification from the access control list setting means 106, the access controller 302 reads the access control list stored in the access control list storage 301. The access controller 302 changes the setting in accordance with the contents thereof, and performs access control in accordance with the setting.

The intermediate language storage 104 is constituted by, for example, a CPU which operates under the programmed control, and a storage. The time manager 105 is realized by, for example, a CPU which operates under the programmed control. A common CPU may be used in place of CPUs which constitute respective means comprised in the policy engine 1.

Structures and operations of the object knowledge editor 201, object knowledge manager 202, and object knowledge storage 203 are the same as those of the object knowledge editor 201, object knowledge manager 2023, and object knowledge storage 203 in the third embodiment.

The fourth embodiment need not include the object knowledge editor 201. In addition, the policy editor 101 need not be included as long as there is provided a means for specifying a time band (time information) in which an access control policy is rendered effective.

In each access control policy in the present embodiment, information concerning time (e.g., a start time and an end time of an effective time band) is written in addition to the "ID", "accessibility", "user group", "location", and "resource".

Operations will now be described below.

Operations of the fourth embodiment can roughly be summarized into two operations. First one is an operation which proceeds as follows. That is, a user edits an access control policy or object knowledge. An intermediate language (rules) is thereby stored into the intermediate language storage 104. In the end, an event is registered in the time manager 105. This operation will be described with reference to FIGS. 28 to 30. Second one is an operation as follows. That is, an instructed time of the registered event comes. Then, a corresponding rule is instructed to the access control list setting means from the time manager 105. Lines are generated from the rule. In the end, the access control list is updated. This operation will be described with reference to FIGS. 31 to 33.

FIG. 28 is a flowchart showing an example of progress of a processing in case where an access control policy is edited and an event is registered. The policy editor 101 provides a user interface for editing an access control policy (step D10), like the policy editor 1011 in the first embodiment. However, in the present embodiment, the provided user interface for editing has an input column for inputting start time and end time of a time band in which an access control policy is effective. FIG. 29 shows an example of this user interface for editing. In the user interface shown in FIG. 29, the "time condition" column is the input column to input start time and end time of a time band in which an access control policy is effective. When changing information concerning time in an access control policy which has been prepared before, new time information may be inputted to this input column. The other columns shown in FIG. 29 are the same as those in the user interface shown in FIG. 15. The policy editor 101 transfers an access control policy edited on the user interface for editing, and an instruction for addition, correction, or deletion to the policy storage 102. The policy storage 102 updates the access control policy in accordance with the instruction received from the policy editor 101 (step D20).

When an access control policy is updated, the policy editor 101 transfers an update notification, e.g., the ID of the updated access control policy and type of operation, to the policy analyzer 103 (step D30). At this time, the policy editor 101 transfers information concerning start time and end time of a time band in which the edited access control policy is effective, to the policy analyzer 103.

The policy analyzer 103 receives the update notification and the time information from the policy editor 101. Further, the policy analyzer 103 reads an access control policy specified by the ID from the policy storage 102, in correspondence with the ID of the update notification and the type of operation. The policy analyzer 103 then creates a rule (or a part of an intermediate language) from the access control policy (step D40). The created rule is given the ID of the access control policy as a generation source. The policy analyzer 103 transfers the generated rule to the intermediate language storage 104, and instructs update of the intermediate language. The intermediate language storage 104 uses the rule received from the policy analyzer 103, to update and store the existing intermediate language stored (step D50).

After the intermediate language is updated, the policy analyzer 103 transfers the generated rule, the ID given to the rule, the time information, and the type of operation (event), to the time manager 105. For example, suppose that an edited access control policy is effective from a time A to a time B. In this case, the policy analyzer 103 transfers a rule created from the access control policy, an ID given to the rule (the ID of the access control policy), information about the time A, and an event of "addition", to the time manager 105. The policy analyzer 103 transfers the rule created from the access control policy, the ID given to the rule, information of the time B, and an event of "deletion", to the time manager 105. The time manager 105 rearranges and stores the event received from the policy analyzer 103 together with existing events stored in the time manager 105, in the chronographic order (step D60).

If the access control policy is edited by the policy editor 101, the policy analyzer 103 updates the rule given the ID of the edited access control policy, in the intermediate language stored in the intermediate language storage 104. At this time, the policy analyzer 103 updates information of events registered in the time manager 105, together with the ID. Also, when the access control policy is deleted by the policy editor 101, the policy analyzer 103 deletes the rule given the ID of the deleted access control policy, from the intermediate language stored in the intermediate language storage 104. At this time, the policy analyzer 103 deletes related (corresponding) information of events, from the time manager 105.

FIG. 30 is a flowchart showing an example of progress of the processing in case where object knowledge is edited and an event is registered. The object knowledge editor 201 provides a user interface for editing object knowledge (step D11), like in the third embodiment. The object knowledge editor 201 transfers an object edited on the user interface for editing, or an instruction for addition, correction, or deletion, to the object knowledge manager 202. When an edited object or an instruction for addition, correction, or deletion is inputted, the object knowledge manager 202 transfers the object or instruction to the object knowledge storage 203, and makes the object knowledge storage 203 update object knowledge (step D21).

When the object knowledge is updated, the object knowledge manager 202 transfers a directly updated name object and an instruction for searching for indirectly updated name objects, to the object knowledge storage 203. The object knowledge storage 203 receives the directly updated name object and the search instruction, and searches for indirectly updated name objects. Further, the object knowledge storage 203 transfers a search result to the object manager 202. At this time, for example, the directly updated name object, and indirectly updated name objects obtained as a search result are transferred to the object knowledge manager 202. When the directly updated name object and the indirectly updated name objects are inputted from the object knowledge storage 203, the object knowledge manager 202 transfers the name objects as an object update notification to the policy analyzer 103 (step D31). The operation in the step D31 is the same as that in the step C30.

Upon receipt of the update notification of name objects, the policy analyzer 103 requests the policy storage 102 to search for access control policies which use the name objects. If there is no corresponding access control policy as a result of the search, access control need not be updated, and therefore, the processing flow ends without performing subsidiary processings (N in the step D32).

As a result of the search, if there is a corresponding access control policy (Y in the step D32), the policy analyzer 103 reads the access control policy and creates a rule (or a part of an intermediate language) from the access control policy (step D41). The rule thus created is given the ID of the access control policy as a generation source. The policy analyzer 103 transfers the generated rule to the intermediate language storage 104, and instructs update of the intermediate language. The intermediate language storage 104 uses the rule received from the policy analyzer 103, to update an existing intermediate language stored, and stores the updated intermediate language (step D50). This processing is the same as that in the step D50 shown in FIG. 28.

After updating the intermediate language, the policy analyzer 103 transfers the generated rule, the ID given to the rule, time information, and a type of operation (event), to the time manager 105. The time manager 105 rearranges and stores the event received from the policy analyzer 103 together with existing events stored in the time manager 105, in the chronographic order (step D60).

If a name object is updated by the object knowledge editor 201, the policy analyzer 103 obtains the ID of an access control policy which uses the name object. Then, in the intermediate language stored in the intermediate language storage 104, those rules that are given the ID are updated by the policy analyzer 103. At this time, the policy analyzer 103 updates information about an event registered in the time manager 105 together with the ID. For example, if only one substantial object is expanded from a particular name object and if the substantial object is deleted, the policy analyzer 103 obtains the ID of an access control policy which uses the name object. Further, the policy analyzer 103 deletes those rules that are given the ID, from the intermediate language stored in the intermediate language storage 104. At this time, the policy analyzer 103 deletes information of corresponding events together with the ID, from the time manager 105.

Figure 31:
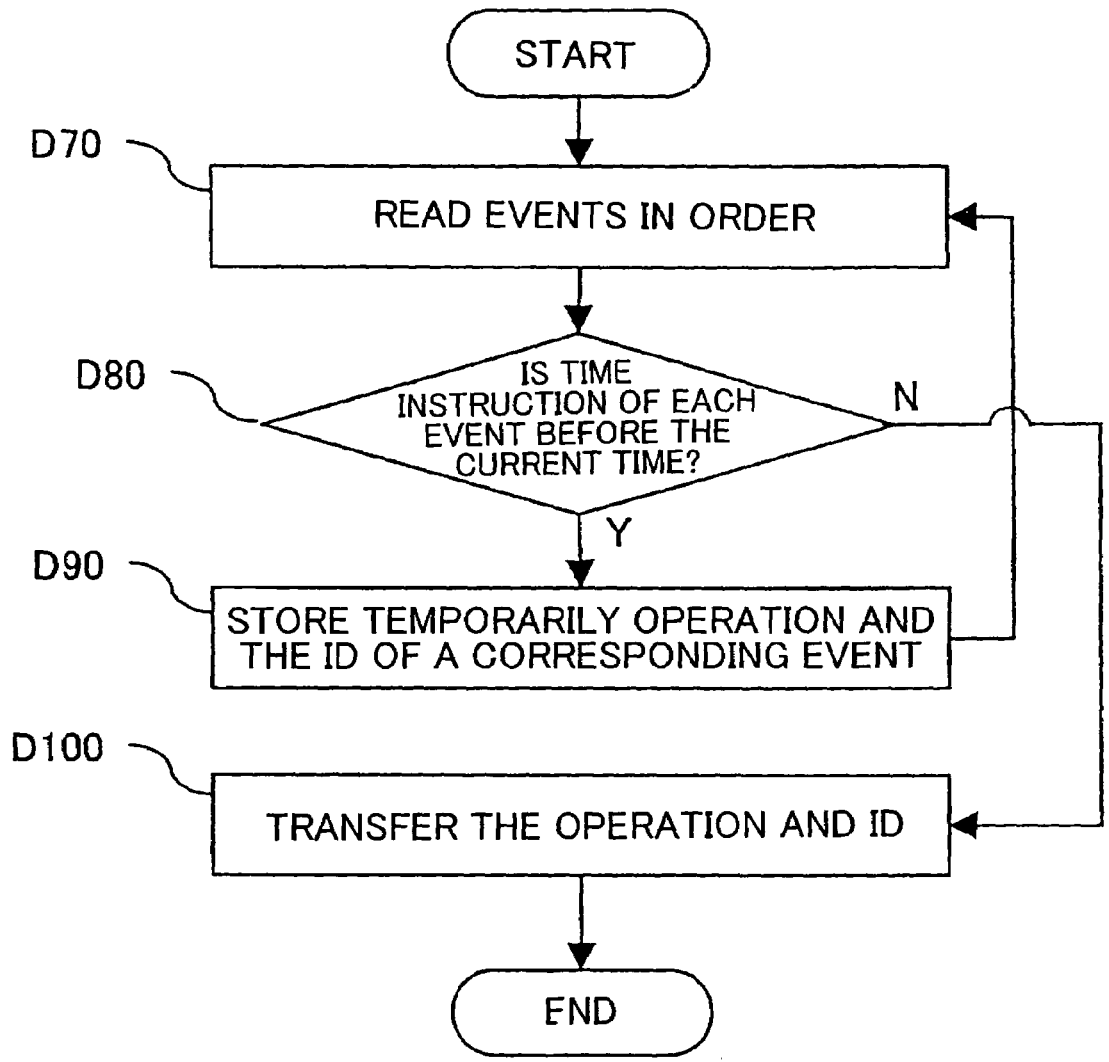
FIG. 31 is a flowchart showing an example of progress of a time management processing.

FIG. 31 is a flowchart showing an example of progress of a time management processing executed in a state where events are stored in the time manager 105. The time manager 105 starts reading events sequentially in the order from the event having the oldest time, from a schedule as a set of events stored in the chronographic order in the time manager 105 (step D70). The time manager 105 determines whether or not specified time of each read event is before or just the current time (step D80).

If the specified time of an event is before or just the current time (Y in the step D80), the time manager 105 stores temporarily the ID of the event (i.e., the ID of the rule stored together with the event) and the type of operation (C090). Further, the time manager 105 continues reading successive events sequentially (step D70), and the processing described above is repeated until the specified time of a read event is after the current time.

When the specified time of a read event is after the current time, i.e., when the specified time is not before or just the current time (N in the step D80), those IDs and types of operation that have been read and temporarily stored are transferred to the access control list setting means 106 as the current time (step D100).

However, if the time information corresponding to the first event in a schedule, reading of which has been started, is indicative of future time after the current time, i.e., if there is no time notification to be transferred to the access control list setting means 106. The time manager 105 exits without performing any processing.

The time manager 105 repeatedly executes the operation as described above at a predetermined interval.

Figure 32:
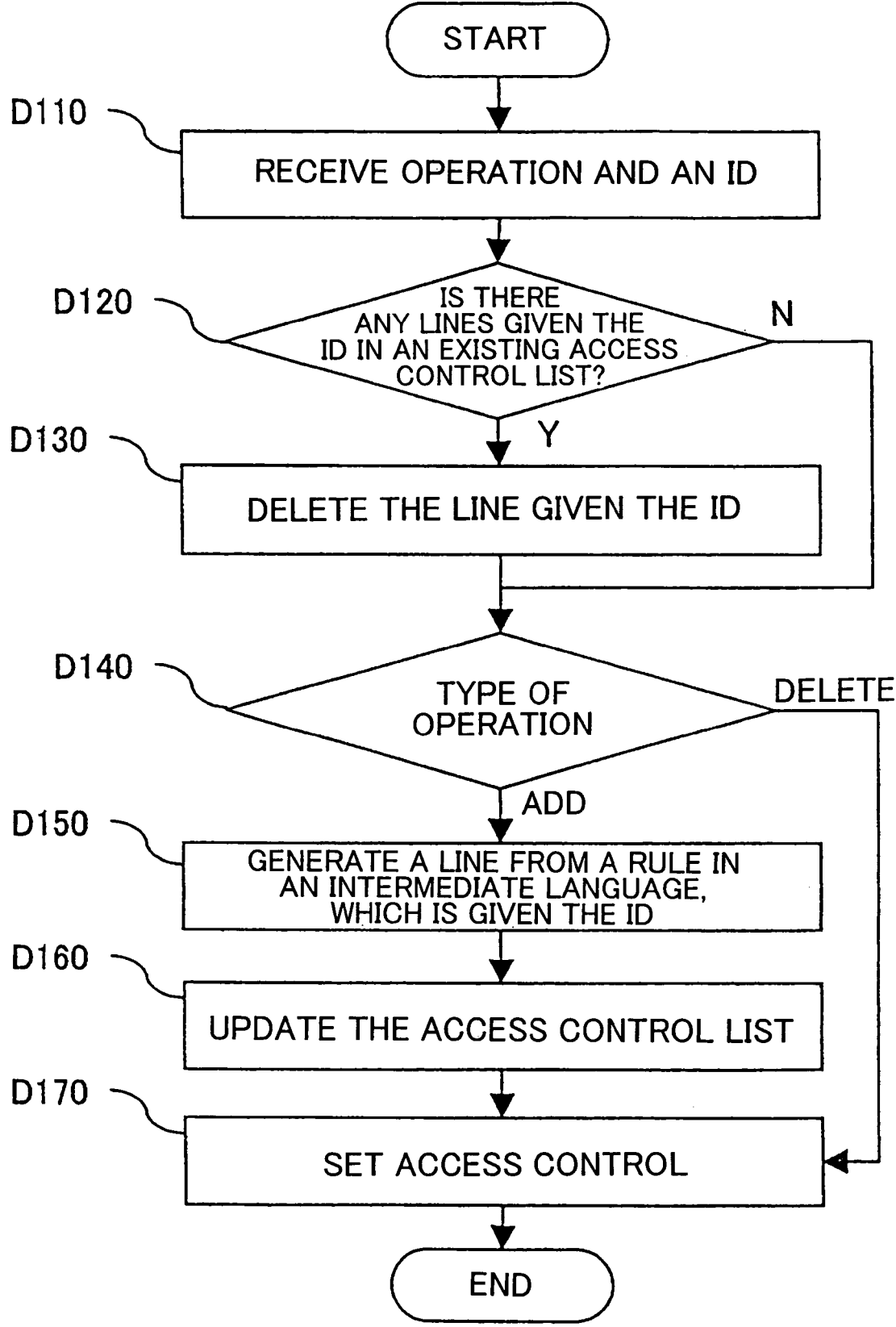
FIG. 32 is a flowchart showing an example of progress of a processing of updating an access control list.

FIG. 32 is a flowchart showing an example of progress of the processing of updating an access-control list. Upon reception of, for example, an ID and an operation type as a time notification from the time manager 105, the access control list setting means 106 starts up and begins processing (step D110). The processing in which the access control list setting means 106 receives the ID and operation type corresponds to the processing in the step D100 executed by the time manager 105. The access control list setting means 106 instructs the access control list storage 301 to search for and delete those lines that correspond to the ID received as a time notification, from the access control list stored in the access control list storage 301. The ID received as a time notification is an ID taken over from an access control policy. Therefore, this means that existing lines generated from an updated access control policy are instructed to be searched for and deleted. If any line given a specified ID exists (Y in the step D120), the access control list storage 301 deletes the line given the ID (step D130). If there is no line given the ID, the processing flow goes to the step D140 without performing the step D130.

After letting the access control list storage 301 delete such lines, the access control list setting means 106 determines the operation type received as a time notification (step D140). If the operation type is "addition", the access control list setting means 106 generates lines from those rules of an intermediate language that are given the ID received as a time notification (step D150).

Figure 33:
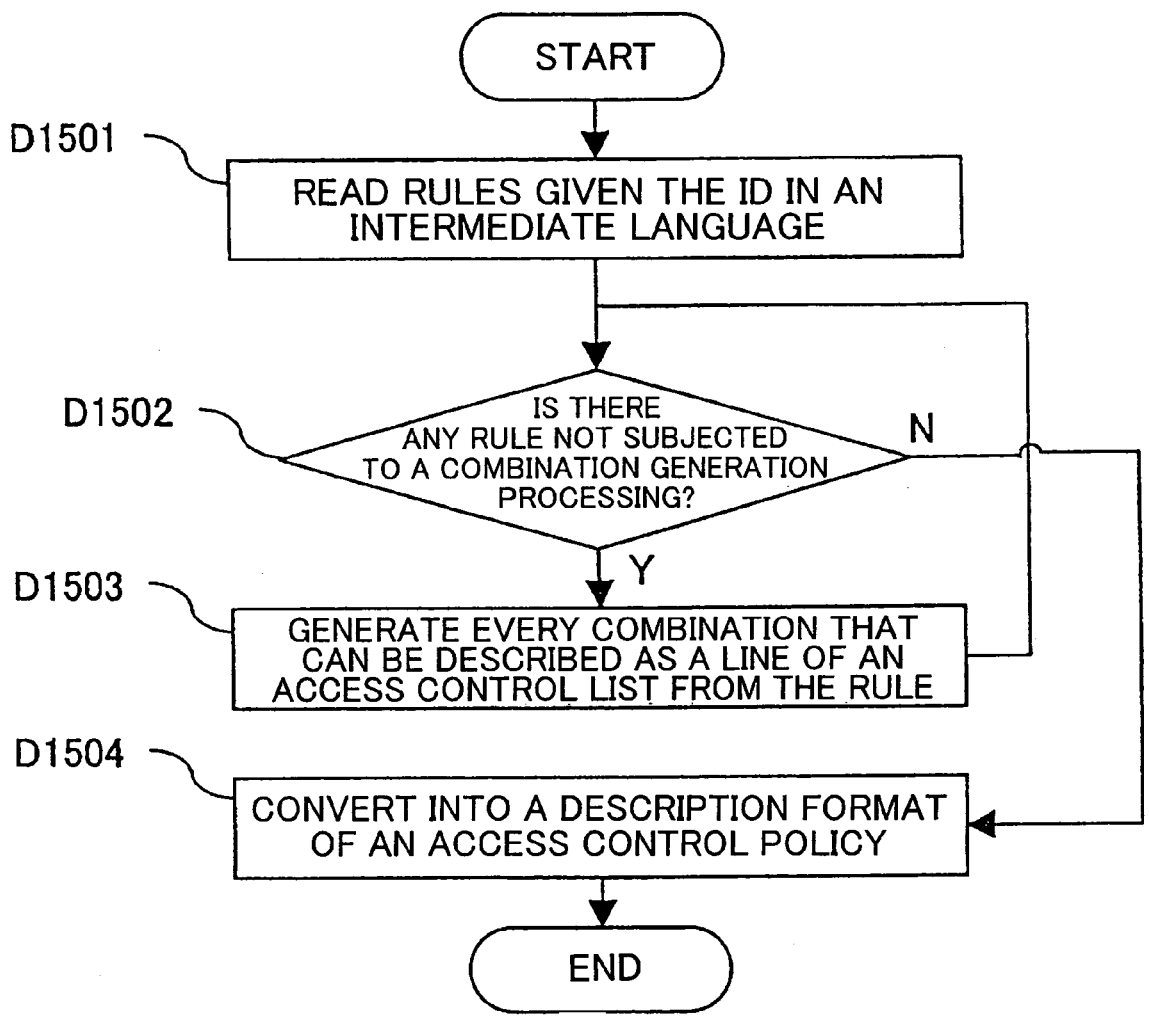
FIG. 33 is a flowchart showing an example of progress of a line generation processing.

FIG. 33 is a flowchart showing an example of progress of line generation processing in the step D150. The access control list setting means 106 requests those rules in the intermediate language that are given the ID received as a time notification from the intermediate language storage 104, and reads those rules (step D1501). The access control list setting means 106 determines whether or not there is a rule which is not yet subjected to the after-mentioned step D1503 (e.g., combination generation processing) among the read rules (step D1502). If there is a rule not yet subjected to the combination generation processing (Y in the step D1502), the access control list setting means 106 generates every combination that can be described as a line in the access control list (step D1503). In the step D1503, the same processing as in the step A503 is carried out.

If there remains no rule which is not yet subjected to the combination generation processing (step D1503) among the rules read from the intermediate language storage 104 (N in the step D1502), the access control list setting means 106 converts each of generated combinations into the description format (a line) of the access control list. Thus, lines are generated (step D1504).

Subsequently, the access control list setting means 106 transfers generated lines to the access control list storage 301. The access control list storage 301 receives lines from the access control list setting means 106, and adds the received lines to the existing access control list stored in the access control list storage 301, to update the access control list (step D160). After updating the access control list, the access control list setting means 106 instructs the access controller 302 on the setting of access control. The access controller 302 which has received the setting instruction reads the access control list from the access control list storage 301, and executes access control in accordance with the contents thereof (step D170).

In the determination in the step D140, if the operation type is "deletion", the access control list setting means 106 does not carry out the processings of the steps D150 and D160 but carries out the processing of the step D170. That is, the access controller 302 is let execute access control, based on the access control list from which lines have been deleted in the step D130.

The present embodiment is configured to have the intermediate language storage 104 and the time manager 105. Therefore, it is possible to write an access control policy dealing with time and to make the access control policy effective within a written time band. For example, by writing an access control policy for an adhoc group which exists only within a particular time band, it is possible to add dynamically only necessary lines to the access control list and to delete also dynamically only unnecessary lines from the access control list, so that accesses from the adhoc group are enabled only within the time band.

The description made above suggests a case where the policy engine 1 is directly inputted with information concerning a time band (time) through the user interface shown in FIG. 29. However, as an alternative of the direct inputting of a time band, for example, a word or the like expressing a particular time band, such as "lunch break" or "weekday regular office hours", may be inputted through the user interface, to specify the time band expressed by the word or the like. In this case, the object knowledge storage may store such object knowledge which takes as name objects words such as "lunch break", "weekday regular office hours", "holiday (Saturday, Sunday, or a national holiday)", "Monday", "Tuesday", "first period of the schedule", "second period of the schedule", "first slot", "second slot", "test period", "vacation", a name of ceremony like "entrance ceremony" or "graduation ceremony", an event like "school festival" or "open campus", and the like and which also takes time bands and time points as substantial objects. Further, when the policy analyzer 103 receives any of these words, the policy analyzer 103 makes the knowledge database 2 expand the word as a start point, to obtain information concerning a time band or time from the knowledge database 2. The other operations are the same as those explained in the fourth embodiment. Although "lunch break" and the like have been cited above as examples of name objects, these words are merely examples. That is, any word can become a name objects as long as the word indicates a time band or a time point.

Fifth Embodiment

Figure 34:
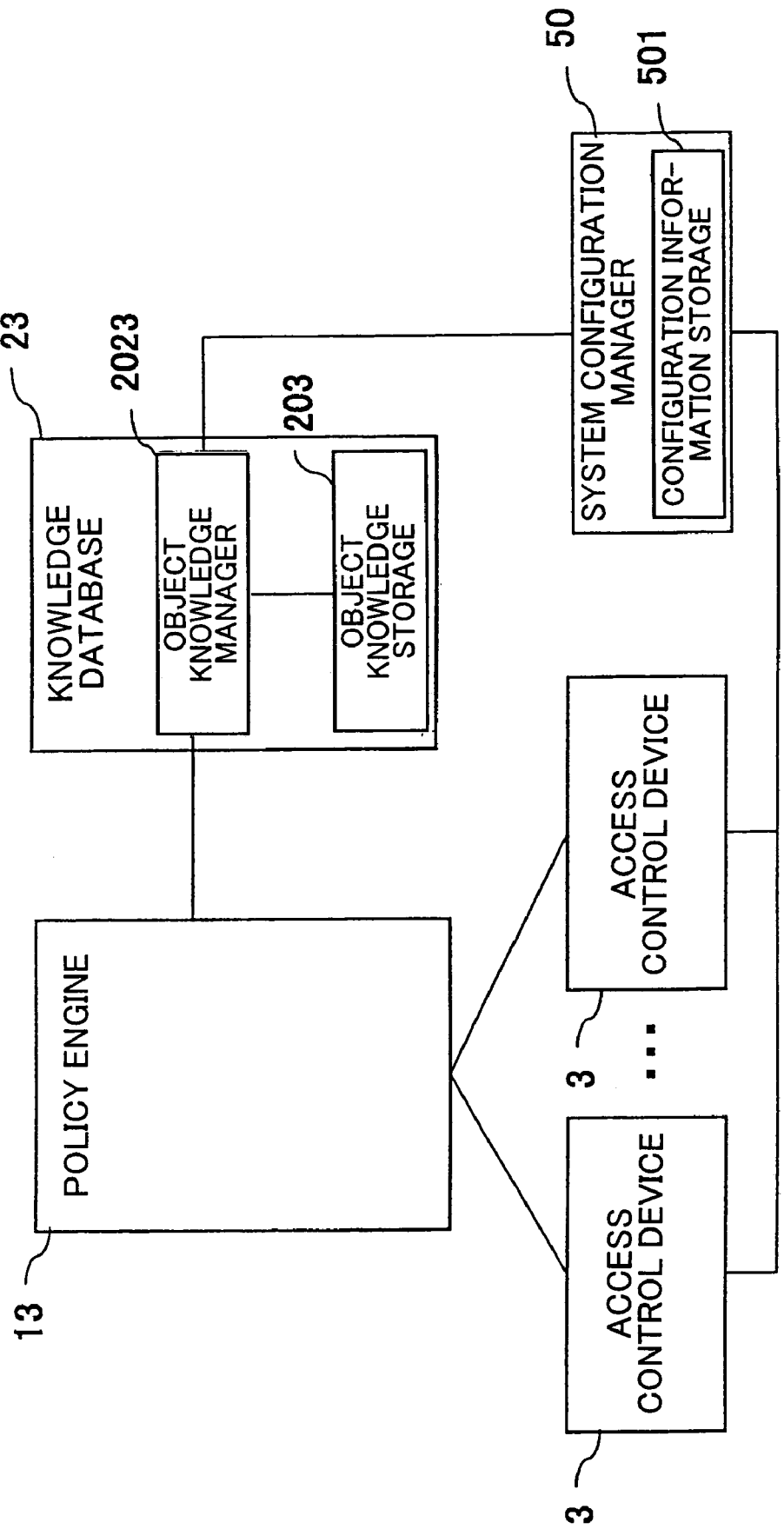
FIG. 34 is a block diagram showing a fifth embodiment of the access control system according to the present invention.

FIG. 34 is a block diagram showing a fifth embodiment of the access control system according to the present invention. In the access control system according to the fifth embodiment, a system configuration manager 50 is added to the structure of the access control system according to the third embodiment. In addition, the policy engine 13 has plural access control devices 3. The present embodiment need not include the object knowledge editor 201 shown in FIG. 23.

The system configuration manager 50 has a configuration information storage 501 for storing at least configuration information of the access control devices 3. In the following, a description will be made of an example in case where the system configuration manager 50 is a computer which operates in accordance with a program and is separate from the knowledge database 23, each access control device 3, and policy engine 13. The system configuration manager 50 is connected to each access control device 3 connected to at least the policy engine. The system configuration manager 50 stores operating states and layouts of the respective access control devices 3 into the configuration information storage 501. When the configuration information (or operating states and layouts of the access control devices 3) is changed as any of the access control devices 3 stops or as a new access control device 3 is installed, the system configuration manager 50 notifies the change to the object knowledge manager 2023 of the knowledge database 23.

Also, in the present embodiment, the object knowledge storage 203 stores object knowledge concerning the access control devices. Name objects contained in the object knowledge concerning the access control devices express identifiers of the access control devices 3 connected to the policy engine 13. That is, identifiers for identifying the individual access control devices 3 are name objects. In addition, substantial objects contained in the object knowledge express states of the access control devices, e.g., "operating", "stop", and the like.

The policy storage 1023 (not shown in FIG. 34 but shown in FIG. 23) included in the policy engine 13 stores access control policies. Each access control policy in the present embodiment defines a condition described depending on the status of the access control device 3, as a condition which makes the access control policy effective. For example, in an access control policy, a condition is written: "effective if an access control device having an identifier "FW001" is "operating"".

Next, operations will be described.

Figure 35:
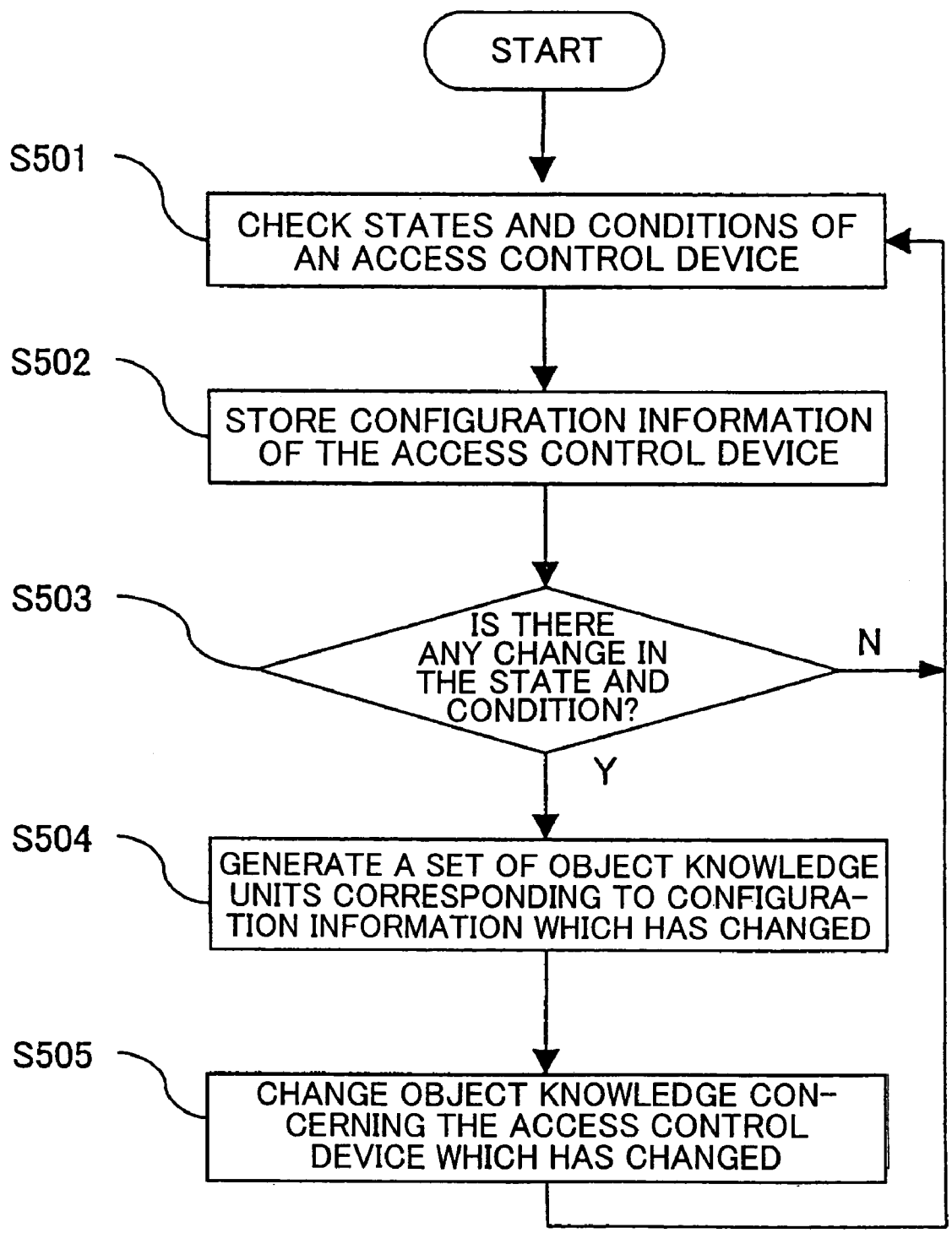
FIG. 35 is a flowchart showing an example of operation of the access control system according to the fifth embodiment.

FIG. 35 is a flowchart showing an example of operation of the access control system according to the present embodiment. At first, the system configuration manager 50 periodically generates an active/inactive check signal to each access control device 3, to inspect the current condition and state of each access control device 3 (step S501). Each access control device 3 which has received the active/inactive check signal generates a response signal to the system configuration manager 50. The system configuration manager 50 inspects the current condition and the like of each access control device 3 depending on successful/failed reception of the response signal. That is, if a response signal is received, the access control device 3 which has sent the response signal is determined as operating. Otherwise, if no response signal is received, the access control device 3 is determined as not operating (or being suspended).

The system configuration manager 50 updates configuration information depending on the inspection result in the step S501, and stores the current configuration information (step S502). FIG. 36 shows an example of data configuration of the configuration information. As shown in FIG. 36, the configuration information is expressed by combinations of identifiers of the access control devices 3 and operation state flags indicative of "operating" or "suspended". The system configuration manager 50 sets "operating" in those operation state flags that correspond to access control devices determined as operating. On the other side, "suspended" is set in those operation state flags that correspond to access control devices determined as being suspended. The system configuration manager 50 stores the configuration information thus set.

A form of inspection in the step S501 will be described more specifically. For example, the system configuration manager 50 and each access control device 3 are connected via an IP network. SNMP (Simple Network Management Protocol) packets or ICMP (Internet Control Message Protocol) packets may be used for active/inactive check signals and response signals. In this inspection form, the system configuration manager 50 is capable of managing the configuration information concerning operating access control devices 3 on real time.

In another inspection form, respective access control device 3 send periodically heartbeat signals including their own identifier to the system configuration manager 50. The system configuration manager 50 may manage the configuration information concerning operating access control devices 3, based on the heartbeat signals received.

After the step S502, the system configuration manager 50 checks whether or not the configuration information stored in the step S502 has changed (step S503). A preferred example of the check method will be as follows. When storing configuration information into the configuration information storage 501 in the step S502, the configuration information storage 501 may be let hold an "update flag" indicating that the operating state of an existing identifier has been updated and that a new combination of an identifier and an operating state has been added. The system configuration manager 50 is capable of checking whether the configuration information has been change or not. In another preferred example, the configuration information storage 501 may be provided with at least two memory slots. When storing (or memorizing) the configuration information in the step S502, the configuration information is stored into a different memory slot from that previously stored the configuration information. The system configuration manager 50 is capable of checking changes in the configuration information by comparing the contents of the two memory slots, i.e., the memory slot used the last time and the other memory slot used currently.

If the configuration information has been changed (Y in the step S503), the system configuration manager 50 generates a combination of the identifier of an access control device 3 which has changed into a suspended state or the identifier of an access control device 3 which has newly started operating and a operation state after the change is generated as a object knowledge unit. A set of object knowledge units for all the access control devices 3 states of which have changed is inputted to the object knowledge manager 2023 (step S504). FIG. 37 is an explanatory view showing an example of the object knowledge unit. One object knowledge unit consists of a combination of an identifier of a device whose operation state has changed and an operation state after the change. For example, an object knowledge unit consists of two columns one of which includes an identifier of an access control device 3 and the other of which includes an operation state. Data in which object knowledge units are arranged in a string is generated as a set of object knowledge units (see FIG. 37).

Further, the object knowledge manager 2023 stores the set of object knowledge units inputted from the system configuration manager 50 into the object knowledge storage 203 (step S505). At this time, if a name object having the same identifier as any of the object knowledge units has already been stored in the object knowledge storage 203, the object knowledge manager 2023 replaces the content of the substantial object expanded from the name object with the operation state included in the object knowledge unit. With respect to object knowledge units having new identifiers, the new identifiers are added as name objects to the object knowledge. Further, the operation states corresponding to the new identifiers are added as substantial objects expanded from the added name objects, to the object knowledge.

Thereafter, the object knowledge manager 202 notifies the policy engine 13 of the change in the object knowledge, like the object knowledge manager 2023 in the third embodiment. The access control list is thereby updated in accordance with the stored access control policy. That is, the policy analyzer 1033 (not shown in FIG. 34 but shown in FIG. 23) is notified of name objects (identifiers) whose substantial objects (operation states) have been changed and newly added name objects (identifiers). Thereafter, the successive operations from the step C40 may be carried out. In an access control policy, for example, a condition is written: "effective if an access control device having an identifier "FW001" is "operating"". Therefore, whether a name object (identifier) is used in an access control policy or not can be determined in the step C40. The subsequent operations from the step C40 are the same as those in the third embodiment.

According to the access control system of the present embodiment, a proper access control list can automatically be set in response to changes in the system configuration, such as suspension, restart, deletion, and addition of an access control device 3.

Sixth Embodiment

Figure 38:
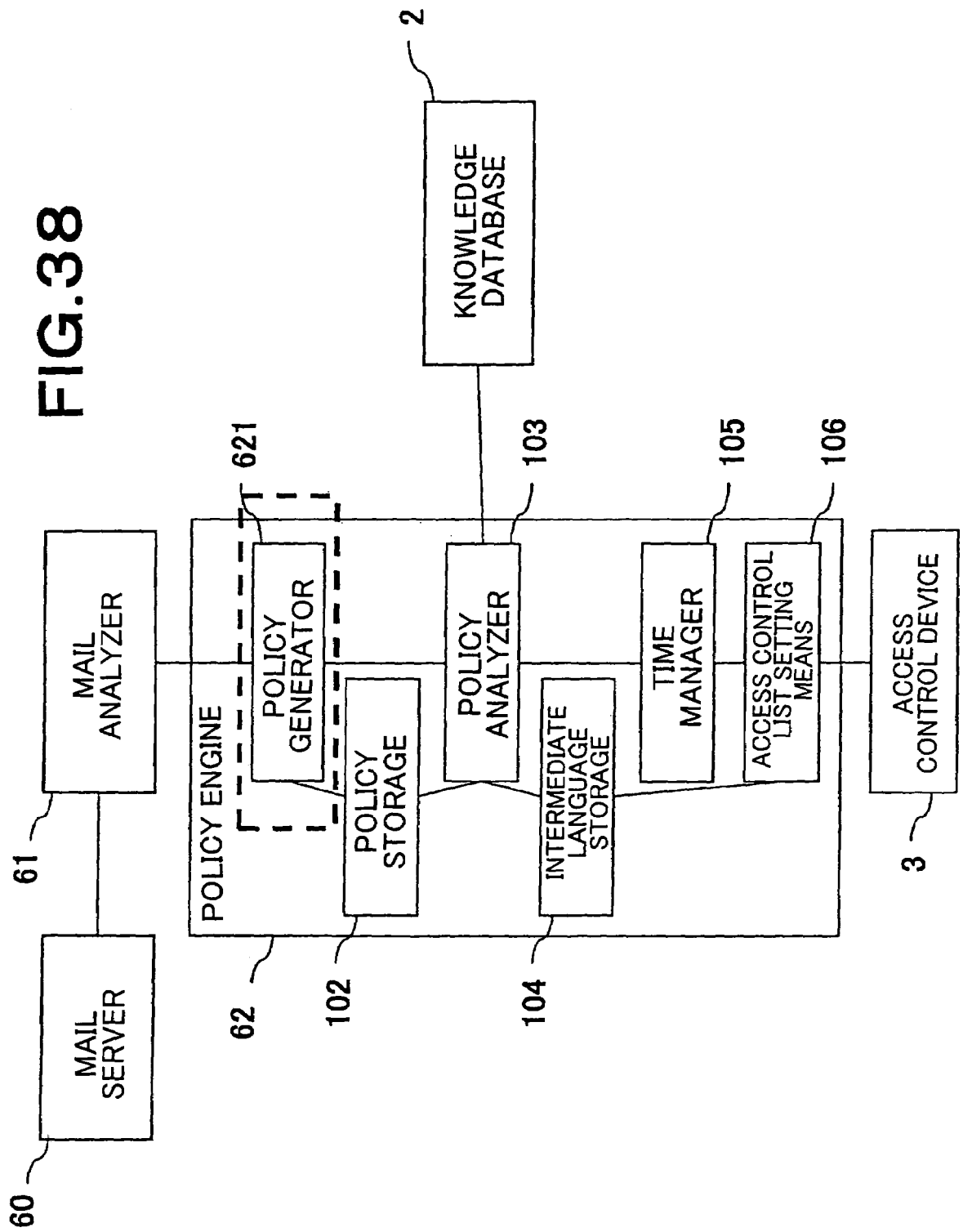
FIG. 38 is a block diagram showing a sixth embodiment of the access control system according to the present invention.

FIG. 38 is a block diagram showing a sixth embodiment of the access control system according to the present invention. The access control system in the sixth embodiment has a mail server 60 and a mail analyzer 61 in addition to the configuration of the access control system according to the fourth embodiment. However, the policy engine 62 in the sixth embodiment differs from the policy editor 101 of the policy engine 1 in the fourth embodiment, in the point that the policy engine 62 has a policy generator 621.

The mail analyzer 61 receives an inputted mail newly delivered from the mail server 60 which delivers mails. The mail analyzer 61 analyzes the contents of the mail and determines whether or not the mail is a meeting notification. If the mail is a meeting notification, the mail analyzer 61 inputs meeting information to the policy generator 621. In this case, the following description will be made of an example in case where the mail analyzer 61 is a computer that operates in accordance with programs, separately from the policy engine 61, knowledge database 2, and access control devices 3.

The policy generator 621 receives the meeting information inputted from the mail analyzer 61. The policy generator 621 automatically generates an access control policy, based on the meeting information, and stores the access control policy into the policy storage 102. The policy generator 621 is constituted by a CPU which operates in accordance with programs, and a communication interface to the mail analyzer 61. A common CPU may be used in place of CPUs constituting means which the policy engine 62 has.

Next, operations will be described below.

Figure 39:
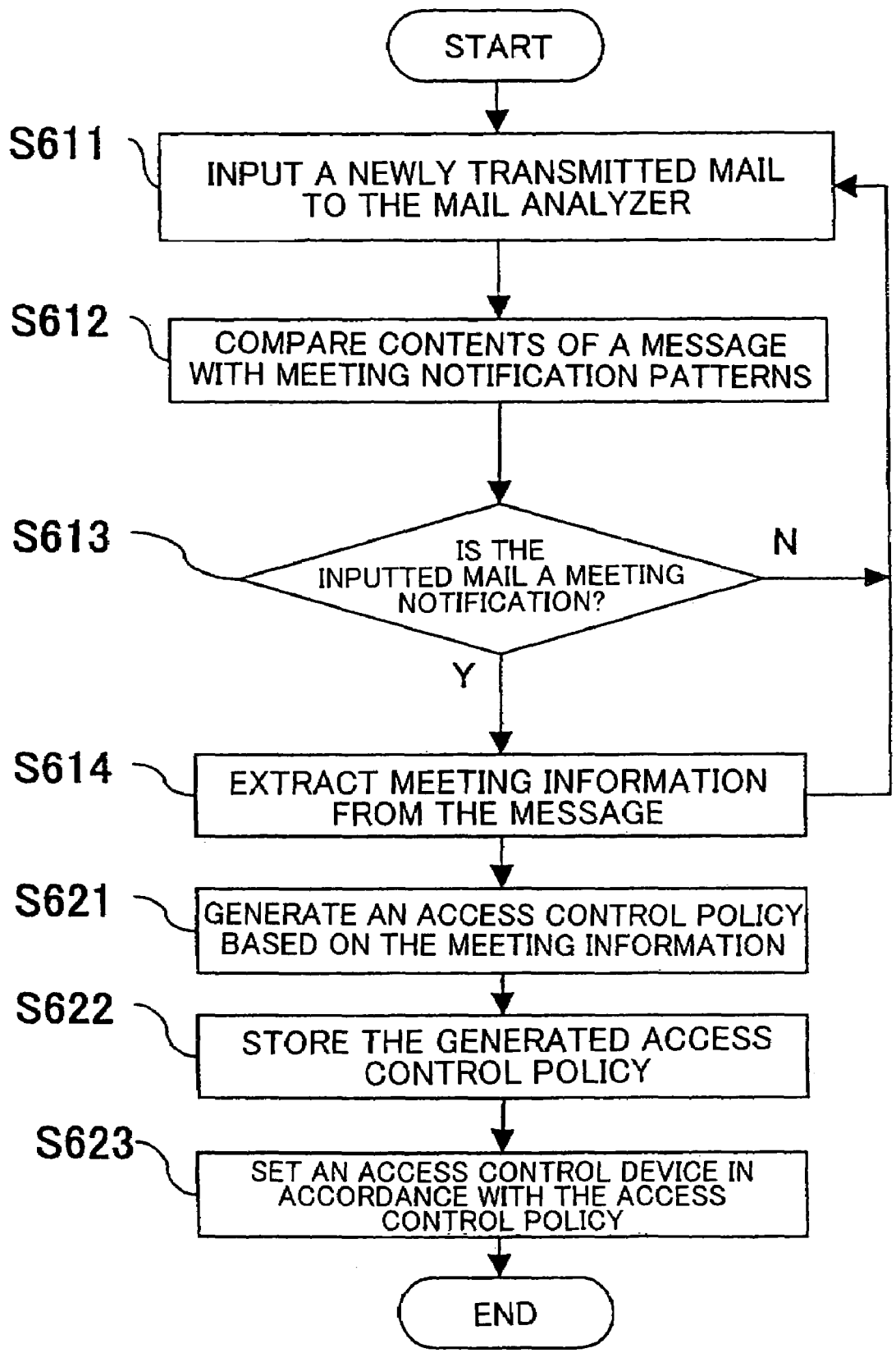
FIG. 39 is a flowchart showing an example of progress of a processing of performing access control setting based on a received mail.

FIG. 39 is a flowchart showing an example of progress of a processing for setting access control, based on a mail received by the access control system according to the present embodiment. At first, the mail server 60 inputs a mail, which the server is newly asked to deliver, to the mail analyzer 61 before delivering the mail to an actual address (step S611).

Every time a new mail is inputted from the mail server 60, the mail analyzer 61 performs morphological analysis for every component, such as a Subject field, To/Cc field, and body, and compares the components with predetermined meeting notification patterns (step S612). As a specific example of the meeting notification pattern, it is possible to use phrase generation patterns such as "month/date", "meeting", "regarding", and the like in subject fields or a body.

Subsequently, the mail analyzer 61 determines whether the inputted mail is a meeting notification or not from a result of the comparison processing in the step 612 (step S613). If the inputted mail does not correspond to any predetermined meeting notification pattern (N in the step S613), the mail analyzer 61 aborts subsequent processings, and waits until a new mail is inputted. Otherwise, if the inputted mail corresponds to a meeting notification pattern (Y in the step S613), the mail analyzer 61 extracts "meeting information" including at least the date/time, location, and members of a meeting, and inputs the information to the policy generator 621 of the policy engine 62 (step S614).

Next, the policy generator 621 generates a proper access control policy from the inputted meeting information (step S621). More specifically, a user group definition is created, based on the date/time and location of the meeting and the members as participants for every location. In addition, the policy generator 621 determines a service used between different locations, i.e., between different network domains, and generates a shared resource group definition. To determine the service, HTTP (TCP port no. 80), Windows® network sharing service (TCP port nos. 137 to 139), or the like may be defined as a service which is popularly and ordinarily used to share files.

Figure 40:
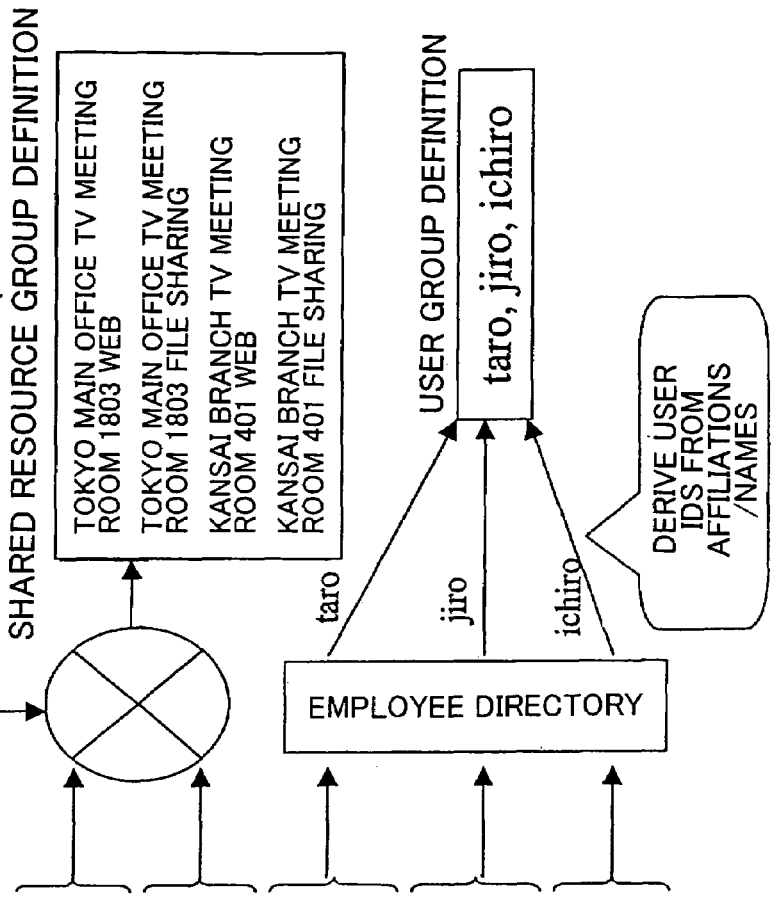
FIG. 40 is an explanatory view showing a generation state of a user group definition and a shared resource definition.

FIG. 40 is an explanatory view showing a state of generating a user group definition and a shared resource definition. The policy generator 621 stores in advance affiliations and names of those members who are supposed to attend a meeting, and correspondences to their user IDs. Based on the affiliations and names of members included in inputted meeting information, the policy generator 621 extracts corresponding user IDs. A set of these user IDs is a group definition. Also, the policy generator 621 combines predefined various services with various location information items included in the meeting notification information. A set of combinations obtained by this processing is a shared resource group definition. The policy generator 621 prepares an access control policy by use of the user group definition (user IDs) in place of a user group. Therefore, in this case, substantial objects are written with respect to a user group from the beginning of the processing. In addition, the policy generator 621 writes, as "locations", locations included in the meeting information (e.g., "Tokyo main office TV meeting room 1803", etc.), into the access control policy. Also, the policy generator 621 writes the shared resource group definition as a "resource". That is, in this case, the name of a server is not directly written as a "resource" but a combination of a location and a service is written, e.g., "Tokyo main office TV meeting room 1803 file sharing" is written. In the present example, this means a "resource used when sharing files in the TV meeting room 1803 in the Tokyo main office". Note that the knowledge database 2 stores object knowledge (e.g., object knowledge concerning resources) which includes "Tokyo main office TV meeting room 1803 file sharing" as a name object and has a path to another object from such a name object. Therefore, substantial objects can be expanded from a name object such as "Tokyo main office TV meeting room 1803 file sharing" included in the shared resource group definition.

Also, the policy generator 621 writes time information included in the meeting notification information, as start time and end time of a time band in which the access control policy is effective, into the access control policy.

The policy generator 621 stores the generated access control policy into the policy storage 102 (step S622). At this time, the policy editor 1011 (or policy storage 1021) assigns an ID to the generated access control policy. Thereafter, the newly stored access control policy is converted into an access control list, like the policy engine 1 in the fourth embodiment. The access control list is set in the access control device 3 in conformity with meeting start time (step S623). Specifically, the operation in the step S623 is similar to the operations in the steps D30 to D60, D70 to D100, and D110 to D170 in the fourth embodiment.

Figure 41:
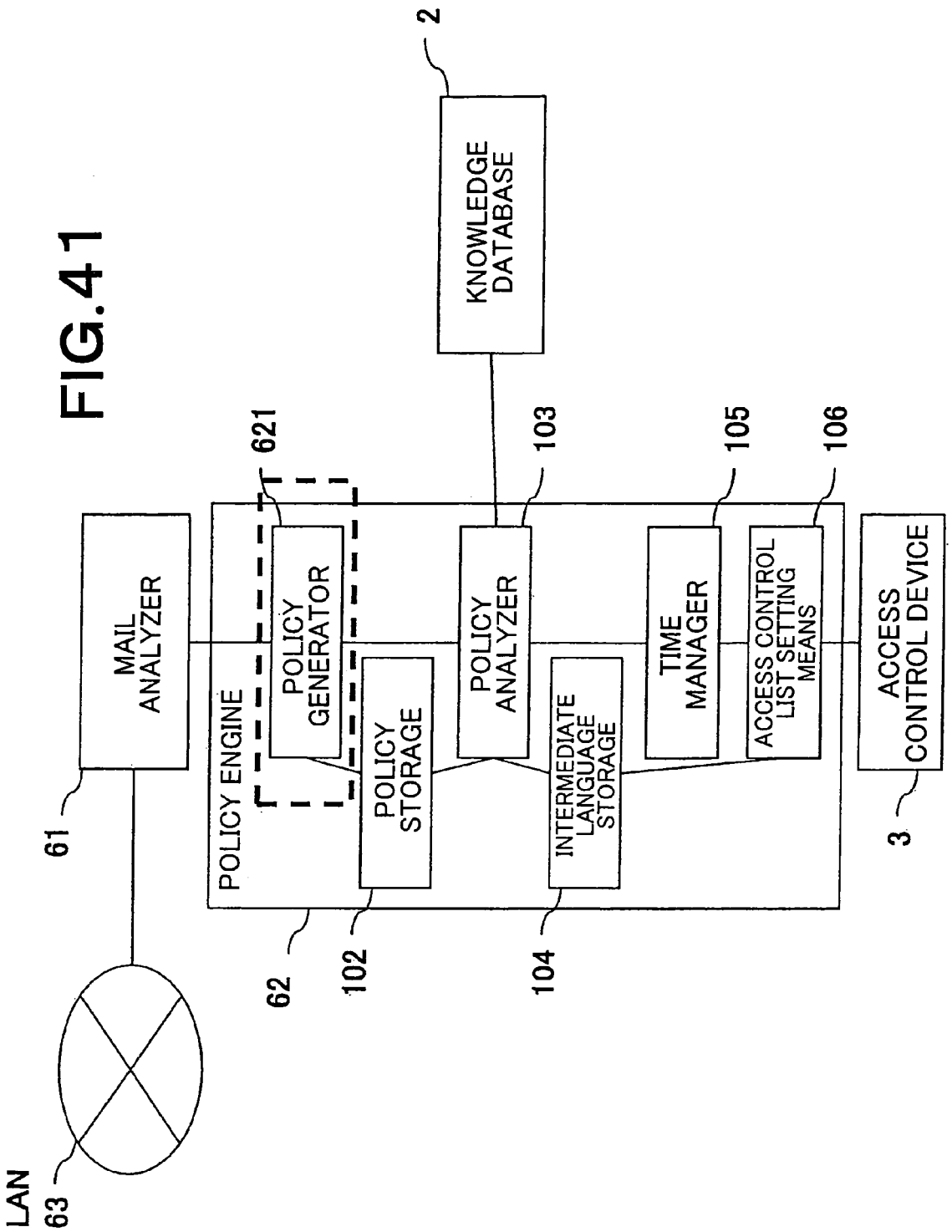
FIG. 41 is a block diagram showing a modification of the sixth embodiment.

FIG. 41 is a block diagram showing a modification of the sixth embodiment. As shown in FIG. 41, the mail analyzer 61 may monitor traffic of the LAN 63, to analyze SMTP traffic and detect transmission of a new mail. The operations after the mail analyzer 61 has detected a new mail are the same as the operations from the step S612.

According to the present embodiment, additional edit operations on access control policies need not be carried out, to conduct mutual communication between different network domains, which is necessary for a remote meeting. A proper access control list can be automatically set through a meeting notification by use of mails which are exchanged ordinarily. Therefore, conveniences for users can be improved much more.

Seventh Embodiment

Figure 42:
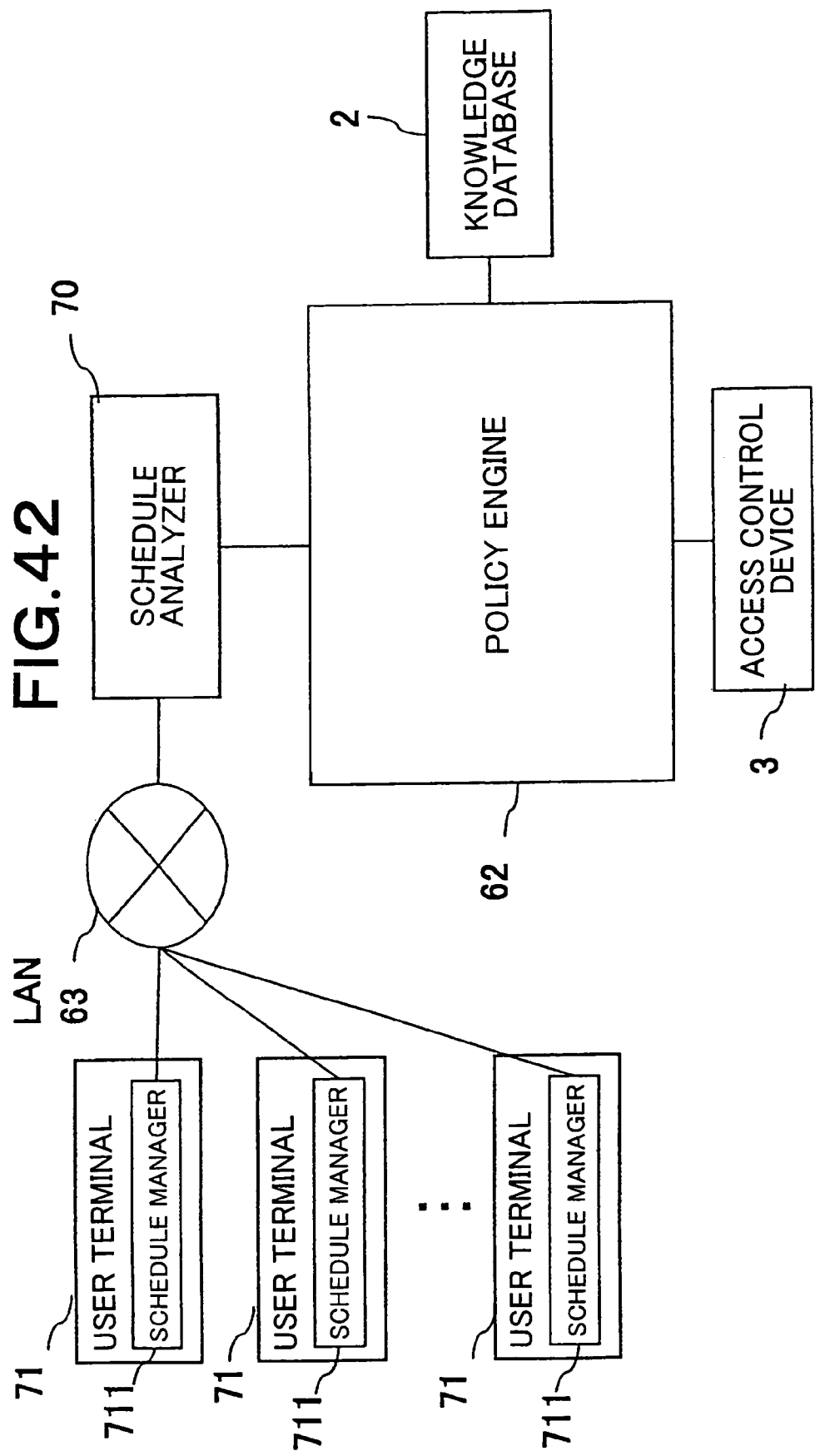
FIG. 42 is a block diagram showing a seventh embodiment of the access control system according to the present invention.

FIG. 42 is a block diagram showing a seventh embodiment of the access control system according to the present invention. The access control system in the seventh embodiment has a schedule analyzer 70 in place of the mail analyzer 61 in the access control system according to the sixth embodiment. The schedule analyzer 70 is connected to at least one user terminal 71 through a LAN 63. The following description will be made to a case where the schedule analyzer 70 is a computer which operates in accordance with programs, separately from the policy engine 61, knowledge database 2, and access control device 3.

The user terminal 71 has a schedule manager 711 for storing and managing a schedule inputted by a user. Every time new schedule information is inputted, the schedule manager 711 transmits the contents of the schedule information to the schedule analyzer 70 via the LAN 63. The user terminal 71 needs only to be a device capable of inputting and storing the schedule information and of transmitting the schedule information to the schedule analyzer 70.

The schedule analyzer 70 receives the newest schedule information transmitted from the user terminal 71 via the LAN 63. Further, the schedule analyzer 70 analyzes the schedule information, extracts meeting information, and inputs the meeting information to the policy engine 62.

Next, operations will now be described.

Figure 43:
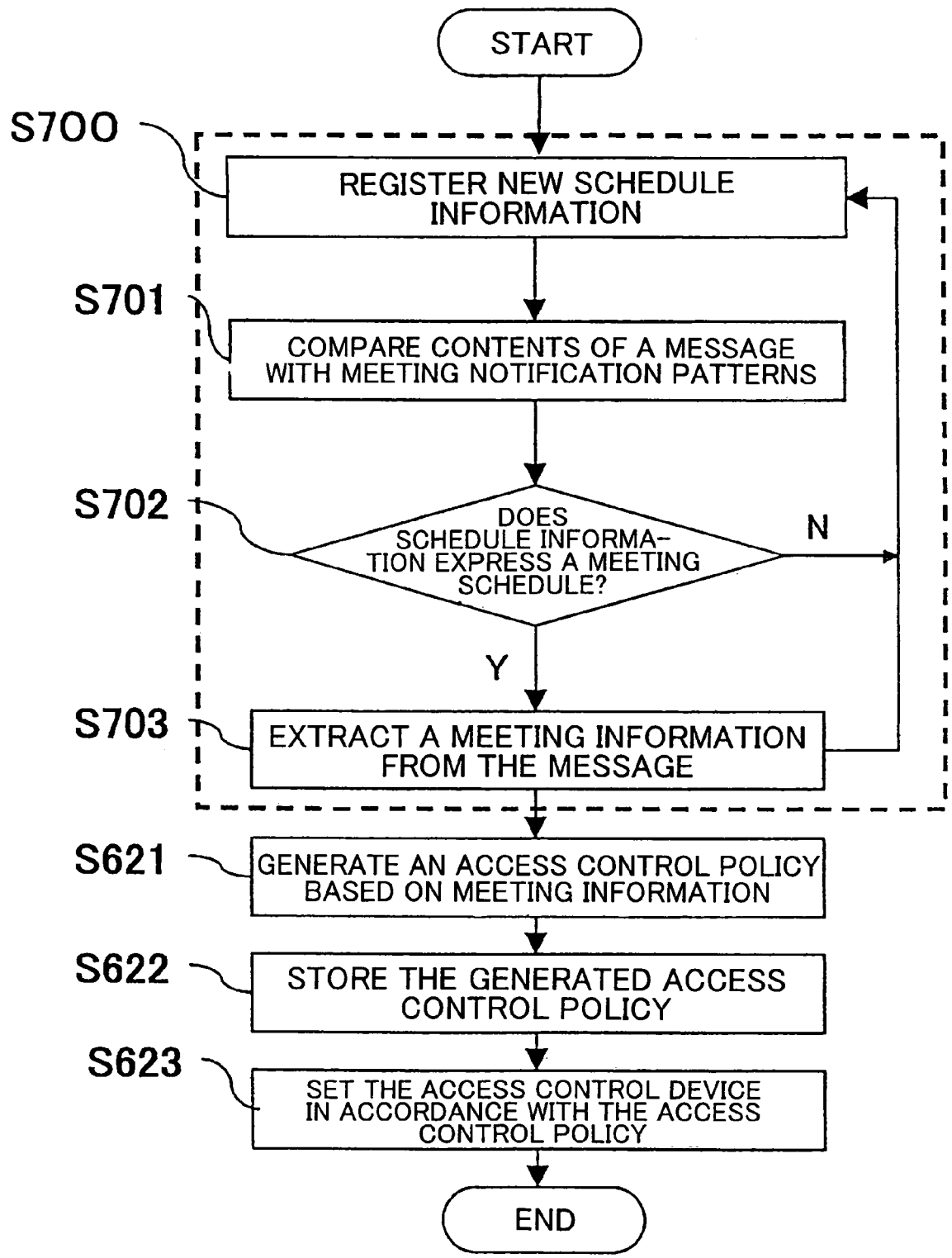
FIG. 43 is a flowchart showing progress of a processing of performing access control setting, based on received schedule information.

FIG. 43 is a flowchart showing an example of progress of the processing of setting access control on the basis of the schedule information received by the access control system according to the present embodiment. At first, the schedule manager 711 of an arbitrary user terminal 71 presents a user interface for inputting a schedule, to the user of the terminal, thereby inviting the user to input schedule information.

Figure 46:
FIG. 46 is an explanatory view showing an example of a user interface for inputting a schedule.

FIGS. 44 to 46 show examples of the user interface for inputting a schedule. The schedule manager 711 presents, for example, a date input screen as shown in FIG. 44, to prompt a date input when a plan is scheduled. Upon inputting of a date, the schedule manager 711 presents a time band input screen shown in FIG. 45, to prompt the user to input a time band in which a schedule plan is set. Upon inputting of a time band, the schedule manager 711 presents an action input screen shown in FIG. 46, to invite the user to input an action to be carried out in the inputted time band on the inputted date. Through the schedule manager 711, for example, an action such as a "meeting" or the like is selected from a pull-down menu. In addition, an input column for inputting a location scheduled to do the action, and members as participants to do the action with is displayed. Thus, information concerning a location scheduled to do the action and members as participants are inputted. On the screen shown in FIG. 46, when a "registration" button is clicked with a mouse, the schedule manager 711 stores the inputted information (date, time band, action, action-scheduled location, members as participants, etc.) (step S700). Upon storing the schedule information in the step S711, the schedule manager 711 transmits the schedule information to the schedule analyzer 70 through the LAN 63.

Next, the schedule analyzer 70 analyzes the contents of the schedule information inputted from the schedule manager 711, and compares the contents with predetermined meeting schedule patterns (step S701). For example, keyword strings such as a "meeting", "session (discussion)", and the like each equivalent or relevant to a meeting are prepared as schedule patterns. Those keyword strings may be compared with information of the contents of the action included in the received schedule information.

Further, as a result of the comparison processing in the step S701, the schedule analyzer 70 determines whether or not the inputted schedule information expresses a meeting schedule (step S702). If the schedule information does not coincide with the meeting schedule patterns (N in the step S702), the schedule analyzer 70 suspends subsequent processings, and waits until schedule information is newly inputted, in the step S700. Otherwise, if the inputted schedule information coincides with any meeting schedule pattern (Y in the step S702), the schedule analyzer 70 extracts "meeting information" including at least the date, location, and members as participants of the meeting, from the contents of the schedule information, and inputs the information to the policy engine 62 (step S703). The schedule analyzer 70 extracts the same meeting information as the mail analyzer 61 in the sixth embodiment extracts from a mail.

Thereafter, the policy engine 62 generates an access control policy from the meeting information by means of the policy generator 621 (not shown in FIG. 42 but shown in FIG. 38) and stores the policy into the policy storage 102, like in the sixth embodiment. The policy engine 62 then converts the newly stored access control policy into an access control list, and sets the access control list in the access control device 3 in conformity with the meeting start time (steps S621 to S623).

The operations in these steps S621 to S623 are the same as those in the steps S621 to S623 shown in the sixth embodiment.

According to the present embodiment, additional edit operations on access control policies need not be carried out, to establish mutual communication between different network domains, which is necessary for a remote meeting. A proper access control list can be automatically set through an ordinary schedule management. Therefore, conveniences for users can be improved much more.

If new schedule information is inputted in a state in which the schedule manager 711 in each user terminal 71 is separated from the LAN 63, the schedule manager 711 stores the schedule information into a storage device or the like which the schedule manager 711 has. Further, when a user terminal 71 is connected to the LAN 63, the stored schedule information may be transmitted to the schedule analyzer 70 at one time. This form of transmission for schedule information is particularly suitable when the user terminals 71 are mobile terminals.

Eighth Embodiment

Figure 47:
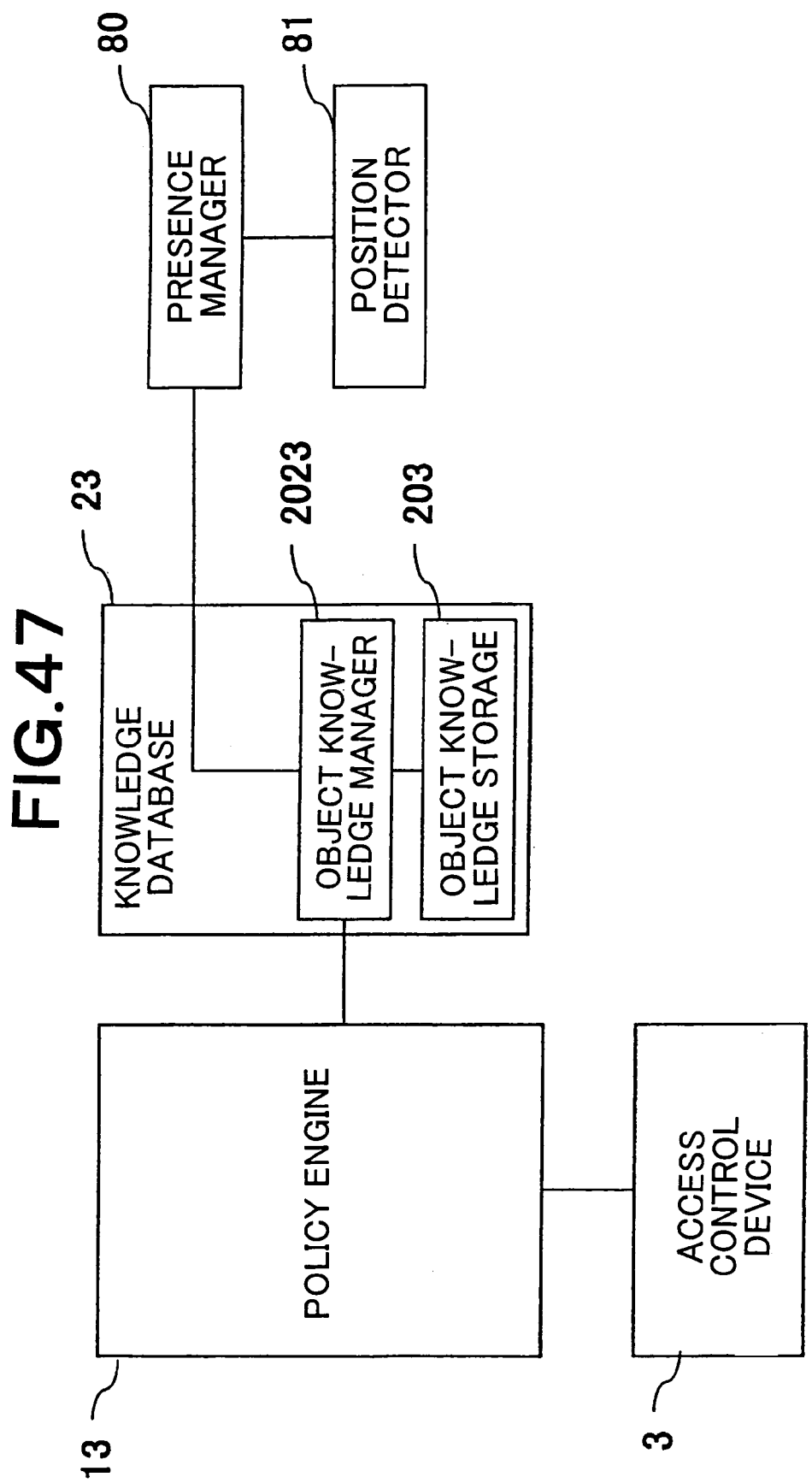
FIG. 47 is a block diagram showing an eighth embodiment of the access control system according to the present invention.

FIG. 47 is a block diagram showing an eighth embodiment of the access control system according to the present invention. The access control system according to the eighth embodiment has a presence manager 80 and a position detector 81 in addition to the configuration of the access control system according to the third embodiment. Note that the present embodiment need not include the object knowledge editor 201 shown in FIG. 23.

The position detector 81 internally has a wireless receiver, sensor, and the like. When a current position of a user having a wireless tag or the like is detected, the position detector 81 notifies the presence manager 80 of at least current position information of the user.

The presence manager 80 has a database (not shown in FIG. 47) which stores information indicative of at least correspondence between an arbitrary user and the current position of the user. FIG. 48 is an explanatory table showing an example of information which the database stores. As shown in FIG. 48, a user identifier such as "Morita" and a current position identifier such as "Kansai office" or the like representing a current position of the user are stored into the database, with the identifiers linked to each other. The presence manager 80 receives the current position information of each user from the position detector 81, and determines whether each user has moved or not. Further, the presence manager 80 updates the current position of any user who moved, on the database, and inputs at least a combination of the user who moved and the current position identifier thereof, to the object knowledge manager 2023 of the knowledge database 23. In this case, a description will be made of a case where the presence manager 80 is a computer which operates in accordance with programs, separately from the knowledge database 23, access control device 3, and policy engine 13. The following description will be made supposing that user identifiers shown in FIG. 48 are user IDs expanded from a user group.

In the present embodiment, the object knowledge storage 203 stores object knowledge concerning each user. A name object included in the object knowledge concerning each user expresses the user identifier (user ID) of each user. Therefore, the user ID is dealt with as a name object in the object knowledge concerning each user. Alternatively, the user ID is dealt with as a substantial object in object knowledge concerning a user group. In addition, the name object included in object knowledge concerning each user expresses a current position identifier.

The policy storage 1023 (not shown in FIG. 47 but shown in FIG. 23) included in the policy engine 13 stores an access control policy. An access control policy in the present embodiment defines a condition described by a current position of a user, as a condition which makes the access control policy effective. For example, an access control policy describes a condition, e.g., "effective if the current position of the user having a user identifier "Kato" is Kansai office".

Figure 49:
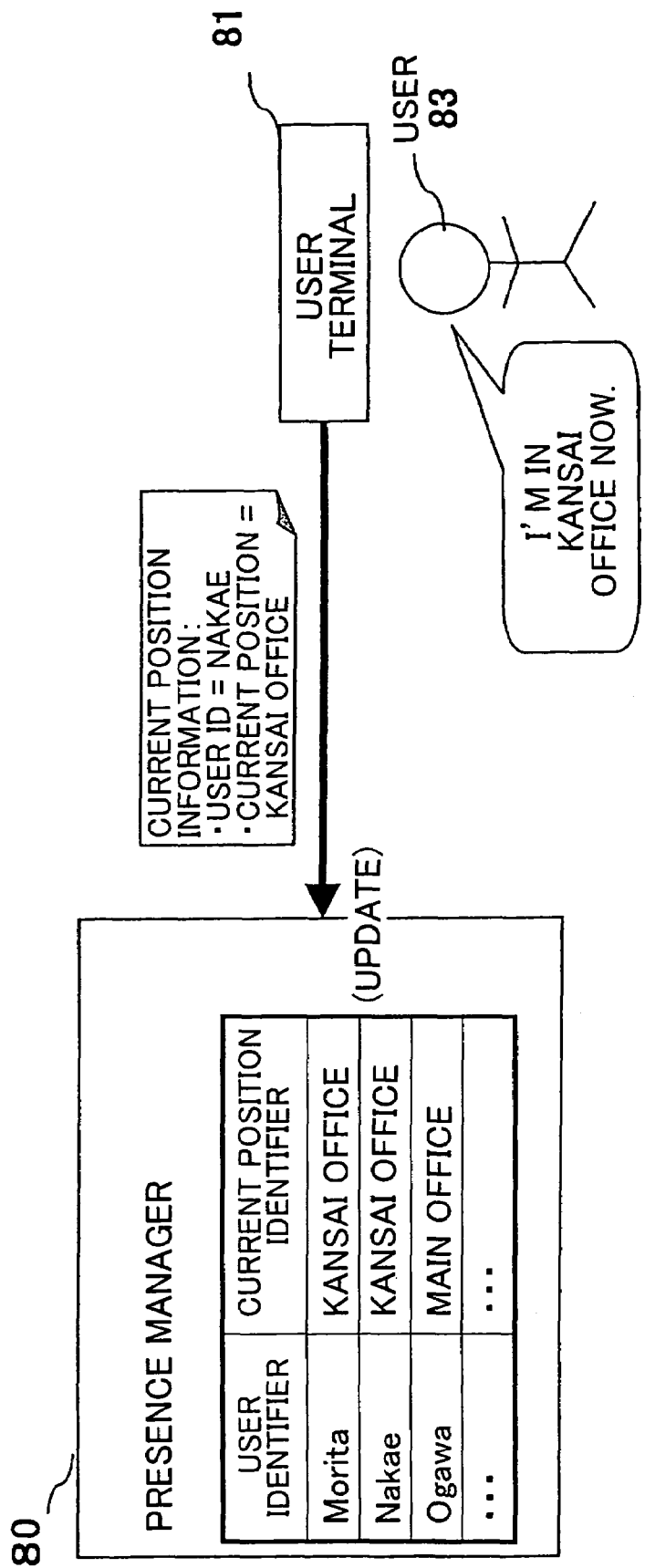
FIG. 49 is an explanatory diagram showing an example of a form in which a position detector notifies the presence manager of information on a current position.

Described next will be a form in which the position detector 81 detects the current position of a user and notifies the presence manager 80 of information about the current position. FIG. 49 shows a form in which a user terminal is inputted with current position information in response to a user's operation and transmits the current position information to the presence manager 80. The user terminal (position detector) 81 shown in FIG. 49 is inputted with, for example, information indicative of a user ID "nakae" and a current position "Kansai office" by an operation from a user 83. Further, the user terminal 81 transmits inputted information to the presence manager 80 in accordance with an operation made by the user 83. The presence manager 80 updates the database, based on information received from the user terminal 81.

Figure 50:
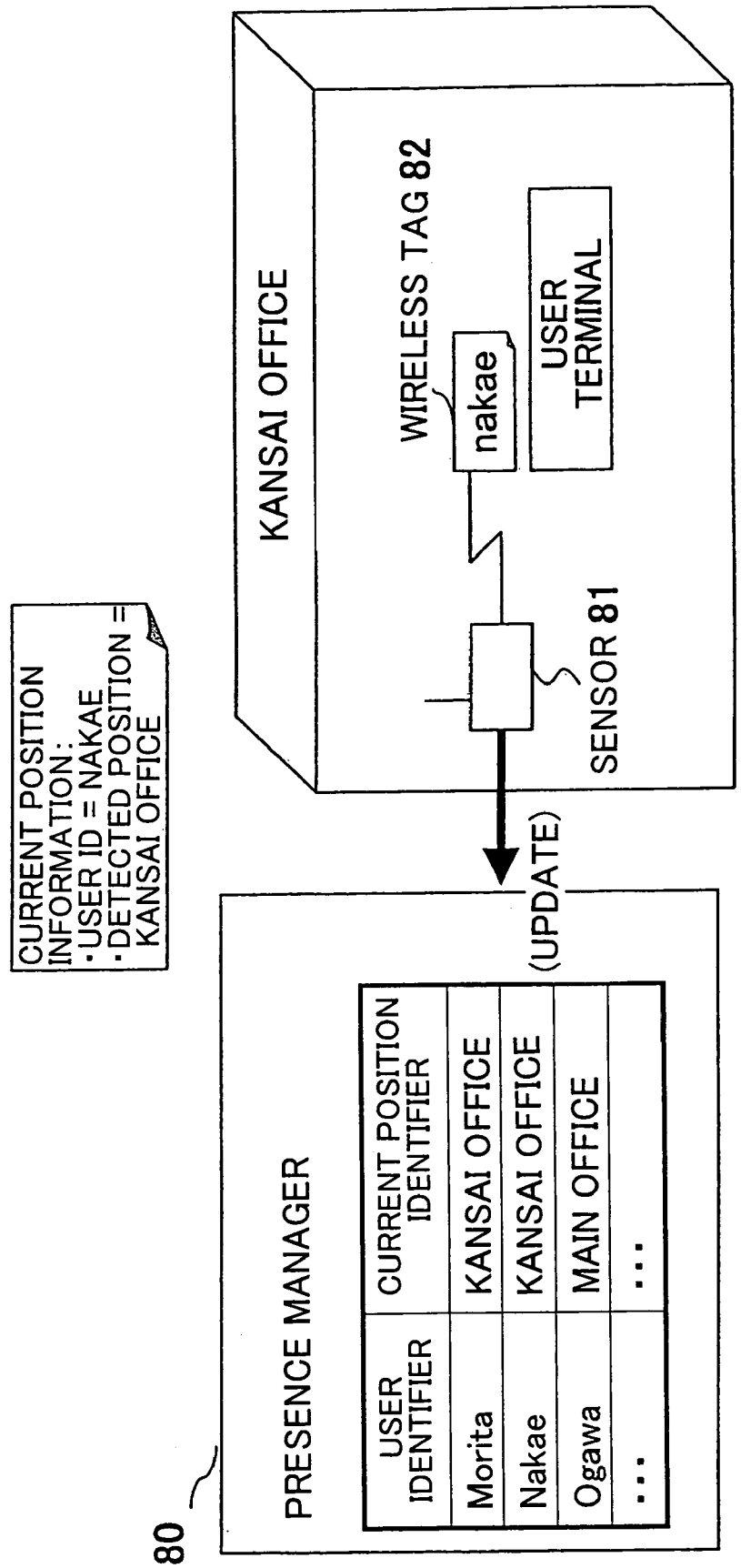
FIG. 50 is an explanatory diagram showing an example of a form in which a position detector notifies the presence manager of information on a current position.

FIG. 50 shows a form in which a sensor installed at a particular location (e.g., an office building or the like) detects a wireless tag of each user and transmits the current position of each user to the presence manager 80. A wireless tag (RFID: Radio Frequency Identification) 82 is stuck to a user terminal. A sensor (position detector) 81 installed on an office building or the like detects the wireless tag 82. Suppose that the user terminal is a mobile terminal carried by a user. The sensor 81 transmits, to the presence manager 80, a user ID and the current position of the user terminal 82 (or the current position of the user) which are obtained by detecting the wireless tag 82. The presence manager 80 updates the database, based on information received from the sensor 81.

FIG. 50 shows a form in which the mobile terminal 81 automatically calculates the current position of itself and sends the position together with a user ID. The mobile terminal (position detector) 81 carried by the user calculates the current position information by electric waves from a GPS satellite, for example. The user ID of the mobile terminal 81 has been registered in advance. The mobile terminal 81 calculates periodically the current position information. The mobile terminal 81 further transmits the calculated current position information and the registered user ID to the presence manager 80 through a base station. The presence manager 80 updates the database, based on information received from the mobile terminal 81.

Figure 51:
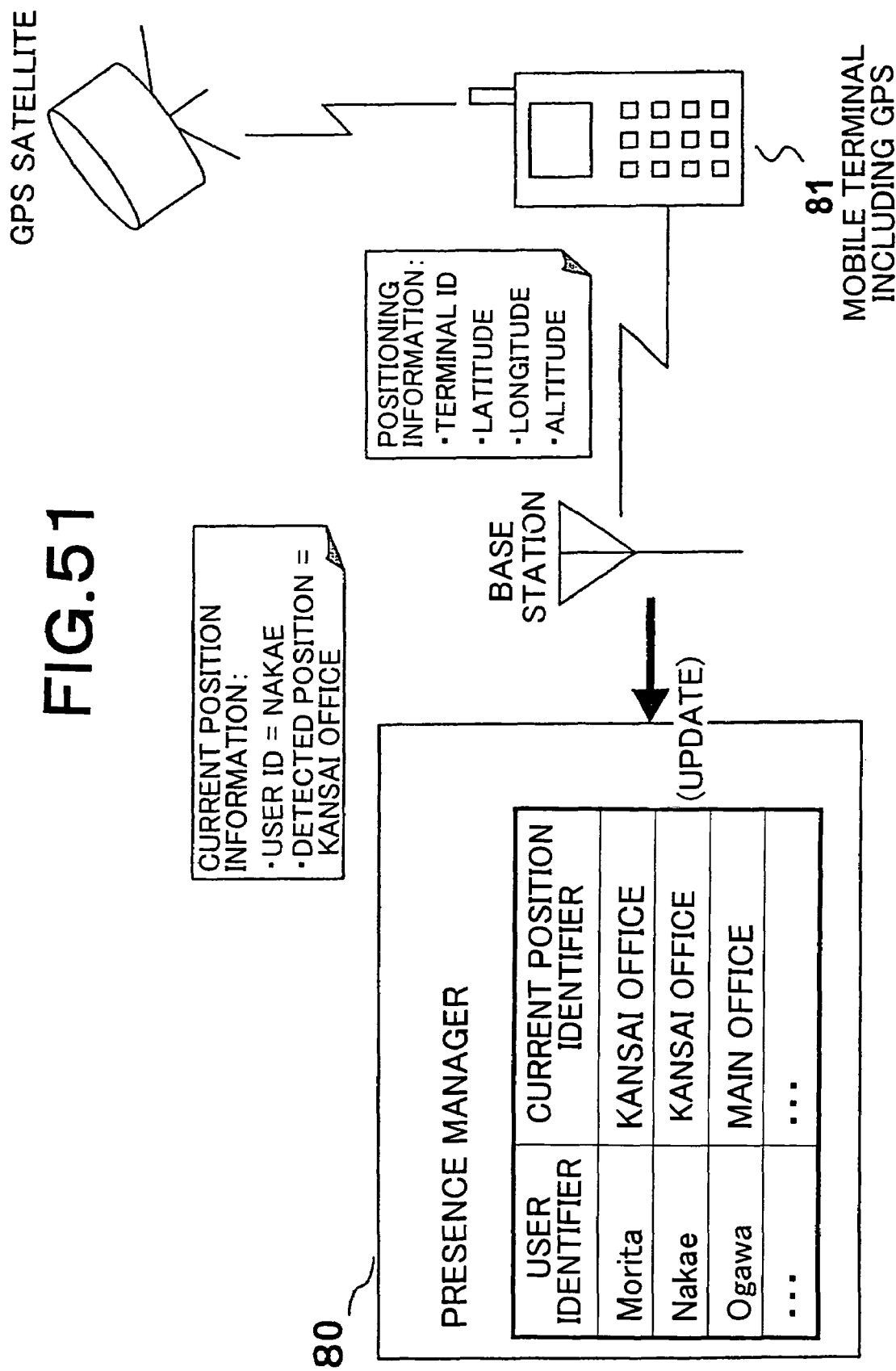
FIG. 51 is an explanatory diagram showing an example of a form in which a position detector notifies the presence manager of information on a current position.

The form of transmitting position information from the position detector 81 to the presence manager 80 is not limited to that shown in FIGS. 49 to 51. For example, it is possible to use a device (not limited to a user terminal like a mobile terminal) which is carried or worn by the user and transmits the owner's user ID on electric waves or the like, and a sensor which is installed at a predetermined position and receives electric waves or the like transmitted from the device. In this case, the sensor may specify a user ID upon reception of an electric wave, and may transmit the installation position of the sensor as the current position of the user together with the user ID to the presence manager 80. Alternatively, the device does not first transmit an electric wave or the like but a wireless base station or the like installed at a predetermined position may first transmit an electric wave or the like. When the device carried by a user moves close to the wireless base station or the like and detects the electric wave or the like from the wireless base station or the like, a user ID may be transmitted on electric waves or the like. The wireless base station or the like which has received the electric wave or the like from the device carried by the user may operate in the same manner as the above-described sensor. Although the example described above suppose a case of transmitting/receiving electric waves, information may be transmitted/received in a different method such as infrared communications or the like.

Alternatively, a camera, monitor, or the like which picks up passersby may be installed. A user near the camera or monitor may be specified by a passerby recognition means which specifies which user a passerby is, depending on a faces of the passerby picked up. The passerby recognition means may transmit the user ID of a specified user and the installation position of the camera or monitor (i.e., the current position of the user) to the presence manager 80. A device as a target to be subjected to access control, another personal computer (hereinafter abbreviated as PC), or the like may specify a user by performing an authentication processing or the like with respect to the user. The device, PC, or the like may transmit the user ID of the user and the installation position of the device or PC (i.e., the current position of the user) to the presence manager 80.

Alternatively, a display device of a PC may have a user detector which picks up an image of a user, to detect the user seeing the display device, and specifies the user ID. The user detector may transmit the specified user ID and the installation position of the PC (i.e., the current position of the user) to the presence manager 80.

Alternatively, coordinates and altitude of the current position of a user and orientation of the user may be detected by any of various gyros from a large-scale type for airplanes to a small-scale simple type for portable devices or a similar device. The detected coordinates, altitude, and orientation may be transmitted as information of the current position together with a user ID to the presence manager 80. A large-scale gyro may be installed on a vehicle or the like and may be used in case of transmitting the position information of the user in the vehicle or the like. Alternatively, a device (or particularly a mobile phone, PDA, car navigation system, or the like) using a GPS, ITS (Intelligent Transport Systems), wireless LAN, or infrared communications may detect the position or orientation of a user. The detected position or orientation may be transmitted as current position information to the presence manager 80.

Alternatively, there may be a structure in which existence of a user is checked and the user ID of the user is then detected. As a measure of checking existence of a user, for example, it is possible to use any of various sensors that can detect changes in light such as infrared light, pressure, temperature, etc.

Alternatively, the position of a user on a communication network may be detected as position information. In this case, a device included in the communication network or software installed in the device may specify the user ID of a user who logs in, and detect the position of the user. The device or software may then transmit the user ID and the position information of the user to the presence manager 80. At this time, the position of the device or software which specifies the user ID (or more specifically the position of the device in which the software is installed) may be detected as the position of the user. In this case, when writing an access control policy, the position of the device or software included in the communication network may be written as the position of the user.

In each of the forms as described above, the device which transmits position information to the presence manager 80 corresponds to the position detector 81.

Next, operations will be described.

Figure 52:
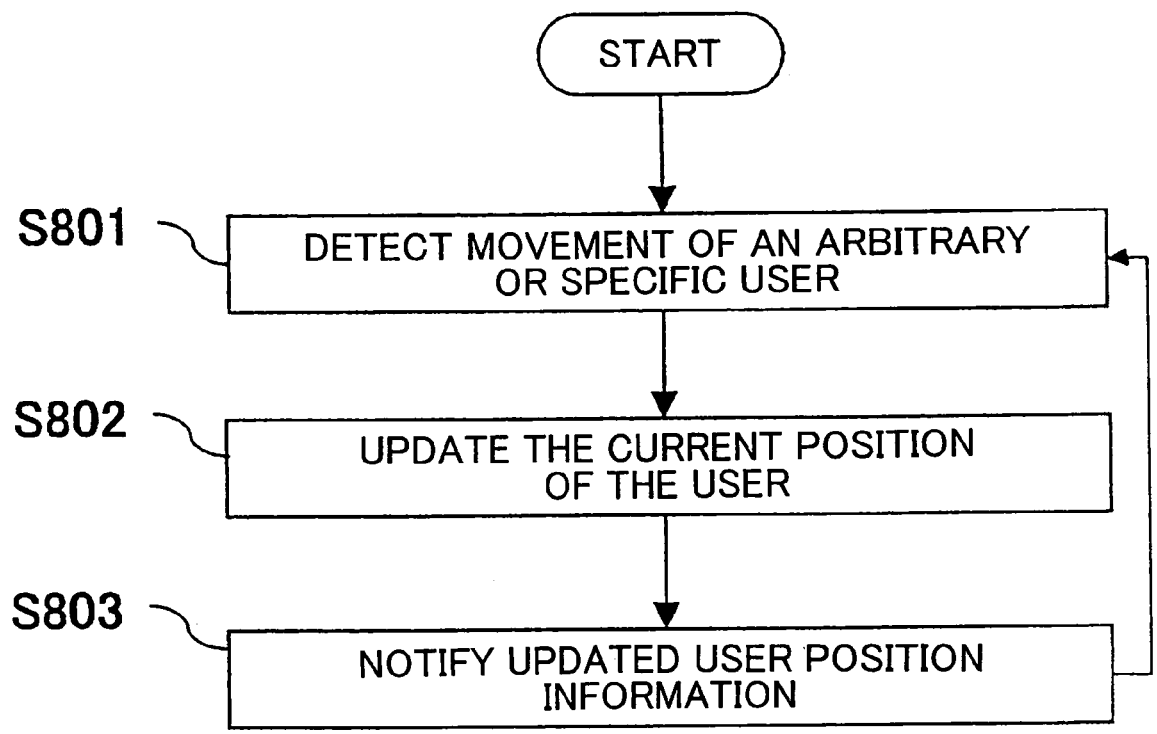
FIG. 52 is a flowchart showing an example of progress of a processing of notifying a knowledge database of the current position of each user.

FIG. 52 is a flowchart showing an example of progress of a processing in which the current position of each user is notified to the knowledge database. At first, the position detector 81 detects the current position of an arbitrary or specific user, and notifies the presence manager 80 of current position information which includes at least the identifiers of the user and the current position (step S801). Further, the presence manager 80 updates an internally included database (not shown in FIG. 47), based on the received current position information (step S802).

When the presence manager 80 detects existence of a user whose current position has changed, based on update of existing current position information in the database, the presence manager 80 generates movement information consisting of the user identifier and current position identifier of the user. Further, the presence manager 80 notifies the object knowledge manager 2023 in the knowledge database 23 of the movement information (step S803). If plural users move simultaneously and the current positions of the respective users change, movement information of every user is inputted to the object knowledge manager 2023.

Upon reception of the movement information, the object knowledge manager 2023 updates the object knowledge concerning each user, based on the movement information. That is, the content of a substantial object expanded from the user identifier (user ID) included in the movement information is updated with the current position included in the movement information. The object knowledge manager 2023 transfers the name object (user ID) from which the updated substantial object has been expanded, to the policy analyzer 1033 (not shown in FIG. 47 but shown in FIG. 23). Also, the current position information corresponding to the user ID is transferred to the policy analyzer 1033.

Subsequently, the policy analyzer 1033 reads each access control policy, extracts a user group included in each access control policy, and makes the knowledge database 23 perform expansion based on each user group. The policy analyzer 1033 specifies an access control policy which includes a user ID received as a name object from the object knowledge manager 2023. Further, the policy analyzer 1033 refers to a condition concerning the current position of the user, which is described in the access control policy (e.g., "effective if the current position of a user having a user identifier "Kato" is "Kansai office"). Based on the user ID and current position information transferred from the object knowledge manager 2023 and the condition described in the access control policy, an access control policy determined as being effective is selected. This access control policy has been rendered effective by movement of the user. Thereafter, the policy engine 13 reads the ID of the access control policy made effective, and may perform the same operations as those in the steps C40 to C110 in the third embodiment. As a result, the access control list is updated in accordance with a change of the current position of the user, and access control setting is carried out based on the updated access control list.

Also, in the present embodiment, the presence manager 80, position detector 81, and other devices than the knowledge database 23 may generate a combination of a user identifier and a current position identifier by the same data configuration as the object knowledge or a data configuration according to the object knowledge. In addition, the knowledge database 23, presence manager 80, position detector 81, and other devices may manage the history of the current position identifier for every user. Further, as a condition which makes the access control policy effective, a condition defined by an item expressing the history of the current position identifier of the user and the position may be described in the access control policy, in addition to a condition concerning the position where the user exists "now". For example, an item expressing the history of the current position identifier, such as "continually in last 10 seconds", "at least once in last 24 hours", or "three or more times from 10 minutes ago to 5 minutes ago", and a position are combined into one condition "effective if a user stays in the meeting room A continually in last 10 seconds", which may be described in the access control policy. In this case, the policy analyzer 1033 may receive information expressing the history of the current position identifier of the user from the knowledge database 23, and may use the history to select the access control policy determined as being effective.

Accuracy (range) of the position expressed by a substantial object expanded from a user identifier (user ID in the present embodiment) is not limited particularly. For example, a sector like "Kansai office" may be expressed, or a narrow target such as a "specific seat" may be expressed. Alternatively, a substantial object may express a "building" or the like as a position, or may express a larger target "city", "country", or the like. Alternatively, a substantial object expanded from a user identifier may express coordinates (e.g., latitude 34 degrees 45 minutes 7 seconds north, longitude 135 degrees east), altitude (e.g., fifth floor from the ground, minus 200 m below sea level), or orientation in which a user or a user's device faces. If the position of a user on a communication network is expressed, a substantial object may express, for example, a system (or device) which the user logs on, or any of various addresses or paths of, for example, files or directories. In case where the position of a user on a communication network is expressed, the accuracy of the position is not particularly limited either. In addition, plural substantial objects expressing positions may be expanded from a name object expressing a user ID. For example, plural position information items such as "main office building" and "eighth floor from the ground" may be expanded from a certain user ID. In this case, the policy analyzer 1033 compares a condition (which makes an access control policy effective) concerning the current position of the user, which is described in an access control policy, with plural position information items obtained by expansion, to select an effective access control policy.

According to the present embodiment, the access control list is automatically updated in accordance with changes in the positions of users. Therefore, it is possible to perform access control corresponding even to unscheduled movements of users in case of using an access control policy which describes a restriction concerning a location.

Ninth Embodiment

In the present embodiment, each access control policy describes a condition to make the access control policy effective (or ineffective). In the eighth embodiment, "existence of a user in a specific location" is used as a condition to make the access control policy effective. In contrast, in the ninth embodiment, a condition to make an access control policy effective (or ineffective) is that a user and another user (hereinafter called a companion) have a specific relationship with each other. The "specific relationship" is, for example, a condition concerning a position. Hereinafter, it is supposed that the access control policy is rendered effective on condition that a user and a companion have a positional relationship with each other. A specific example of this condition will be, for example, a condition that "the current position of a user whose user identifier (user ID) is "satou" and the current position of another user whose user identifier is "suzuki" are the same". In this case, if the current position of the user having the user identifier "satou" and the another user having the user identifier "suzuki" are the same, the access control policy which describes this condition is rendered effective. This example shows a case of a condition that the positions of the user and the companion are identical to each other. However, it is possible to use a condition that the positions are different from each other. Alternatively, it is possible to use a condition that the current position of a user (or companion) is included in the current position of a companion (or user). For example, if a position on a communication network is expressed by an IP address, it is possible to use a condition that an IP address expressing the current position of a user is included in an IP address expressing the current position of a companion. Alternatively, a positional relationship other than equality, difference, and inclusion may be a condition.

In addition to being in a specific positional relationship (e.g., the identical current positions or the like), positions being a specific location may be included in the condition. For example, it is possible to define a condition that "the current position of a user whose user identifier is "satou" and the current position of a user whose user identifier is "suzuki" are identical to each other, and are a location of "Kansai office".

In location of defining directly a condition with use of user identifiers, a condition may be defined by name objects such as a user group and a companion. For example, a relationship between the current position of a user specified by a user ID expanded from a user group "internal manager" and a user specified by a user ID expanded from a user group "network manager" may be defined as a condition to make an access control policy effective. Note that the user ID expanded from a name object like the "internal manager" or "network manager" is not always one. In this case, current positions identical to part or all of user IDs expanded from each name object may be a condition to make an access control policy effective. Alternatively, current positions identical to a specific number of users may be a condition to make an access control policy effective. Alternatively, when preparing a rule from an access control policy, the rule may be prepared with use of a user ID of a user whose current position is identical to that of a companion. In this case, only lines concerning users whose current positions are identical to the current position of a companion are generated.

As has been described with reference to the eighth embodiment, a system (device) which a user logs on, or any of various addresses and paths of files and directories used by the user may be expressed as a position, in case of expressing a position of a user on a communication network. Also, in the present embodiment, the system (device) which the user logs on, or any of various addresses and paths of files and directories used by the user may be expressed as a position. A condition may be defined depending on the position. For example, if an address of a file is expressed as a position of a user, a condition to make an access control policy effective may be that the "address of a file currently accessed by a user whose user identifier is "sato" and the address of a file currently accessed by a user whose user identifier is "suzuki" are the same (or are different from each other or have another specific relationship with each other)".

The companion is written as a name object for expanding a specific companion in an access control policy. For example, a companion is written as a name object such as a "superior" in an access control policy. However, a specific user ID which identifies each companion may be allowed to be described as data of the companion in an access control policy.

FIG. 53 shows an example of a data configuration of an access control policy in the present embodiment. As shown in FIG. 53, an access control policy includes data concerning an ID (the ID of the access control policy), accessibility, a user group, a position, and a resource. In the example shown in FIG. 53, data of a companion is included as a part of positional data. FIG. 53 shows a specific example of a position, including accessibility, a user group, and data of a companion, which is made effective when a user and a companion have a specific positional relationship. This kind of description indicates that "if a user expanded from a user group and a companion exist at the same location and if the location is a position expressed by an access control policy, the access control policy is made effective". That is, in the example shown in FIG. 53, the location described as a position in an access control policy is not used only for expansion to create a rule but also used as a condition for determining whether the access control policy is effective or not. Note that the data configuration shown in FIG. 53 is merely an example, and the data configuration of the access control policy in the present embodiment is not limited to the data configuration shown in FIG. 53. For example, the data configuration may include data of a companion as part of data of a resource.

Alternatively, there is a case of defining a condition including specific user identifiers: "the current position of a user whose user identifier is "satou" and the current position of a user whose user identifier is "suzuki" are the same, and the positions are a location "Kansai office". In this case, the user IDs each may be described as a user group or a companion. Alternatively, a condition including such specific user IDs may be optionally described in the access control policy. The following explanation will be made of an example in which a user group and a companion in the access control policy are not described as user IDs but described as name objects (e.g., a "subordinate", "superior", and the like) from which user IDs are obtained by expansion.

Figure 54:
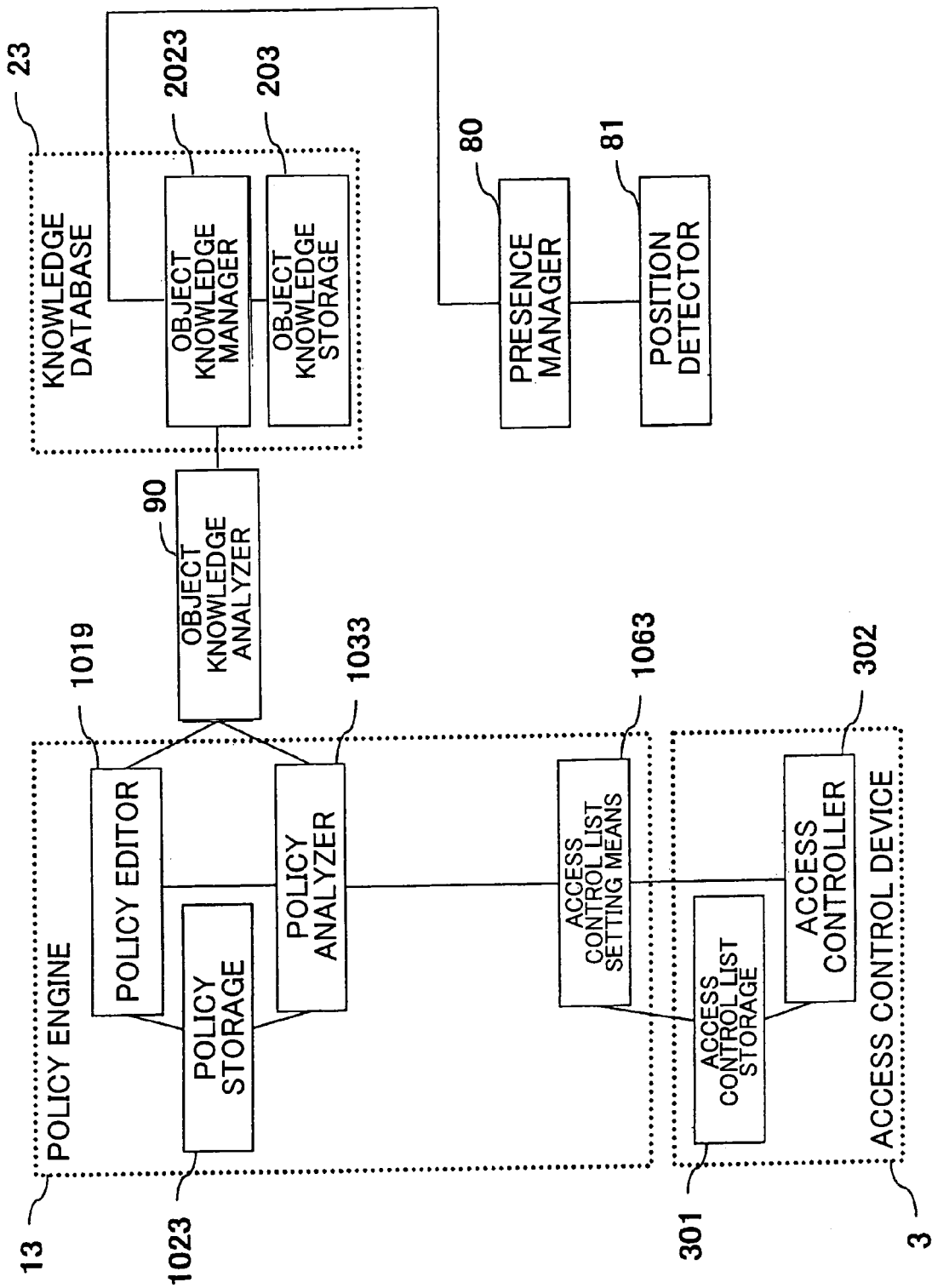
FIG. 54 is a block diagram showing the ninth embodiment of the access control system according to the present invention.

FIG. 54 is a block diagram showing a ninth embodiment of the access control system according to the present invention. The access control system in the ninth embodiment has an object knowledge analyzer 90 and a policy editor 1019 in addition to the configuration of the access control system according to the eighth embodiment. Structures and operations of the presence manager 80, position detector 81, and knowledge database 23 are the same as those in the eighth embodiment. In addition, the object knowledge stored in the object knowledge storage 203 is the same as the object knowledge in the eighth embodiment.

The object knowledge analyzer 90 relays communications between the policy analyzer 1033 and the object knowledge manager 2023. When the object knowledge manager 2023 outputs a user ID and current position information on the user in accordance with update of the object knowledge, the object knowledge analyzer 90 receives the user ID and the like and transfers it to the policy analyzer 1033. When the policy analyzer 1033 is going to expand a name object, the object knowledge analyzer 90 determines which substantial object expressing what should be expanded as a substantial objects to be expanded from the name object. The object knowledge analyzer 90 also makes the object knowledge manager 2023 execute a substantial object to be expanded. The following explanation will be made of an example of a case where the object knowledge analyzer 90 is a computer which operates in accordance with programs, separately from the policy engine 13 and the knowledge database 23.

In the present embodiment, the policy analyzer 1033 expands name objects of a user group and a companion which are described in each access control policy, when the policy analyzer 1033 is notified that a user has moved. At this time, the object knowledge analyzer 90 determines that a substantial object expressing a user ID should be obtained by expansion. The object knowledge analyzer 90 then makes the object knowledge manager 2023 execute expansion from name objects expressing a user group and a companion into a substantial object expressing a user ID. With use of the user ID obtained as a result of this expansion, the policy analyzer 1033 expands the user ID as a name object. At this time, the object knowledge analyzer 90 determines that a substantial object expressing position information should be obtained by expansion. The object knowledge analyzer 90 then makes the object knowledge manager 2023 execute expansion from the user ID into a substantial object expressing position information. Thereafter, the policy analyzer 1033 performs expansion when creating a rule. In this case, the object knowledge analyzer 90 determines that the same expansion as in the step B805 or A405 may be performed. The object knowledge analyzer 90 then makes the object knowledge manager 2023 execute the same expansion as in the step B805 or A405. Update of object knowledge may cause the object knowledge analyzer 90 to determine that a substantial object expressing a user ID should be obtained by the first expansion after outputting the user ID and the current position information on the user to the policy analyzer 1033. In the second expansion, it may be determined that a substantial object expressing position information should be obtained by expansion. In later expansion, it may be determined that the same expansion as in the step B805 or A405 is performed.

The policy editor 1019 operates in the same manner as the policy editor 1012 (see FIG. 19) in the second embodiment except that output user interfaces are partially different. FIG. 55 shows an example of an interface for editing an access control policy outputted by the policy editor 1019. In the user interface shown in FIG. 55, the columns "user group selection", "resource selection", and "explanation of policy" are the same as those shown in FIG. 15. That is, the policy editor 1019 may display these columns like the columns "user group selection", "resource selection", and "explanation of policy" shown in FIG. 15. Also, the policy editor 1019 displays the same column "position selection" as that shown in FIG. 15. Further, the policy editor 1019 displays the column "selection of a user group to accompany" in the column "position selection". In the example, as shown in FIG. 55, the policy editor 1019 displays a list of name objects of companions and select buttons together in the column "selection of a user group to accompany". The policy editor 1019 writes the name objects of companions selected by the select buttons, as data of companions shown in FIG. 53. Also, in this case, when a specific positional relationship such as "a user specified by a user group exists at the same position as a companion" is satisfied, access from the user must be allowed. Therefore, the policy editor 1019 writes "permitted" as data of "accessibility" in a access control policy.

The policy editor 1019 may display a list of user IDs to become companions, in place of name objects to be expanded into user IDs, thereby to display a user interface to allow user IDs of companions to be selected. Likewise, a user interface to allow user IDs to be selected may be displayed in place of the column "user group selection". In this case, user IDs are written as data of a companion and user group shown in FIG. 53. In this case, however, the user interface shown in FIG. 54 is displayed. As a user group and a companion in an access control policy, user IDs are not written but name objects from which user IDs are obtained by expansion are written.

Next, operations will be described.

Figure 56:
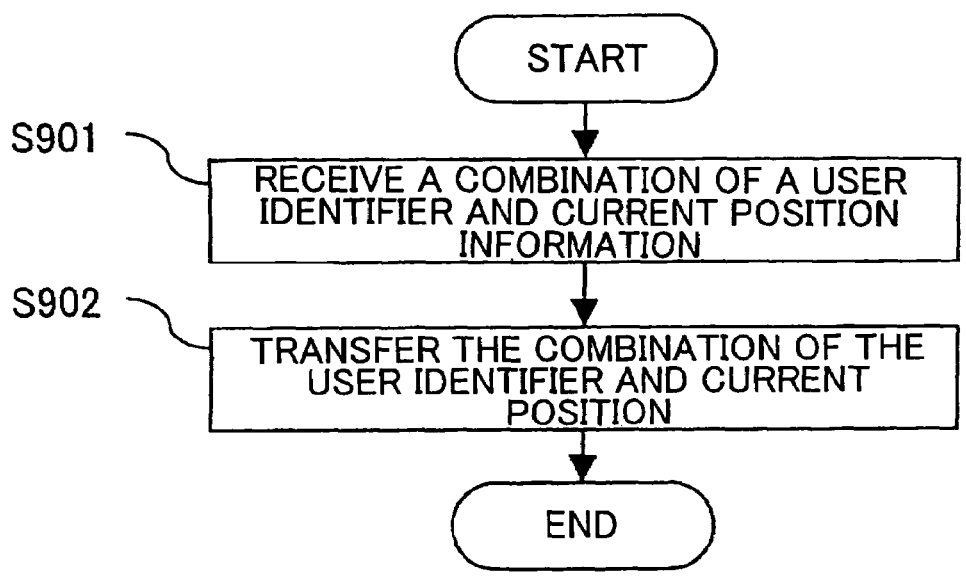
FIG. 56 is a flowchart showing an operation in which an object knowledge analyzer relays a combination of a user identifier and current position information, which is outputted from an object knowledge manager.

At first, operations of the object knowledge analyzer 90 will be described. FIG. 56 is a flowchart showing an operation when the object knowledge analyzer 90 relays a combination of an user identifier (user ID) and current position information which is outputted from the object knowledge manager 2023. The object knowledge analyzer 90 firstly receives the combination of a user identifier and current position information from the object knowledge manager 2023 (step S901). Next, the object knowledge analyzer 90 transfers the received combination of the user identifier and current position information to the policy analyzer 1033.

Figure 57:
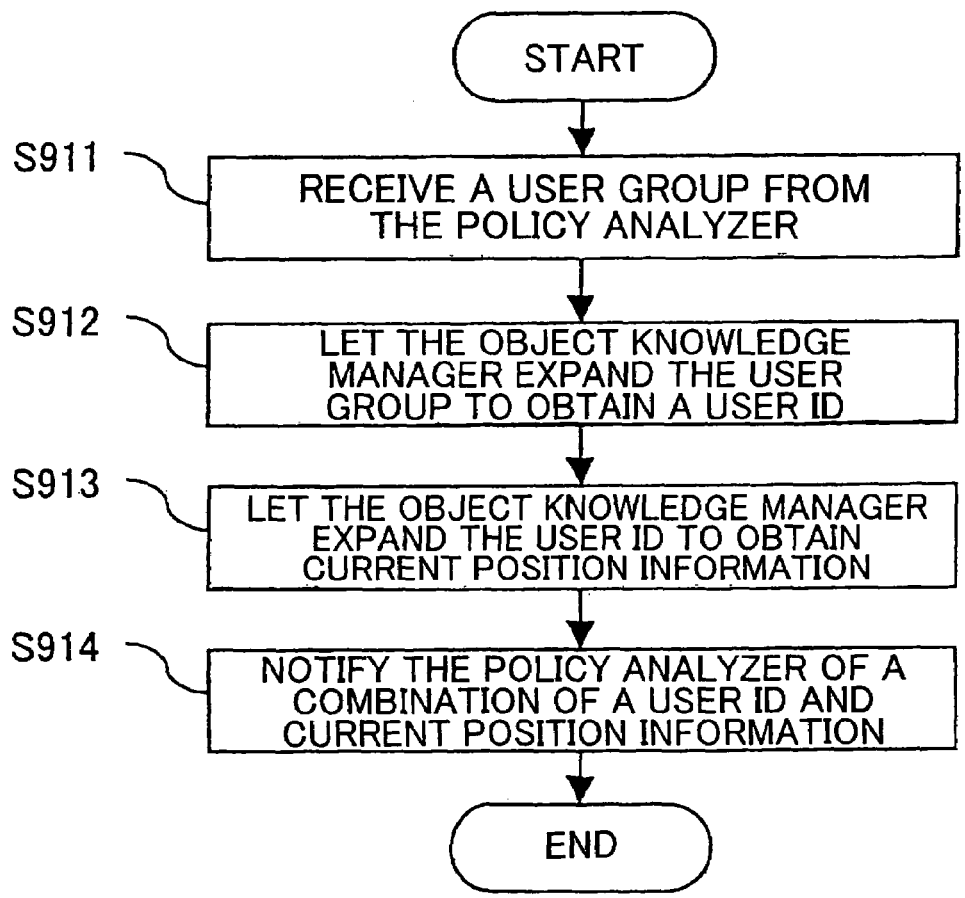
FIG. 57 is an explanatory flowchart showing an operation of the object knowledge analyzer after a user identifier and current position information are relayed to a policy analyzer until the policy analyzer selects an effective access control policy.

FIG. 57 is a flowchart explaining an operation of the object knowledge analyzer 90 until the policy analyzer 1033 selects an effective access control policy after a user identifier and current position information are relayed to the policy analyzer 1033. The object knowledge analyzer 90 receives name objects of a user group and a companion written in each access control policy from the policy analyzer 1033 (step S911). Subsequently, the object knowledge analyzer 90 determines that a substantial object expressing a user ID should be obtained by expansion. The object knowledge analyzer 90 makes the object knowledge manager 2023 execute expansion from the name objects received in the step S911 into a substantial object expressing a user ID. A user ID is thus obtained (step S912). The object knowledge analyzer 90 transfers the user ID to the policy analyzer 1033. Next, the user ID is received as a name object from the policy analyzer 1033. At this time, the object knowledge analyzer 90 determines that a substantial object expressing position information should be obtained by expansion. The object knowledge analyzer 90 then makes the object knowledge manager 2023 execute expansion from the received user ID to a substantial object expressing position information, thereby to obtain the current position information on the user (step S913). Subsequently, the object knowledge analyzer 90 notifies the policy analyzer 1033 of the combination of the user ID and the current position information obtained in the step S913 (step S914).

Next, an operation of the entire access control system will be described. Update of the database which the presence manager 80 has is carried out in the same manner as in the eighth embodiment. When existence of a user whose current position has changed is detected on the basis of update of existing current position information in the database, the presence manager 80 generates movement information consisting of a combination of a user identifier and a current position identifier of the user. The presence manager 80 notifies the object knowledge manager 2023 of the knowledge database 23 of the movement information. If plural users move simultaneously and the respective current positions of the users change, movement information of every user is inputted to the object knowledge manager 2023.

Upon reception of the movement information, the object knowledge manager 2023 updates object knowledge concerning each user, based on the movement information. That is, the content of a substantial object expanded from a user identifier (user ID) included in the movement information is updated with the current position included in the movement information. The object knowledge manager 2023 transfers the name object (user ID) from which a substantial object has been expanded and updated, to the policy analyzer 1033. Current position information corresponding to the user ID is also transferred to the policy analyzer 1033. At this time, the object knowledge analyzer 90 performs operations of the steps S901 and S902 (see FIG. 56), and relays the user ID and the current position information to the policy analyzer 1033 from the object knowledge manager 2023.

Subsequently, the policy analyzer 1033 reads each access control policy, and extracts a user group and a companion included in each access control policy. The policy analyzer 1033 executes expansion based on the user group and companion. At this time, the policy analyzer 1033 transfers name objects of the extracted user group and companion to the object knowledge analyzer 90. Then, the object knowledge analyzer 90 performs operations of the steps S911 and S912 (see FIG. 57), and transfers a user ID obtained by expansion to the policy analyzer 1033.

Next, the policy analyzer 1033 compares the user ID obtained by the expansion described above with the user ID transferred together with current position information from the object knowledge manager 2023 in accordance with update of object knowledge caused by movement of the user. Further, if there is an identical user ID, an access control policy which includes a name object (a user group or a companion) which is expanded into the user ID is specified.

The policy analyzer 1033 makes the knowledge database 23 execute, through the object knowledge analyzer 90, expansion depending on the user ID obtained as a result of expansion based on a user group and a companion which have been extracted from the specified access control policy. At this time, the policy analyzer 1033 transfers the user ID to the object knowledge analyzer 90. Then, the object knowledge analyzer 90 performs operations of the steps S913 and S914 (see FIG. 57), and transfers the user ID transferred from the policy analyzer 1033 and current position information corresponding to the user ID, to the policy analyzer 1033, with the user ID and current position information combined to each other.

Based on the user ID expanded from a user group, the current position information corresponding to the user ID, the user ID expanded from the companion and the current position information corresponding to the user ID, the policy analyzer 1033 determines whether the positional relationship between the user (i.e., the user expressed by the user ID expanded from a user group) and the companion satisfies a condition defined by an access control policy (e.g., "the current position of a user specified by a user ID expanded from a user group is identical to the current position of another user specified by a user ID expanded from a companion"). Further, the policy analyzer 1033 selects, as an effective access control policy, such an access control policy in which the positional relationship between a user and a companion is satisfied. This access control policy is a policy which is made effective by movement of a user or companion. Thereafter, the policy engine 13 may read an ID of the access control policy made effective, and perform the same operations as those in the steps C40 to C110 in the third embodiment. As a result, in accordance with a change in the current position of a user, the access control list is updated, and access control setting is carried out based on the updated access control list.

Also, the policy analyzer 1033 outputs the ID of an access control policy determined as being ineffective, among access control policies specified on the basis of user IDs, to the access control list storage 301. The access control list setting means 1063 makes the access control list storage 301 execute deletion of a line having the ID. The processing of the step C110 (see FIG. 24) is executed thereafter.

The policy analyzer 1033 also performs expansion when creating a rule in the step C80 (see FIG. 24). At this time, the object knowledge analyzer 90 determines that the same expansion in the step B805 or A405 may be carried out. The object knowledge analyzer 90 then makes the object knowledge manager 2023 execute the same expansion in the step B805 or A405.

A position described in an access control policy may be described as a name object to obtain a specific position by expansion. For example, suppose that "main office meeting room" as a name object and "main office meeting room A" and "main office meeting room B" as substantial objects expanded from the name object are stored in the object knowledge storage 203. Then, a name object such as "main office meeting room" or the like may be written as a position in an access control policy. In this case, the policy analyzer 1033 expands the name object such as "main office meeting room" or the like to obtain substantial objects such as the "main office meeting room A" and "main office meeting room B". Whether or not a user or a companion exists in the "main office meeting room A" or "main office meeting room B" may be determined to judge whether or not a predetermined condition (e.g., "both of a user and a companion exist in the "main office meeting room A" or "main office meeting room B"") is satisfied.

Described next will be a specific example of operations (particularly the operation of selecting an effective access control policy). This example shows a case of selecting an access control policy which is made effective on condition that both of a subordinate and a superior are at a specific position. FIG. 58 is a table which shows an example of an access control policy as described above. The access control policy shown in FIG. 58 is written in a data configuration as exemplified in FIG. 53. This example supposes that a current position expanded from a user ID (e.g., "Kansai office" or the like) is written at a "position" in the access control policy. Also, this example supposes that one substantial object is expanded from each of the "subordinate", "Kansai office", "superior", and "Kansai personnel management server" shown in FIG. 58. More specifically, if a name object "subordinate" written as a user group is expanded, a user ID "Morita" is obtained as a substantial object. If a name object "superior" written as a companion is expanded, a user ID "Nakae" is obtained as a substantial object. Likewise, if a name object "Kansai office" written as a position is expanded, an IP address "3.2.1.0/24" is obtained as a substantial object. If a name object "Kansai personnel management server" written as a resource is expanded, a combination of an IP address "1.2.3.4" and a port number "12345" is obtained.

Suppose that, as a person specified by "Nakae" (a superior in this example) has moved from home to the Kansai office, the presence manager 80 updates the position information of a user which is stored in an internal database, from a state shown in FIG. 48 to another state shown in FIG. 49 (or FIG. 50 or 51). At this time, the presence manager 80 notifies the object knowledge manager 2023 of movement information (e.g., the combination of "Nakae" and the current position identifier "Kansai office" after update, in this example).

Upon notification of the movement information, the object knowledge manager 203 updates object knowledge stored in the object knowledge storage 2023, based on the movement information. In this example, the content of a substantial object which is a substantial object expressing a position and is expanded from a user identifier (user ID) "Nakae" included in movement information is updated with "Kansai office" included in the movement information. Since the user specified by "Morita" exists in the "Kansai office", object knowledge in which "Morita" is a name object and "Kansai office" is a substantial object has already been stored in the object knowledge storage 203. The object knowledge manager 2023 sends the combination of the user ID "Nakae" and the current position information "Kansai office" corresponding to the user ID, to policy analyzer 1033 through the object knowledge analyzer 90. At this time, the object knowledge analyzer 90 performs operations of the steps S901 and S902 (see FIG. 56), to relay the combination of "Nakae" and "Kansai office" from the object knowledge manager 2023 to the policy analyzer 1033.

Subsequently, the policy analyzer 1033 reads each access control policy and extracts a user group and a companion which are included in each access control policy. Further, the policy analyzer 1033 makes the object knowledge analyzer 90 execute expansion based on each extracted user group and each extracted companion, through the object knowledge analyzer 90. At this time, the user group "subordinate" and the companion "superior" extracted from the access control policy shown in FIG. 58 are included in the information on each user group and companion transferred from the policy analyzer 1033 to the object knowledge analyzer 90. The object knowledge analyzer 90 performs operations of the steps S911 and S912 (see FIG. 57), and transfers, to the policy analyzer 1033, user IDs obtained by expansion based on each user group and each companion transferred from the policy analyzer 1033. These user IDs include "Morita" expanded from "subordinate" as well as "Nakae" expanded from "superior".

Next, the policy analyzer 1033 compares the user IDs obtained by the expansion as described above, with the user ID transferred together with the current position information ("Nakae" transferred together with "Kansai office") from the object knowledge manager 2023 in accordance with update of object knowledge caused by movement of a user. If there is an identical user ID, the access control policy which includes the name object from which the identical user ID is expanded is specified. "Nakae" is expanded from the "superior" included in the access control policy shown in FIG. 58. Therefore, the access control policy shown in FIG. 58 is included in the access control policy specified by the policy analyzer 1033.

Next, the policy analyzer 1033 makes the knowledge database 23 execute expansion depending on the user IDs obtained as results of expansion based on the user group and companion in the specified access control policy, through the object knowledge analyzer 90. At this time, the user IDs transferred from the policy analyzer 1033 to the object knowledge analyzer 90 include "Morita" expanded from "subordinate" as well as "Nakae" expanded from "superior". The object knowledge analyzer 90 performs the operations of the steps S913 and S914 (see FIG. 57), and transfers the user IDs transferred from the policy analyzer 1033 and current position information corresponding to the user IDs, to the policy analyzer 1033, with the user IDs and current position information combined to each other. The combined user IDs and current position information include a combination of "Morita" and "Kansai office" as well as a combination of "Nakae" and "Kansai office". The policy analyzer 1033 determines whether or not each specified access control policy is effective, based on a condition suggested in each specified access control policy (to make the access control policy effective), and combinations of user IDs corresponding to a user group and a companion in each access control policy and current position information thereof. The access control policy shown in FIG. 58 suggests that this policy is made effective on condition that the current positions of the subordinate and the superior are identical to each other and the positions both are "Kansai office". Further, by expansions of "Morita" from "subordinate" and "Nakae" from "superior", the combinations of "Morita" and "Kansai office" as well as "Nakae" and "Kansai office" are obtained. Therefore, the policy analyzer 1033 recognizes that the current position of "Morita" as a "subordinate" and the current position of "Nakae" as a "superior" are identical to each other, and the positions both are "Kansai office". The policy analyzer 1033 hence determines that a condition that "the current positions of the subordinate and the superior are identical to each other, and the positions both are "Kansai office" is satisfied. Therefore, the policy analyzer 1033 determines the access control policy shown in FIG. 58 is effective. The policy analyzer 1033 determines whether or not other specified access control policies are effective, and selects effective access control policies.

Thereafter, the policy engine 13 reads IDs of effective access control policies, and performs the same operations as those in the steps C40 to C110 in the third embodiment. In the step C80, a rule is created based on an access control policy determined as being effective. At this time, the policy analyzer 1033 makes the object knowledge analyzer 90 execute expansion. The object knowledge analyzer 90 determines that the same expansions as those in steps B805 and A405 may be executed. The object knowledge analyzer 90 makes the object knowledge manager 2023 execute the same expansions as those in the steps B805 and A405. When a rule is created from the access control policy shown in FIG. 58, a user ID "Morita" is obtained by expansion from a name object "subordinate" described as a user group. In addition, an IP address "3.2.1.0/24" is obtained by expansion from a name object "Kansai office" described as a position. Also, a combination of an IP address "1.2.3.4" and a port number "12345" is obtained by expanding "Kansai personnel management server" described as a resource. The policy analyzer 1033 creates a rule shown in FIG. 59 with use of information obtained by expansion.

The policy analyzer 1033 outputs this to the access control list setting means 1063. The access control list setting means 1063 converts the rule and generates a line shown in FIG. 60. Further, the access control list setting means 1063 makes the access control list storage 301 store the line shown in FIG. 60, and thereafter makes the access controller 302 execute setting of access control. As a result, access from an IP address "3.2.1.0/24" based on "Morita" to an IP address "1.2.3.4" and a port number "12345" is permitted.

Suppose that the user (superior) having the user ID "Nakae" thereafter moves from the "Kansai office" to the "Main office", and the content of a substantial object expanded from "Nakae" is updated with "Main office". Then, like in the case as described previously, the object knowledge manager 2023 sends a combination of the user ID "Nakae" and the current position information "main office" corresponding to the user ID, to the policy analyzer 1033 through the object knowledge analyzer 90.

Subsequently, the policy analyzer 1033 reads each access control policy and extracts a user group and a companion which are included in each access control policy. Further, the policy analyzer 1033 makes the object knowledge analyzer 90 execute expansion based on each extracted user group and each extracted companion, through the object knowledge analyzer 90. Like in the case as described already, the policy analyzer 1033 compares the user IDs obtained as results of the expansion, with the notified user ID "Nakae", and specifies access control policies which include a name object obtained by expanding "Nakae". The access control policies specified at this time include the access control policy shown in FIG. 58. Next, the policy analyzer 1033 makes the knowledge database 23 execute expansion depending on the user IDs obtained as results of expansion based on the user group and companion in the specified access control policies, through the object knowledge analyzer 90. By this expansion, a combination of "Morita" and "Kansai office" as well as a combination of "Nakae" and "Main office" are obtained. Consequently, the condition that "the current positions of the subordinate and the superior are identical to each other and the positions both are "Kansai office"" is not satisfied any more. Therefore, the policy analyzer 1033 determines that the access control policy shown in FIG. 58 is not effective any more.

In this case, the access control policy shown in FIG. 58 is determined as being included in the access control policies specified by user IDs but being not effective. The policy analyzer 1033 outputs the ID of the access control policy of this kind to the access control list storage 301. The access control list setting means 1063 makes the access control list storage 301 execute deletion of lines including the ID. As a result, the line shown in FIG. 60 is deleted. Thereafter, the processing in the step C110 (see FIG. 24) is executed, and thereby, access to an IP address "1.2.3.4" and a port number "12345" from an IP address "3.2.1.0/24" based on "Morita" is not permitted.

Suppose further that a user having a user ID "Morita" moves from the "Kansai office" to the "Main office", and the content of a substantial object expanded from "Morita" is updated with "Main office". In this case, the object knowledge manager 2023, object knowledge analyzer 90, and policy analyzer 1033 operate in the same manner as in the case described above. In this case, the policy analyzer 1033 obtains a combination of "Morita" and "Main office" as well as a combination of "Nakae" and "Main office". Although the current positions corresponding to "Morita" and "Nakae" are identical to each other, the positions are not "Kansai office". Therefore, the access control policy shown in FIG. 58 is not determined as being effective, access from the IP address "3.2.1.0/24" depending on "Morita" to the IP address "1.2.3.4" and a port number "12345" is maintained not permitted.

In the above description, it is supposed that one substantial object is expanded from each of the "subordinate", "Kansai office", "superior" and "Kansai personnel management server" shown in FIG. 58. Plural substantial objects may be expanded from each of a user group, position, companion, and resource. If plural combinations of user IDs and current position information are derived on the basis of a user group and if plural combinations of user IDs and current position information derived on the basis of a companion, the policy analyzer 1033 may operate as follows. When creating a rule in the same manner as in the step C80, the policy analyzer 1033 may use as a user ID to be written in the rule, for example, a user ID combined with current position information identical to that combined with the user ID obtained from a companion (or a user ID which is combined with current position information identical to that combined with the user ID obtained from a companion and the current position is a specific position such as "Kansai office" or the like), among the user IDs obtained from a user group. In addition, the access control list setting means 1063 may generate lines from the rule. As a result, only those lines are created that concern a user who satisfies a condition that the current position is identical to the current position of a companion, or the like. Thus, access control concerning the user is set.

The path from a name object as a starting point of expansion to a substantial object may be a path which extends from the name object as a starting point to a substantial object through another name object.

In this example, a current position (e.g., "Kansai office" or the like) which can be expanded from a user ID is described as a "position" in an access control policy. A location which cannot be expanded from any user ID can be described as a "position" in an access control policy. For example, there is a case that the "main office meeting room A" or "main office meeting room B" is included, as a substantial object expanded from a user ID, in object knowledge. However, the "main office meeting room" as a superordinate concept thereof is not included, as a substantial object, in object knowledge. In this case, the "main office meeting room" may be described as a "position" in an access control policy. In this case, however, it is necessary that consistency between a current position expanded from a user ID and a "position" described in an access control policy should be determinable. Therefore, object knowledge in which a superordinate concept (the "main office meeting room" in the this example) of a current position expandable from a user ID is a name object and current positions (the "main office meeting room A" and "main office meeting room B" in the this example) expandable from a user ID are substantial objects may be stored in an object knowledge storage. When the policy analyzer 1033 determines whether a condition required for an access control policy to be effective is satisfied or not, consistency may be determined between a current position expanded from a user ID and a position expanded from a superordinate concept described as a "position" in an access control policy.

Also, the user interface for editing shown in FIG. 55 is configured to invite an operator to select a "user group to accompany". The policy editor 1019 may display a user interface for editing, which invites an operator to select a "user group which cannot be accompanied with". On this user interface for editing, a list of user groups which cannot be accompanied with and select buttons thereof are clearly displayed. When a "user group which cannot be accompanied with" is selected, the policy editor 1019 writes the selected user group as a companion in an access control policy. In this case, when a specific positional relationship such as "a user exists at the same position as a companion of the user" or the like is satisfied, access from the user has to be inhibited. Therefore, the policy editor 1019 writes "not permitted" as data of "accessibility" in the access control policy.

The specific example described above exemplifies access control to a server in an office. The present embodiment, however, is applicable to other cases. For example, the present embodiment is applicable to access control: "only when an expositor and a part of important customers exist at the same location in an exhibition where a business talk is conducted, access to "data concerning a sales strategy" is permitted". In addition, a condition that "an expositor and an important customer exist at the same location" may be defined as a condition to make an access control policy effective, and a condition that "an expositor, an important customer, and an ordinary customer exist at the same location" may be defined as a condition to make an access control policy ineffective. In this case, when an expositor, an important customer, and an ordinary customer exist at the same location, an access control policy describing that access to "data concerning a sales strategy" is permitted is made ineffective. As a result, access to the "data concerning a sales strategy" is not permitted any more. When an expositor and an important customer exist at the same location and there is no other person at the location, the access control policy describing that access to "data concerning a sales strategy" is permitted is made effective. Then, access is permitted.

The ninth embodiment is also applicable to, for example, such access control that "an access control policy is made effective and access to services and data used in a meeting are permitted as meeting members are all present (or exist all together) at a predetermined meeting room when conducting a meeting". Alternatively, a condition that "meeting members are all present at the same location" may be defined as a condition to make an access control policy effective, and a condition that "meeting members and a person other than the meeting members are present at the same location" may be defined as a condition to make the access control policy ineffective (or to make a policy for "not permitted" effective. In this case, if any of meeting members is absent or a person other than the meeting members is included, an access control policy describing that access to services and data used in a meeting is made ineffective (or an access control policy describing that access is not permitted is made effective), and access to services and data used in a meeting is not permitted. When the person other than the meeting members leaves the location and all the meeting members are present, an access control policy describing that access to services and data used in a meeting is permitted is made effective, so that access is permitted. The present embodiment is further applicable to other persons than the meeting members and to other access control: "in case of accessing important data such as personal information, access is permitted only when related directors are all present", etc.

In these applicable examples, a user who belongs to a group described as a user group and a user who belongs to a group described as a companion overlap each other, when creating an access control policy as shown in FIG. 58. For example, as a user group and a companion, a group including all meeting participants may be described. Alternatively, different groups may be described as a user group and a companion. For example, ah operator may edit an access control policy which specifies a group A1 of "users at a certain post in a company among meeting members" as a user group, a group B of "all meeting participants including users of the group A1" as a companion, and a resource C1 (data including confidential information or the like) for the group A1 as a resource. In this case, the users of the group A1 are allowed to access the resource C1 only while the users of the group B are present all together. Alternatively, it is possible to edit an access control policy which specifies a group A2 of "employees of an external company among meeting members" as a user group, a group B of "all meeting participants including the users of the group A2" as a companion, and a resource C2 (data which can be open to the outside) for the group A2 as a resource. In this case, the users of the group A2 are allowed to access the resource C2 only when the users of the group B are present all together. Alternatively, it is possible to edit an access control policy which specifies a group A9 of "operators of a system used in a meeting" as a user group, a group B of "all meeting participants including the users of the group A9" as a companion, and a resource C9 (a management terminal or the like for the system used in the meeting) for the group A9. In this case, the users of the group A9 is allowed to access the resource C9 only when the users of the group B are present all together.

In these applicable examples, access control is not changed on the basis of time. However, access control can be changed flexibly in consistence with actual start of a meeting, i.e., based on a fact that all meeting participants are present. This applies to end of a meeting. In addition, it is possible to prevent information from leaking to persons other than meeting participants, by merely creating a simple access control policy as exemplified previously.

Like persons, a positional relationship of devices, such as a server, PC, mobile terminal, and the like may be defined as a condition to make an access control policy effective. In case of a person and a device, for example, the present embodiment is applicable to access control: "only when a special user has a terminal (or the terminal and the user exist at the same location), access to a specific resource from the terminal is permitted". The present embodiment is also applicable to inverse access control thereof: "only when a user has a special terminal (or the user and the terminal exist at the same location), access from the user to a specific resource is permitted". Alternatively, a condition that "a user and a special terminal exist at the same location" may be defined as a condition to make an access control policy effective, and a condition that "a user, a special terminal, and another user exist at the same location" or "a user, a special terminal, and another terminal exist at the same location" may be defined as a condition to make an access control policy ineffective (or to make a policy for "not permitted" effective). Likewise, the present embodiment is applicable to access control: "only when a user and a server exist at the same location (or only when a user exists at the location where a server exists), access to a resource on the server is permitted"; "only when a terminal and a server exist at the same location (or only when a terminal exists at the location where a server exists), access to a resource on the server is permitted"; "only when a terminal and another terminal exist at the same location (or only when terminals are close to each other), access to each other's resources on the terminals is permitted"; or the like.

In these applicable examples, when creating an access control policy as shown in FIG. 58, an access control policy which specifies a group of devices as a user group or a group of companions may be created. To manage the position of a device, the presence manager 80 may manage an identifier of the device, and a current position identifier of the device. A form of notifying the presence manager 80 of the current position of the device is the same as that in case of notifying a current position of a user. When existence of a device whose current position has changed is detected, the presence manager 80 may generate movement information consisting of a combination of the identifier and current position identifier of the device, and may notify the object knowledge manager 2023 of the movement information. The object knowledge storage 203 stores object knowledge in which an identifier of a device is a name object and current position information of the device is a substantial object. Although processings are carried out with use of an identifier and a current position identifier of the device, in this applicable example, the processings are the same as those described in the ninth embodiment.

As has been described in the eighth embodiment, the display device of a PC may have a user detector which picks up an image of a user to detect the user seeing the display device and to specify a user ID. The user detector may transmit the specified ID and the installation position of the PC (i.e., the current position of the user) to the presence manager 80. In this case, a condition as follows may be defined. That is, when a predetermined user exists alone at the installation location of the PC, access from the user is permitted. However, even when a predetermined user exists at the location, access from the predetermined user is not permitted if another user is seeing the display together with the user.

According to the present embodiment, what a relationship (consistence, inconsistence, or another specific relationship) is maintained between the position of a user as a target to be subjected to access control, and the position of a companion as a user which is a reference for access control (e.g., a companion, expositor, monitor/director, security guard, manager, superior, or the like) is defined as a condition to make an access control policy effective (or ineffective). The condition is described in the access control policy. Further, in accordance with position changes of those users, effectiveness/ineffectiveness of the access control list is updated automatically. Therefore, when using an access control policy describing a limitation to a location, access control can be achieved by specifying the position of a user (or companion) which is a reference as a dynamic location in addition to a static location specified as a reference.

In addition, the access control system according to the present invention may have a structure combining any of the embodiments described above.

Each of the above embodiments has been described with reference to a case where a policy engine, an access control device, and a knowledge database are separate computers. However, the policy engine and access control device may be constituted by one computer. Alternatively, the policy engine and the knowledge database may be constituted by one computer. Further alternatively, the policy engine, access control device, and knowledge database may be constituted by one computer.

In the fifth embodiment, the system configuration manager 50 may be constituted by a computer common to the policy engine, knowledge database, or any of access control devices. In the sixth embodiment, the mail analyzer 61 may be constituted by a computer common to the policy engine, knowledge database, or any of access control devices. In the seventh embodiment, the schedule analyzer 70 may be constituted by a computer common to the policy engine, knowledge database, or any of access control devices. In the eighth embodiment, the presence manager 80 may be constituted by a computer common to the policy engine, knowledge database, or any of access control devices. In the ninth embodiment, the object knowledge analyzer 90 may be constituted by a computer common to the policy engine, knowledge database, or any of access control devices.

In place of the LAN 63 shown in the sixth and seventh embodiments, a different communication network may be used.

In each of the above embodiments, a user group is described in each access control policy. In place of a name of a user group, a name of a group of devices may be described in each access control policy. In this case, the object knowledge storage stores object knowledge concerning groups of devices. The object knowledge concerning groups of devices may include a name of a group of devices as a name object and may further include device IDs as substantial objects to identify respective devices. Name objects which express names of groups of devices each may have a path to a substantial object expressing another name object or device ID. Even in case where a name of a group of devices is described in an access control policy, operations in each of the embodiments are the same as those described previously. In this case, the user interface shown in FIG. 26 may be provided with a column to "input a device ID to add" in place of the column to "input a user ID to add". In addition, a column of a "list of added device IDs" may be provided in place of the column of a "list of added user IDs".

The knowledge storage described in the claims corresponds to the object knowledge storage in the embodiments described above. The update group notification means in the claims corresponds to the object knowledge manager. The policy specification means corresponds to the policy analyzer and policy storage in the embodiments described above. The user position information update means in the claims corresponds to the object knowledge manager and the object knowledge storage in the embodiments described above. The operating state update means in the claims corresponds to the object knowledge manager and the object knowledge storage in the embodiments described above. The knowledge manager in the claims corresponds to the object knowledge manager in the embodiments described above. The directional graph editor in the claims corresponds to the object knowledge editor in the embodiments described above. The knowledge analyzer in the claims corresponds to the object knowledge analyzer in the embodiments described above.

The present invention is applicable for the purpose of, for example, safely sharing data via a shared server during a meeting in a network system like an existing virtual private network (VPN) environment in which a security device such as a VPN gateway or a firewall has already installed. In exchanging confidential information between companies, the present invention is applicable for the purpose of preventing leakage of confidential information to the outside of a predetermined user group.

What is claimed is:

1. An access control system comprising:
    a knowledge database configured to store
        (i) information indicative of a relationship between a group of users or devices that use at least a resource as an access destination, and user identification information or device identification information capable of identifying the user or device,
        (ii) information indicative of a relationship between a position as an access source of access to the resource, and access source identification information capable of identifying the position, or
        (iii) information indicative of a relationship between the resource and access destination identification information capable of identifying the resource; and
    a policy engine configured to
        (i) store an access control policy describing at least the group, position, and resource of the information stored in the knowledge database,
        (ii) generate an access control list indicating accessibility/inaccessibility to an access destination from an access source by use of the access control policy and the information stored in the knowledge database, and
        (iii) set the access control list in an existing access control device,
    wherein said knowledge database includes
    a knowledge storage configured to store
        (i) information indicative of a relationship between a group and user identification information or device identification information, as a directional graph having a path from one group to another group, user identification information, or device identification information,
        (ii) information indicative of a relationship between a position and access source identification information, as a directional graph having a path from one position to another position or access source identification information, and
        (iii) information indicative of a relationship between a resource and access destination identification information, as a directional graph having a path from one resource to another resource or access destination identification information.

2. The access control system according to claim 1, wherein said knowledge database includes a knowledge manager configured to make said knowledge storage search for a directional graph from a group, a position or a resource, to extract a set of user identification information items or device identification information items, a set of access source identification information items, or a set of access destination identification items.

3. The access control system according to claim 1, wherein said knowledge database includes a directional graph editor configured to provide an user interface for editing a directional graph stored in the knowledge storage.

4. The access control system according to claim 3, wherein said directional graph editor is configured to provide a user interface including
- a selection column to select another group to which a path extends from one group,
- an input column to input a user identification information item or device identification information item to which a path extends from the one group, and
- an instruction column to instruct a user identification information item or device identification information item to delete, among user identification information items or device identification information items to which paths extend from the one group.

5. The access control system according to claim 3, wherein said directional graph editor is configured to provide a user interface including
- a selection column to select another position to which a path extends from one position,
- an input column to input an access source identification information item to which a path extends from the one position, and
- an instruction column to instruct an access source identification information item to delete, among access source identification information items which paths extend from the one group.

6. The access control system according to claim 3, wherein said directional graph editor is configured to provide a user interface including
- a selection column to select another resource to which a path extends from one resource,
- an input column to input an access destination identification information item to which a path extends from the one resource, and
- an instruction column to instruct an access destination identification information item to delete, among access destination identification information items to which paths extend from the one group.

7. The access control system according to claim 1, wherein said policy engine includes:
- a policy analyzer configured to generate an intermediate language as a set of rules including no description depending on a specific access control device, by replacing at least the position and resource among contents written in the access control policy, with access source identification information and access destination identification information, respectively, by use of the information stored in the knowledge database; and
- access control list setting means configured to
  (i) convert the generated intermediate language into an access control list corresponding to a type of a access control device as a setting target in which the access control list is to be set, and
  (ii) set the access control list in the access control device.

8. The access control system according to claim 7, wherein said policy analyzer is configured to generate a rule constituting an intermediate language, based on the updated access control policy, and gives the rule an ID of the access control policy as a generation source, and
said access control list setting means is configured to
  (i) generate a line as a constitutional element of the access control list, based on the rule,
  (ii) give the line as a generation source an ID given to the rule, and if a part of a rule is newly generated by the policy analyzer, and
  (iii) update the line given the same ID as that given to the generated rule.

9. The access control system according to claim 1, wherein said policy engine includes a policy editor configured to provide a user interface for editing at least a group, position, and resource of information included in an access control policy.

10. The access control system according to claim 9, wherein said policy editor is configured to
  (i) display a list of groups, a list of positions, and a list of sources, and
  (ii) provide a user interface to accept selection of a group, position, and resource from the lists, respectively.

11. An access control system comprising:
a knowledge database configured to store
  (i) information indicative of a relationship between a group of users or devices that use at least a resource as an access destination, and user identification information or device identification information capable of identifying the user or device,
  (ii) information indicative of a relationship between a position as an access source of access to the resource, and access source identification information capable of identifying the position, or
  (iii) information indicative of a relationship between the resource and access destination identification information capable of identifying the resource; and
a policy engine configured to
  (i) store an access control policy describing at least the group, position, and resource of the information stored in the knowledge database,
  (ii) generate an access control list indicating accessibility/inaccessibility to an access destination from an access source by use of the access control policy and the information stored in the knowledge database, and
  (iii) set the access control list in an existing access control device, wherein said policy engine includes
a policy analyzer configured to generate an intermediate language as a set of rules including no description depending on a specific access control device, by replacing at least the position and resource among contents written in the access control policy, with access source identification information and access destination identification information, respectively, by use of the information stored in the knowledge database,
wherein
said knowledge database includes:
  a knowledge storage configured to store
    (i) information indicative of a relationship between a group and user identification information or device identification information, as a directional graph having a path from one group to another group, user identification information, or device identification information,
    (ii) information indicative of a relationship between a position and access source identification information, as a directional graph having a path from one position to another position or access source identification information, and
    (iii) information indicative of a relationship between a resource and access destination identification information, as a directional graph having a path from one resource to another resource or access destination identification information; and
  update group notification means configured to notify the policy engine of information of a group, position, or resource concerning an updated part of the directional graph, when a directional graph stored in the knowledge storage is updated, said policy engine includes policy specification means configured to specify an access control policy including the information of a group, position, or resource notified by the update group notification means; and said policy analyzer is configured to generate a rule constituting an intermediate language, based on the access control policy specified by the policy specification means.

12. The access control system according to claim 11, wherein said policy analyzer is configured to generate the rules constituting the intermediate language, based on an updated access control policy.

13. The access control system according to claim 11, further comprising a presence manager configured to
  (i) maintain information on a current position of each user, and
  (ii) notify the knowledge database of movement information including at least user identification information on the user who has moved and current position identification information capable of identifying a movement destination thereof, when a current position has changed in accordance with a movement of a user, wherein said knowledge storage is configured to store information indicative of a relationship between the user identification information of each user and the current position identification information of each user, as a directional graph having a path from the user identification information to the current position identification information, said knowledge database includes user position information update means configured to update the directional graph, based on movement information notified by the presence manager, said update group notification means is configured to notify the policy engine of user identification information concerning an updated part, when the directional graph is updated by the user position information update means, said policy specification means is configured to specify an access control policy, based on user identification information notified by the update group notification means, and said policy analyzer is configured to generate a rule constituting an intermediate language, based on the access control policy specified by the policy specification means.

14. The access control system according to claim 11, further comprising:

a presence manager configured to
  (i) maintain information of a current position of each user or each device, and
  (ii) notify the knowledge database of movement information including at least user identification information on the user who has moved or device identification information on the device which has moved and current position identification information capable of identifying a movement destination thereof, when a current position has changed in accordance with a movement on a user or device; and a knowledge analyzer configured to
  (i) determine information which should be transferred to the policy specification means, of the information stored in the knowledge database, and
  (ii) transfer the information determined to the policy specification means from the knowledge database, wherein said policy specification means includes a policy storage configured to store an access control policy in which a condition to make the access control policy itself effective is described, said access control policy describing, as a companion, a user or device overlapping or different from a user or device corresponding to a group, said knowledge storage is configured to store information indicative of a relationship between user identification information on each user or device identification information on each user and current position identification information on each user or each device, as a directional graph having a path from the user identification information or device identification information to the current position identification information, said knowledge database includes position information update means configured to update the directional graph, based on movement information notified by the presence manager, said update group notification means is configured to notify the policy engine of user identification information or device identification information concerning an updated part, when the directional graph is updated by the position information update means, said policy specification means is configured to
  (i) output information on a group of users or devices and a companion, which is described in each access control policy, to the knowledge analyzer,
  (ii) input thereby each user identification information or each device identification information corresponding to the group of users or devices and the companion from the knowledge analyzer,
  (iii) specify an access control policy, based on the inputted user identification information or device identification information and based on the user identification information or device identification information notified by the update group notification means,
  (iv) output each user identification information or each device identification information corresponding to a group and companion written in the specified access control policy to the knowledge analyzer,
  (v) input thereby current position identification information on each user or each device corresponding to said each user identification information or each device identification information, from the knowledge analyzer, and
  (vi) determine an access control policy which is made effective based on the inputted information and based on a condition described in the access control policy, and said policy analyzer is configured to generate a rule constituting an intermediate language, based on the access control policy specified by the policy specification means.

15. The access control system according to claim 14, wherein said policy engine includes a policy editor configured to provide a user interface for editing at least a group, position, resource, and companion of information included in an access control policy.

16. The access control system according to claim 15, wherein said policy editor is configured to provide a user interface configured to
  (i) display a list of groups of users or devices that use a resource, a list of positions, a list of resources, and a list of groups of companions, and (ii) accept selection of a group of users or devices, a position, a resource, and a group of companions from the lists, respectively.

17. The access control system according to claim 11, further comprising
   a system configuration manager configured to
      (i) maintain information concerning operating states of plural access control devices connected to a policy engine, and
      (ii) notify the knowledge database of configuration information including identification information on the access control device and information on the operating state thereof after having changed, when an operating state of an access control device has changed, wherein
   said knowledge storage is configured to store information indicative of a relationship between identification information on each access control device and an operating state thereof, as a directional graph having a path from the identification information on each access control device to the operating state thereof,
   said knowledge database includes operating state update means configured to update the directional graph, based on the configuration information notified by the system configuration manager,
   said update group notification means is configured to notify identification information on an access control device concerning an updated part, when the directional graph is updated by the operation state update means, to the policy engine,
   said policy specification means is configured to specify an access control policy, based on the identification information on the access control device notified by the update group notification means, and
   said policy analyzer is configured to generate a rule constituting an intermediate language, based on the access control policy specified by the policy specification means.

18. An access control system comprising:
   a knowledge database configured to store information indicative of
      (i) a relationship between a group of users or devices that use at least a resource as an access destination, and user identification information or device identification information capable of identifying the user or device,
      (ii) a relationship between a position as an access source of access to the resource, and access source identification information capable of identifying the position,
      (iii) a relationship between the resource and access destination identification information capable of identifying the resource, and
      (iv) a relationship between user identification information on each user or device identification information on each device and current position identification information on each user or each device;
   a policy engine configured to
      (i) store an access control policy describing at least the group, position, and resource of the information stored in the knowledge database, and describing, as a companion, a user or device overlapping or different from a user or device corresponding to a group,
      (ii) generate an access control list indicating accessibility/inaccessibility to an access destination from an access source by use of an effective access control policy and the information stored in the knowledge database, and
      (iii) set the access control list in an existing access control device; and
   a presence manager configured to
      (i) maintain information on a current position of each user or each device, and
      (ii) notify the knowledge database of movement information including at least user identification information on the user who has moved or device identification on the device which has moved and current position identification information capable of identifying a movement destination thereof, when a current position has changed in accordance with a movement of a user or a device, wherein
   said knowledge database is further configured to
      (v) update information indicative of a relationship between user identification information on each user or device identification information on each device and the current position identification information on each user or each device, based on the movement information notified by the presence manager, and
      (vi) notify the policy engine of user identification information or device identification information concerning an updated part, and
   said policy engine includes policy specification means configured to
      (i) output information on a group of users or devices and a companion, which is described in each access control policy,
      (ii) input thereby each user identification information or each device identification information corresponding to the group of users or devices and the companion,
      (iii) specify an access control policy, based on the user identification information or device identification information and based on the user identification information or device identification information notified by the knowledge database,
      (iv) output each user identification information or each device identification information corresponding to a group and companion written in the specified access control policy,
      (v) input thereby current position identification information on each user or each device corresponding to said each user identification information or each device identification information, and
      (vi) determine an access control policy which is made effective based on the inputted information and based on a condition described in the access control policy.

19. The access control system according to claim 18, wherein said policy engine includes a policy editor configured to provide a user interface for editing at least a group, position, resource, and companion of information included in an access control policy.

20. An access control method comprising:
   a step in which a knowledge database stores information indicative of
      (i) a relationship between a group of users or devices that use at least a resource as an access destination, and user identification information or device identification information capable of identifying the user or device,
      (iii) a relationship between a position as an access source of access to the resource, and access source identification information capable of identifying the position, or (iii) a relationship between the resource and access destination identification information capable of identifying the resource;

a step in which a policy engine
  (i) stores an access control policy describing at least the group, position, and resource of the information stored in the knowledge database,
  (ii) generates an access control list indicating accessibility/inaccessibility to an access destination from an access source by use of the access control policy and the information stored in the knowledge database, and
  (iii) sets the access control list in an existing access control device; and a step in which said knowledge database stores information indicative of
  (i) a relationship between a group and user identification information or device identification information, as a directional graph having a path from one group to another group, user identification information, or device identification information,
  (ii) a relationship between a position and access source identification information, as a directional graph having a path from one position to another position or access source identification information, and
  (iii) a relationship between a resource and access destination identification information, as a directional graph having a path from one resource to another resource or access destination identification information.

21. An access control method comprising:

a step in which a knowledge database stores information indicative of
  (i) a relationship between a group of users or devices that use at least a resource as an access destination, and user identification information or device identification information capable of identifying the user or device,
  (ii) a relationship between a position as an access source for accessing the resource, and access source identification information capable of identifying the position,
  (iii) a relationship between the resource and access destination identification information capable of identifying the resource, and
  (iv) a relationship between user identification information on each user or device identification information on each device and current position identification information on each user or each device;

a step in which a policy engine stores an access control policy describing at least the group, position, and resource of the information stored in the knowledge database, and describing, as a companion, a user or device overlapping or different from a user or device corresponding to a group;

a step in which a presence manager
  (i) maintains information on a current position of each user or each device, and
  (ii) when a current position has changed in accordance with a movement of a user or a device, notifies the knowledge database of movement information including at least user identification information on the user who has moved or device identification information on the device which has moved and current position identification information capable of identifying a movement destination thereof;

a step in which said knowledge database
  (i) updates information indicative of a relationship between user identification information on each user or device identification information on each device and the current position identification information on each user or each device, based on the movement information notified by the presence manager, and
  (ii) notifies the policy engine of user identification information or device identification information concerning an updated part;

a step in which said policy engine
  (i) outputs information on a group of users or devices and a companion, which is described in each access control policy,
  (ii) inputs thereby each user identification information or each device identification information corresponding to the group of users or devices and the companion,
  (iii) specifies an access control policy, based on the inputted user identification information or device identification information and based on the user identification information or device identification information notified by the knowledge database,
  (iv) outputs each user identification information or each device identification information corresponding to a group and companion written in the specified access control policy,
  (v) inputs the current position identification information on each user or each device corresponding to said each user identification information or each device identification information, and
  (vi) determines an access control policy which is made effective based on the inputted information and based on a condition described in the access control policy; and a step in which said policy engine
  (i) generates an access control list indicative of accessibility/inaccessibility from an access source to an access destination, by use of the access control policy determined as being effective and the information stored in the knowledge database, and
  (ii) sets the access control list in an existing access control device.

22. A computer readable medium storing an access control program for making a computer execute a processing, said computer comprising a policy storage connected to a knowledge database which stores information indicative of:

a relationship between a group of users or devices that use at least a resource as an access destination, and user identification information or device identification information capable of identifying the user or device;

a relationship between a position as an access source of access to the resource, and access source identification information capable of identifying the position; or a relationship between the resource and access destination identification information capable of identifying the resource, and the policy storage storing an access control policy describing at least the group, position, and resource of the information stored in the knowledge database, wherein said processing includes:

a step of generating an access control list indicating accessibility/inaccessibility to an access destination from an access source by use of the access control policy and the information stored in the knowledge database; and a step of setting the access control list in an existing access control devices wherein said knowledge database further stores information indicative of:

(i) a relationship between a group and user identification information or device identification information, as a directional graph having a path from one group to another group, user identification information, or device identification information, (ii) a relationship between a position and access source identification information, as a directional graph having a path from one position to another position or access source identification information, and (iii) a relationship between a resource and access destination identification information, as a directional graph having a path from one resource to another resource or access destination identification information.

23. A computer readable medium storing an access control program for making a computer execute a processing, said computer comprising a policy storage connected to a knowledge database which stores information indicative of:

a relationship between a group of users or devices that use at least a resource as an access destination, and user identification information or device identification information capable of identifying the user or device;

a relationship between a position as an access source for accessing the resource, and access source identification information capable of identifying the position;

a relationship between the resource and access destination identification information capable of identifying the resource; or a relationship between user identification information on each user or device identification information on each device and current position identification information on each user or each device, and said policy storage storing an access control policy describing at least the group, position, and resource of the information stored in the knowledge database, and describing, as a companion, a user or device overlapping or different from a user or device corresponding to a group, wherein said processing includes:

(i) an update information input step of inputting user identification information or device identification information concerning an update part in the information indicative of the relationship between user identification information on each user or device identification information on each device and current position identification information on each user or each device;

(ii) an identification information input step of outputting information on a group of users or devices and a companion, which is described in each access control policy, thereby to input each user identification information or each device identification information corresponding to the group of users or devices and the companion;

(iii) a specify step of specifying an access control policy, based on the user identification information or device identification information inputted in the identification information input step, and based on the user identification information or device identification information inputted by the update information input step;

(iv) a current position identification information input step of outputting each user identification information or each device identification information corresponding to a group and companion written in the specified access control policy, thereby to input current position identification information on each user or each device corresponding to said each user identification information or each device identification information;

(v) an effective policy determination step of determining an access control policy which is made effective based on the inputted information and based on a condition described in every access control policy;

(vi) a list generation step of generating an access control list indicative of accessibility/inaccessibility from an access source to an access destination, by use of the access control policy determined as being effective and the information stored in the knowledge database; and (vii) a step of setting the access control list in an existing access control devices wherein said knowledge database further stores information indicative of:

(i) a relationship between a group and user identification information or device identification information, as a directional graph having a path from one group to another group, user identification information, or device identification information, (ii) a relationship between a position and access source identification information, as a directional graph having a path from one position to another position or access source identification information, and (iii) a relationship between a resource and access destination identification information, as a directional graph having a path from one resource to another resource or access destination identification information.

* * * * *